United States Patent
Myung et al.

(10) Patent No.: US 12,250,722 B2
(45) Date of Patent: Mar. 11, 2025

(54) METHOD BY WHICH TERMINAL TRANSMITS UPLINK SIGNAL IN UNLICENSED BAND, AND APPARATUS USING METHOD

(71) Applicant: LG Electronics Inc., Seoul (KR)

(72) Inventors: Sechang Myung, Seoul (KR); Seonwook Kim, Seoul (KR); Joonkui Ahn, Seoul (KR)

(73) Assignee: LG ELECTRONICS INC., Seou (KR)

( * ) Notice: Subject to any disclaimer, the term of this patent is extended or adjusted under 35 U.S.C. 154(b) by 645 days.

(21) Appl. No.: 17/290,676

(22) PCT Filed: Nov. 4, 2019

(86) PCT No.: PCT/KR2019/014852
§ 371 (c)(1),
(2) Date: Apr. 30, 2021

(87) PCT Pub. No.: WO2020/091565
PCT Pub. Date: May 7, 2020

(65) Prior Publication Data
US 2021/0392685 A1    Dec. 16, 2021

(30) Foreign Application Priority Data

Nov. 2, 2018 (KR) .................. 10-2018-0133487
Aug. 16, 2019 (KR) .................. 10-2019-0100575

(51) Int. Cl.
*H04W 74/0816* (2024.01)
*H04W 72/0446* (2023.01)
(Continued)

(52) U.S. Cl.
CPC ... *H04W 74/0816* (2013.01); *H04W 72/0446* (2013.01); *H04W 72/0453* (2013.01);
(Continued)

(58) Field of Classification Search
CPC ............ H04W 74/0816; H04W 72/23; H04W 72/0446; H04W 72/0453; H04W 72/1263; H04W 74/006
See application file for complete search history.

(56) References Cited

U.S. PATENT DOCUMENTS

2016/0227578 A1*  8/2016  Lee ............... H04W 74/004
2018/0255584 A1*  9/2018  Sun ............... H04W 16/14
(Continued)

FOREIGN PATENT DOCUMENTS

WO    WO2017116132    7/2017

OTHER PUBLICATIONS

Huawei, HiSilicon, "Coexistence and channel access for NR unlicensed band operations," R1-1810126, 3GPP TSG RAN WG1 Meeting #94bis, Chengdu, China, Oct. 8-12, 2018, 15 pages.
(Continued)

*Primary Examiner* — Jael M Ulysse
(74) *Attorney, Agent, or Firm* — Fish & Richardson P.C.

(57) ABSTRACT

A method by which a terminal transmits an uplink signal in an unlicensed band, and an apparatus using same are provided. The method receives, from a base station, channel occupancy information through a PDCCH and transmits the uplink signal to the base station through a configured grant uplink access (CUL) type physical uplink shared channel (PUSCH) on the basis of the channel occupancy information. The channel occupancy information indicates which sub-band of a CUL band including a plurality of sub-bands enables the terminal to transmit the CUL type PUSCH within a channel occupancy time (COT) acquired by the base station through a channel access procedure.

12 Claims, 49 Drawing Sheets

(51) Int. Cl.
   *H04W 72/0453*     (2023.01)
   *H04W 72/1263*     (2023.01)
   *H04W 72/23*       (2023.01)
   *H04W 74/00*       (2009.01)

(52) U.S. Cl.
   CPC ....... *H04W 72/1263* (2013.01); *H04W 72/23* (2023.01); *H04W 74/006* (2013.01)

(56) References Cited

U.S. PATENT DOCUMENTS

| | | | | |
|---|---|---|---|---|
| 2019/0014481 | A1* | 1/2019 | Yerramalli | H04W 74/0808 |
| 2019/0141734 | A1* | 5/2019 | Lei | H04W 72/23 |
| 2019/0253200 | A1* | 8/2019 | Salem | H04W 74/0808 |
| 2019/0349998 | A1* | 11/2019 | Bhattad | H04L 1/0013 |
| 2020/0045733 | A1* | 2/2020 | Tiirola | H04W 74/0808 |
| 2020/0045738 | A1* | 2/2020 | Oh | H04W 74/0808 |
| 2020/0053777 | A1* | 2/2020 | Babaei | H04W 16/14 |
| 2020/0053799 | A1* | 2/2020 | Jeon | H04W 16/14 |
| 2020/0092861 | A1* | 3/2020 | Xu | H04W 72/23 |
| 2020/0092913 | A1* | 3/2020 | Xu | H04W 74/0816 |
| 2020/0100276 | A1* | 3/2020 | Oh | H04W 16/14 |
| 2020/0100286 | A1* | 3/2020 | Xu | H04L 1/187 |
| 2020/0146058 | A1* | 5/2020 | Xu | H04W 72/0453 |
| 2020/0146064 | A1* | 5/2020 | Oh | H04W 74/0808 |
| 2020/0236677 | A1* | 7/2020 | Cui | H04W 72/0453 |
| 2020/0329496 | A1* | 10/2020 | Li | H04W 72/1273 |
| 2021/0014894 | A1* | 1/2021 | Li | H04W 72/1273 |
| 2021/0235487 | A1* | 7/2021 | Park | H04L 1/0068 |
| 2021/0235492 | A1* | 7/2021 | Iyer | H04W 72/0453 |
| 2021/0235493 | A1* | 7/2021 | Wu | H04W 74/006 |
| 2021/0235496 | A1* | 7/2021 | Park | H04B 1/715 |
| 2021/0368484 | A1* | 11/2021 | Xu | H04L 27/26025 |
| 2021/0385831 | A1* | 12/2021 | Nogami | H04L 5/0094 |
| 2021/0400719 | A1* | 12/2021 | Oh | H04W 74/006 |
| 2022/0039158 | A1* | 2/2022 | Awadin | H04W 72/23 |

OTHER PUBLICATIONS

Huawei, HiSilicon, "Transmission with configured grant in NR unlicensed band," R1-1810129, 3GPP TSG RAN WG1 Meeting #94bis, Chengdu, China, Oct. 8-12, 2018, 11 pages.

MediaTek, Inc., "Discussion on NR-U configured grant," R1-1810445, 3GPP TSG RAN WG1 Meeting #94bis, Chengdu, China, Oct. 8-12, 2018, 5 pages.

Nokia, Nokia Shanghai Bell, "On the Frame structure and Wideband operation for NR-U," R1-1810613, 3GPP TSG RAN WG1 Meeting #94bis, Chengdu, China, Oct. 8-12, 2018, 15 pages.

* cited by examiner

FIG. 19
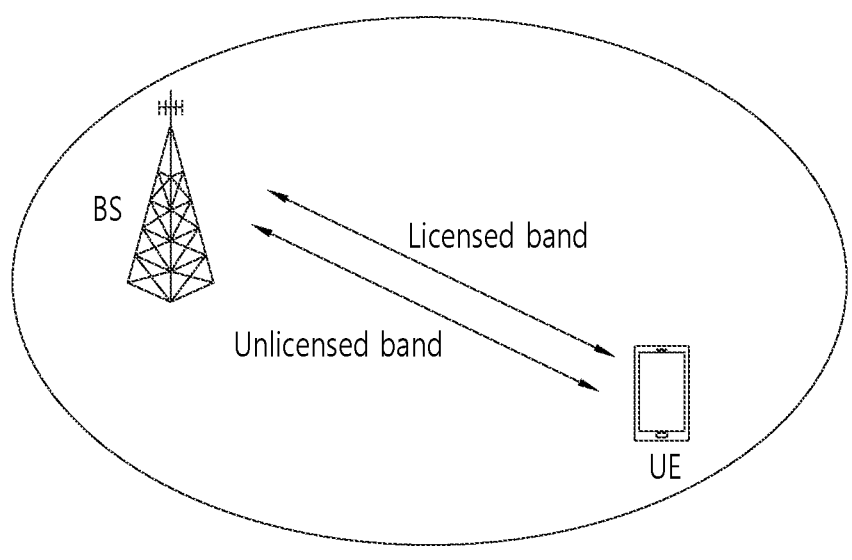
(a)
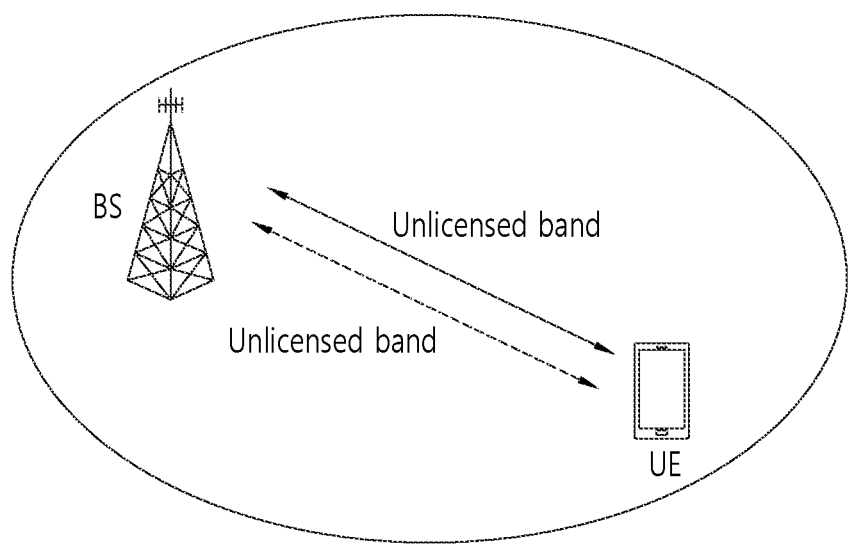
(b)

Non-interleaved CCE-to-REG mapping

METHOD BY WHICH TERMINAL TRANSMITS UPLINK SIGNAL IN UNLICENSED BAND, AND APPARATUS USING METHOD

CROSS-REFERENCE TO RELATED APPLICATIONS

This application is a National Stage application under 35 U.S.C. § 371 of International Application No. PCT/KR2019/014852, filed on Nov. 4, 2019, which claims the benefit of Korean Patent Application No. 10-2018-0133487, filed on Nov. 2, 2018, and Korean Patent Application No. 10-2019-0100575, filed on Aug. 16, 2019. The disclosures of the prior applications are incorporated by reference in their entirety.

BACKGROUND OF THE DISCLOSURE

Field of the Disclosure

The present disclosure relates to wireless communication, and more particularly, to a method for a UE (or a terminal) to transmit an uplink signal in an unlicensed band, and an apparatus using the method.

Related Art

Wireless communication systems are widely developed to provide various types of communication services such as voice and data. In general, a wireless communication system is a multiple access system capable of supporting communication with multiple users by sharing available system resources (bandwidth, transmission power, etc.). Examples of multiple access systems include code division multiple access (CDMA) systems, frequency division multiple access (FDMA) systems, time division multiple access (TDMA) systems, orthogonal frequency division multiple access (OFDMA) systems, and single carrier frequency. division multiple access (SC-FDMA) systems.

Meanwhile, as more communication devices require a larger communication capacity, there is a need for improved mobile broadband communication compared to the existing radio access technology (RAT). In addition, massive machine type communications (MTC), which provides various services anytime and anywhere by connecting multiple devices and objects, is one of the major issues to be considered in next-generation communications. In addition, a communication system design in consideration of services/UEs sensitive to reliability and latency has been discussed. The introduction of a next-generation wireless access technology considering the enhanced mobile broadband communication), massive MTC, and ultra-reliable and low latency communication (URLLC) has been discussed, and in this disclosure, the technology is called new RAT or NR for convenience.

Cellular communication systems such as long term evolution (LTE)/NR systems considers to use unlicensed bands such as the 2.4 gigahertz (GHz) band mainly used by existing Wi-Fi systems or unlicensed bands such as 5 GHz and 60 GHz bands, which are attracting new attention, for traffic offloading.

Basically, the unlicensed band assumes a method of transmitting and receiving wirelessly through contention between communication nodes, it is required for each communication node to perform channel sensing before transmitting a signal to determine that another communication node does not transmit a signal. For convenience, this operation is called listen before talk (LBT) or channel access procedure, and in particular, the operation of determining whether another communication node transmits a signal is called carrier sensing (CS) and the case of determining that another communication node does not transmit a signal is defined as that clear channel assessment (CCA) is confirmed.

Meanwhile, a transmitting end (e.g., a base station (BS)) acquires a certain channel occupancy time (COT) and a radio resource of a certain frequency band through LBT, and then transmits a signal to a receiving end (e.g., a UE) within the COT. In this case, if the BS transmits the signal only in a portion of the COT, the BS shares a remaining time with the UE so that the remaining time may be utilized for signal transmission of the UE, in particular, autonomous uplink access (AUL) of the UE. Autonomous UL access (AUL) may refer to a technique in which a UE autonomously transmits the uplink channel without an uplink grant, after setting resources for uplink channel transmission with higher layer signaling in advance.

However, the related art wireless communication system supports only downlink/uplink transmission in units of a single subband in the remaining time of the COT, and thus, the BS may be able to simply inform UEs as to whether the UE may transmit AUL within the COT acquired by itself through a group-common control channel. However, in the newly introduced NR, a wideband including a plurality of subbands may be allocated to transmission of a "configured grant" scheme similar to the AUL transmission. In this case, not only downlink/uplink transmission in units of one subband but also downlink/uplink transmission using a plurality of subbands may be made in the remaining time of the COT. Therefore, application of the existing method to the NR as it is may degrade efficiency of resource allocation.

SUMMARY

The present disclosure provides a method for transmitting an uplink signal of a UE in an unlicensed band and an apparatus using the method.

In one aspect, provided is a method of transmitting an uplink signal of a user equipment (UE) in an unlicensed band. The method includes receiving channel occupancy information from a base station (BS) through a physical downlink control channel (PDCCH) and transmitting the uplink signal to the BS through a physical uplink shared channel (PUSCH) of a "configured grant uplink access (CUL)" scheme based on the channel occupancy information. The channel occupancy information indicates in which subband of a CUL band including a plurality of subbands the UE is able to transmit the PUSCH of the CUL scheme within a channel occupancy time (COT) acquired by the BS through a channel access procedure.

In another aspect, provided is a user equipment (UE). The UE includes a transceiver configured to transmit and receive a wireless signal and a processor operably coupled to the transceiver. The processor is configured to: receive channel occupancy information from a base station (BS) through a physical downlink control channel (PDCCH), and transmit the uplink signal to the BS through a physical uplink shared channel (PUSCH) of a "configured grant uplink access (CUL)" scheme based on the channel occupancy information. The channel occupancy information indicates in which subband of a CUL band including a plurality of subbands the UE is able to transmit the PUSCH of the CUL scheme within a channel occupancy time (COT) acquired by the BS through a channel access procedure.

In another aspect, provided is a processor for a wireless communication device which controls the wireless communication device to receive channel occupancy information from a base station (BS) through a physical downlink control channel (PDCCH), and to transmit the uplink signal to the BS through a physical uplink shared channel (PUSCH) of a "configured grant uplink access (CUL)" scheme based on the channel occupancy information. The channel occupancy information indicates in which subband of a CUL band including a plurality of subbands the UE is able to transmit the PUSCH of the CUL scheme within a channel occupancy time (COT) acquired by the BS through a channel access procedure.

A bandwidth part BWP configured to the UE in the unlicensed band and a frequency resource for PUSCH transmission of the "configured grant" scheme may be a wideband including a plurality of subbands. When the BS shares a remaining time after downlink transmission in the acquired COT with the UE and informs the UE that uplink transmission is available, the BS may inform the UE in which band (subband) of the COT acquired by the BS the PUSCH transmission in the "configured grant" scheme is available. The UE may transmit the PUSCH of the "configured grant" scheme using a resource included in the subband informed by the BS among the resources allocated for PUSCH transmission of the "configured grant" scheme. As a result, unnecessary interference to other transmitters may be reduced and radio resources may be efficiently used.

BRIEF DESCRIPTION OF THE DRAWINGS

FIG. 19 illustrates an example of a wireless communication system supporting an unlicensed band.

DESCRIPTION OF EXEMPLARY EMBODIMENTS

In the following specification, "/" and "," should be interpreted as representing "and/or". For example, "A/B" may refer to "A and/or B". Further, "A, B" may refer to "A and/or B". Further, "A/B/C" may refer to "at least one of A, B and/or C". Furthermore, "A, B, C" may refer to "at least one of A, B, and/or C".

Furthermore, in the following disclosure, "or" should be interpreted as representing "and/or". For example, "A or B" may include "only A", "only B", and/or "both A and B". In other words, in this disclosure, "or" may be interpreted as representing "additionally" or "alternatively".

Figure 1:
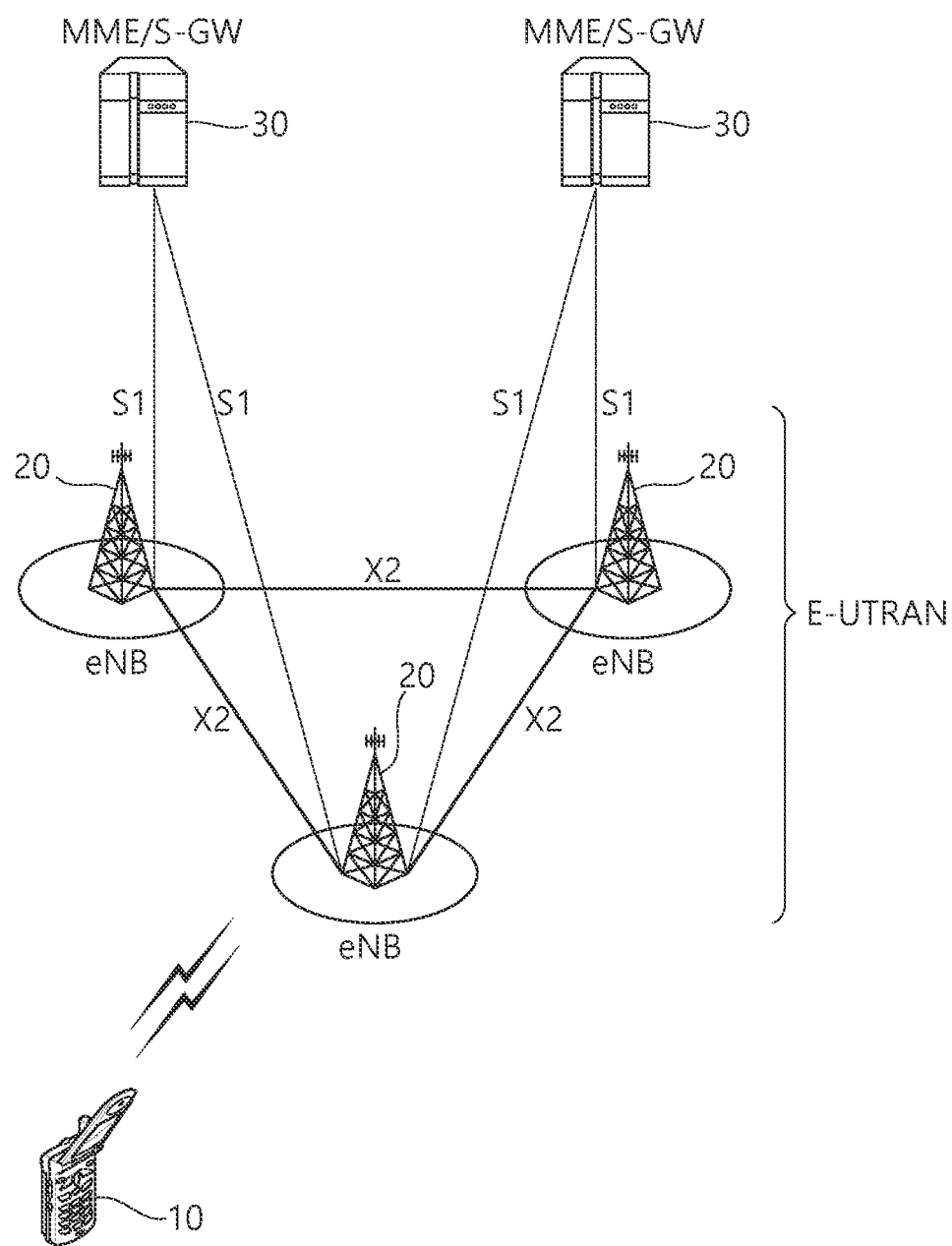
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
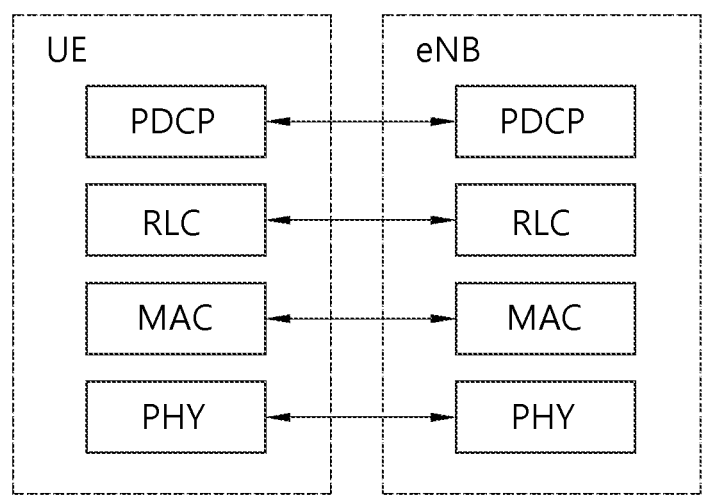
FIG. 2 is a diagram showing a radio protocol architecture for a user plane.
Figure 3:
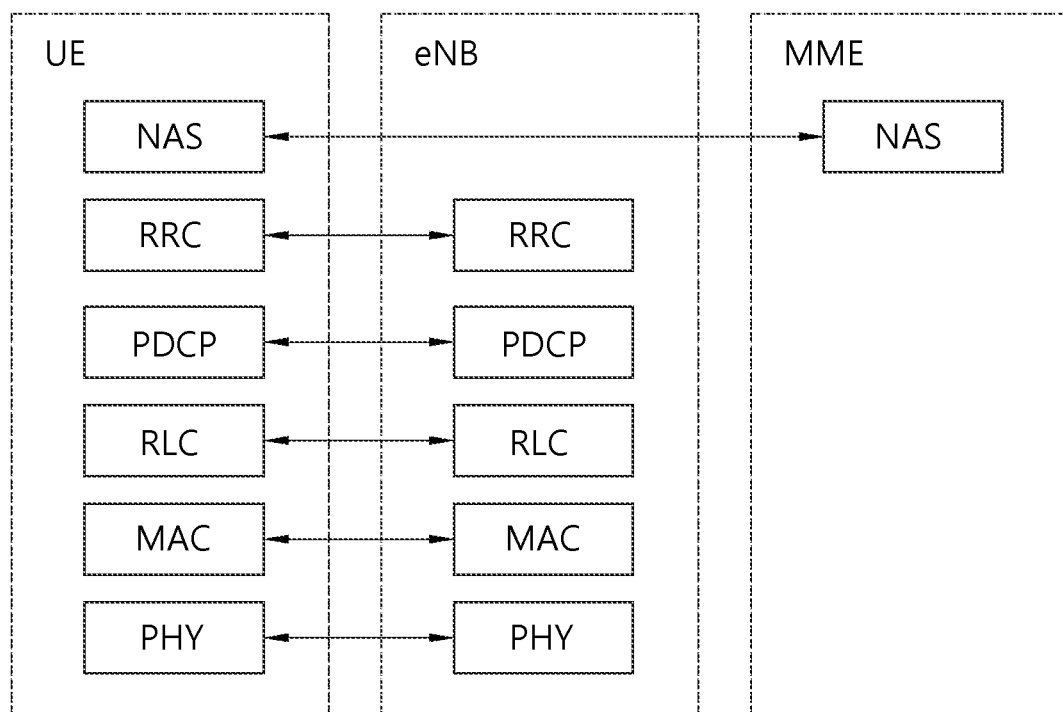
FIG. 3 is a diagram showing a radio protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission. For example, a subframe or a slot may be the TTI.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
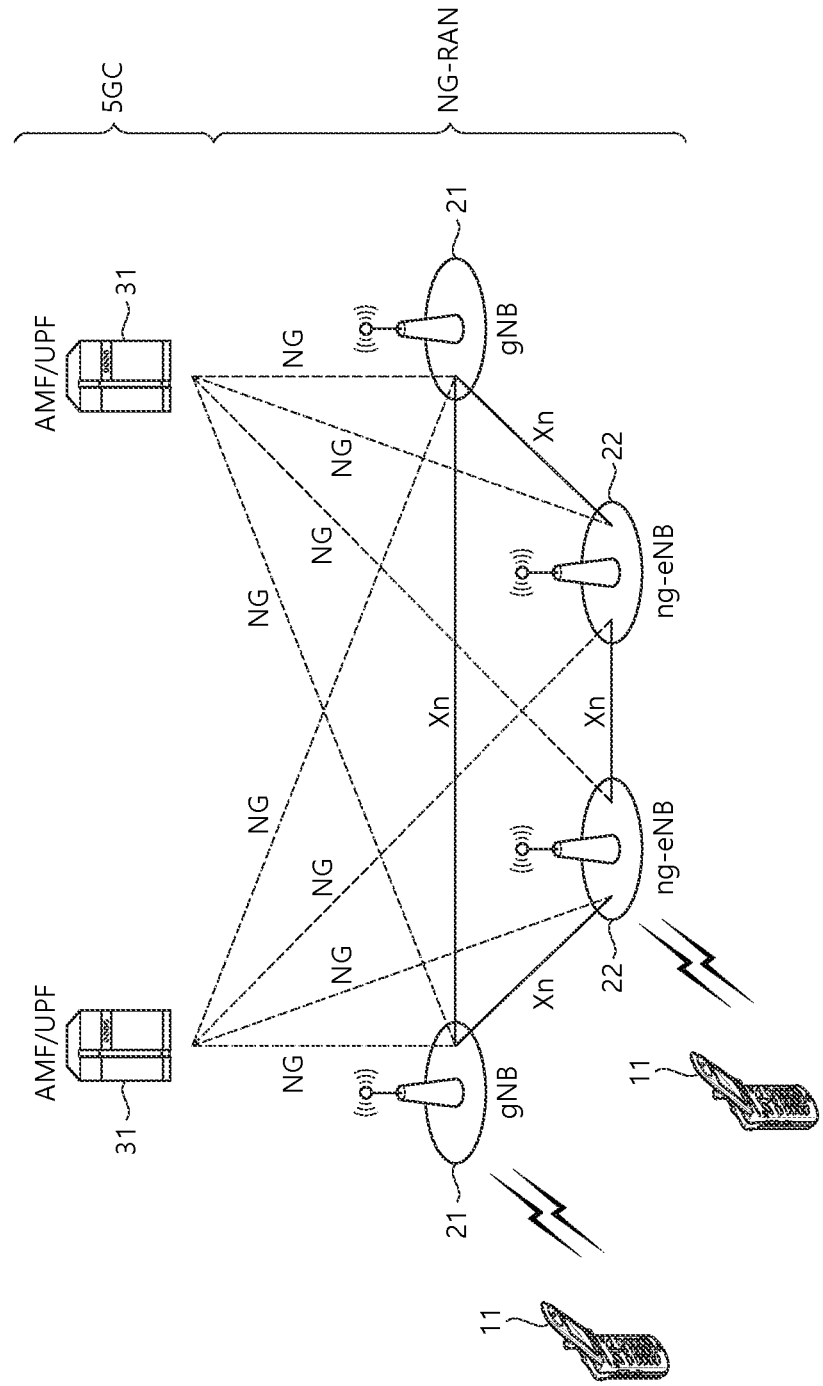
FIG. 4 illustrates another example of a wireless communication system to which technical features of the present disclosure are applicable.

FIG. 4 illustrates another example of a wireless communication system to which technical features of the present disclosure are applicable.

Specifically, FIG. 4 shows system architecture based on a 5G new radio access technology (NR) system. Entities used in the 5G NR system (hereinafter, simply referred to as "NW") may absorb some or all functions of the entities (e.g., the eNB, the MME, and the S-GW) introduced in FIG. 1. The entities used in the NR system may be identified by terms with "NG" to be distinguished from LTE entities.

Referring to FIG. 4, the wireless communication system includes at least one UE 11, a next-generation RAN (NG-RAN), and a 5G core network (5GC). The NG-RAN includes at least one NG-RAN node. The NG-RAN node is an entity corresponding to the BS 20 illustrated in FIG. 5. The NG-RAN node includes at least one gNB 21 and/or at least one ng-eNB 22. The gNB 21 provides an end point of NR control-plane and user-plane protocols to the UE 11. The ng-eNB 22 provides an end point of E-UTRA user-plane and control-plane protocols to the UE 11.

The 5GC includes an access and mobility management function (AMF), a user plane function (UPF), and a session management function (SMF). The AMF hosts functions of NAS security and idle-state mobility processing. The AMF is an entity that includes the functions of a conventional MME. The UPF hosts functions of mobility anchoring function and protocol data unit (PDU) processing. The UPF is an entity that includes the functions of a conventional S-GW. The SMF hosts functions of UE IP address allocation and PDU session control.

The gNB and the ng-eNB are connected to each other via an Xn interface. The gNB and the ng-eNB are also connected to the 5GC through an NG interface. Specifically, the gNB and the ng-eNB are connected to the AMF through an NG-C interface, and to the UPF through an NG-U interface.

Figure 5:
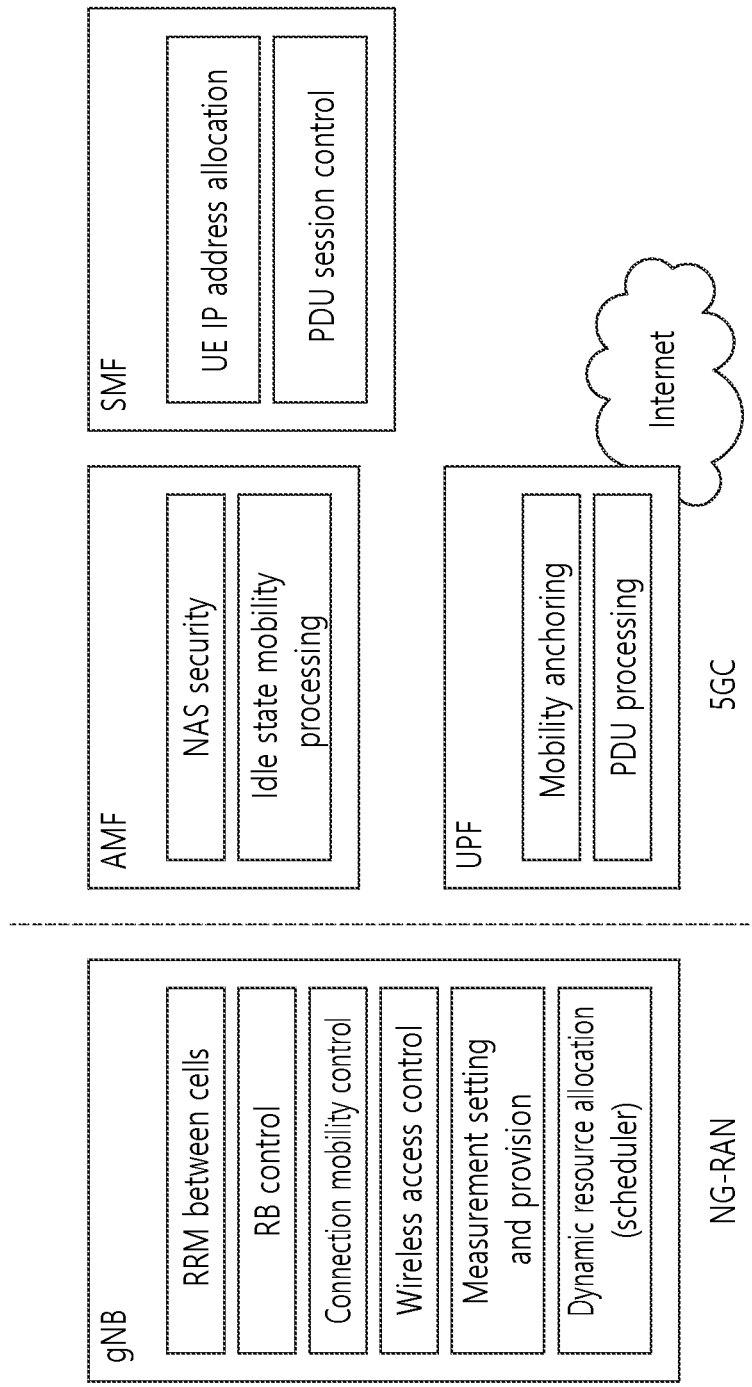
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
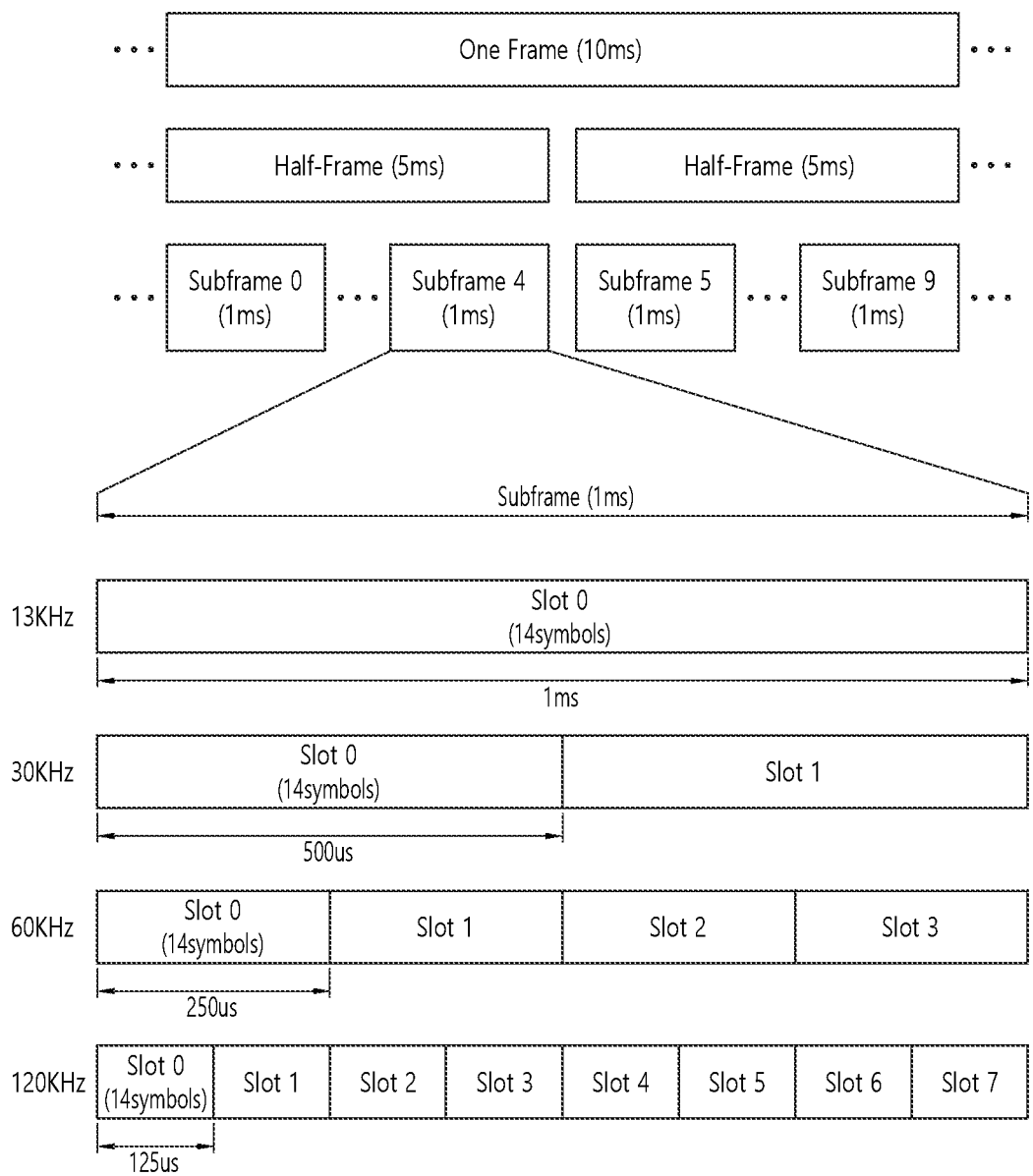
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

In NR, uplink and downlink transmission may include frames. A radio frame has a length of 10 ms and may be defined as two 5 ms half-frames (HF). The half-frame may be defined as five 1 ms subframes (SFs). The subframe is divided into one or more slots, and the number of slots in the subframe depends on subcarrier spacing (SCS). Each slot includes 12 or 14 OFDM(A) symbols according to a cyclic prefix (CP). When normal CP is used, each slot includes 14 symbols. When an extended CP is used, each slot includes 12 symbols. Here, the symbol may include an OFDM symbol (or a CP-OFDM symbol), an SC-FDMA symbol (or DFT-s-OFDM symbol).

One or a plurality of slots may be included in a subframe according to subcarrier spacings.

The following table 1 illustrates a subcarrier spacing configuration

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2-1 illustrates the number of symbols per slot, the number of slots per frame, and the number of slots per subframe (SF) according to the SCS when the extended CP is used.

TABLE 2-1

| SCS (15*2^ μ) | $N^{slot}_{symb}$ | $N^{frame, u}_{slot}$ | $N^{subframe, u}_{slot}$ |
|---|---|---|---|
| 60 KHz (μ = 2) | 12 | 40 | 4 |

In the NR system, OFDM(A) numerology (e.g., SCS, CP length, etc.) may be set to be different between a plurality of cells merged into one UE. Accordingly, an (absolute time) interval of a time resource (e.g., SF, slot or TTI) (for convenience, collectively referred to as time unit (TU)) including the same number of symbols may be set to be different between the merged cells.

Figure 7:
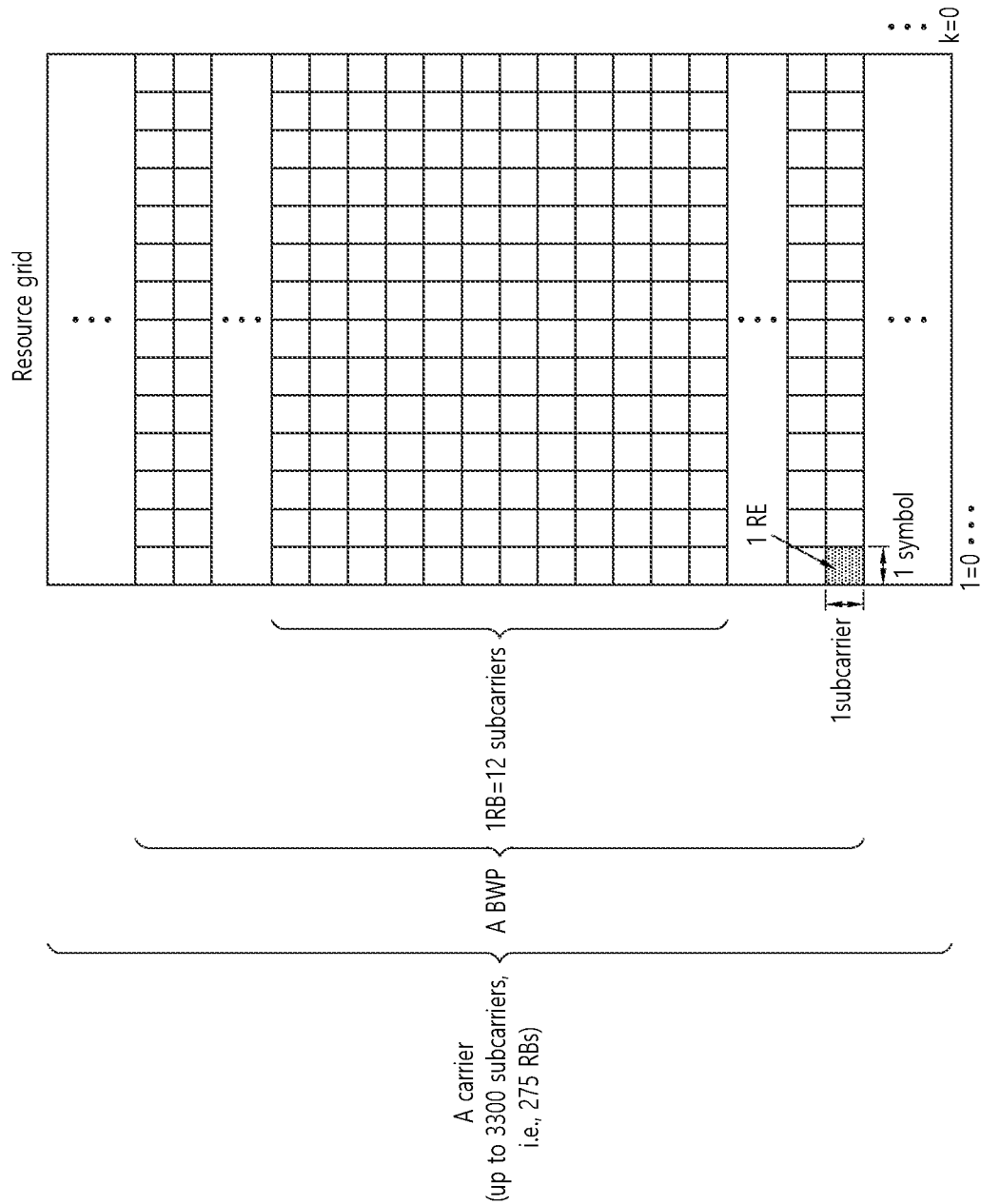
FIG. 7 illustrates a slot structure.

FIG. 7 illustrates a slot structure.

Referring to FIG. 7, a slot includes a plurality of symbols in the time domain. For example, when a normal CP is used, one slot may include 14 symbols; when an extended CP is used, one slot may include 12 symbols. Alternatively, when a normal CP is used, one slot may include 7 symbols; when an extended CP is used, one slot may include 6 symbols.

A carrier includes a plurality of subcarriers in the frequency domain. A resource block (RB) may be defined as a plurality of (e.g., 12) contiguous subcarriers in the frequency domain. A bandwidth part (BWP) may be defined as a plurality of contiguous (P)RBs in the frequency domain and may correspond to one numerology (e.g., SCS, CP length, or the like). A carrier may include up to N (e.g., 5) BWPs. Data communication may be performed through an activated BWP. Each element in a resource grid may be referred to as a resource element (RE) and may be mapped to one complex symbol.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 8:
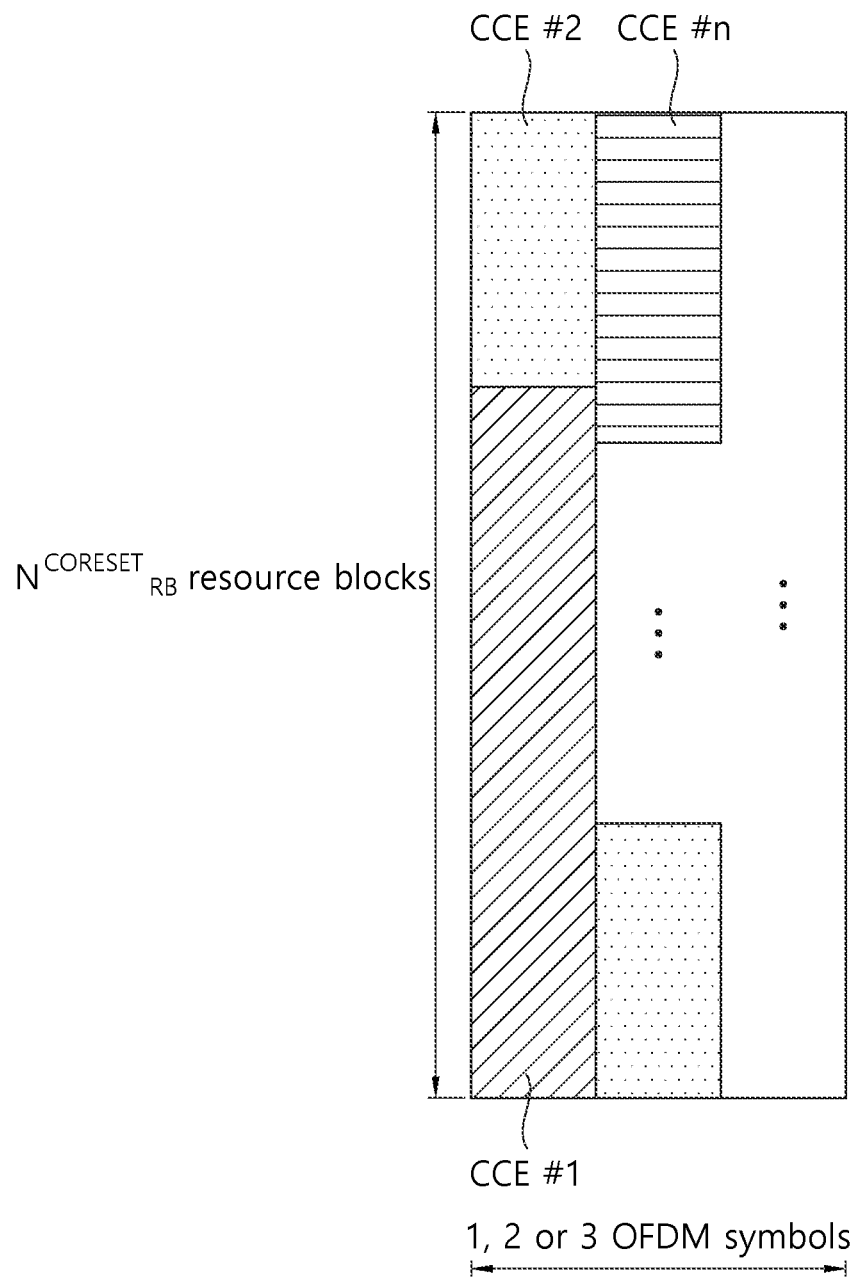
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
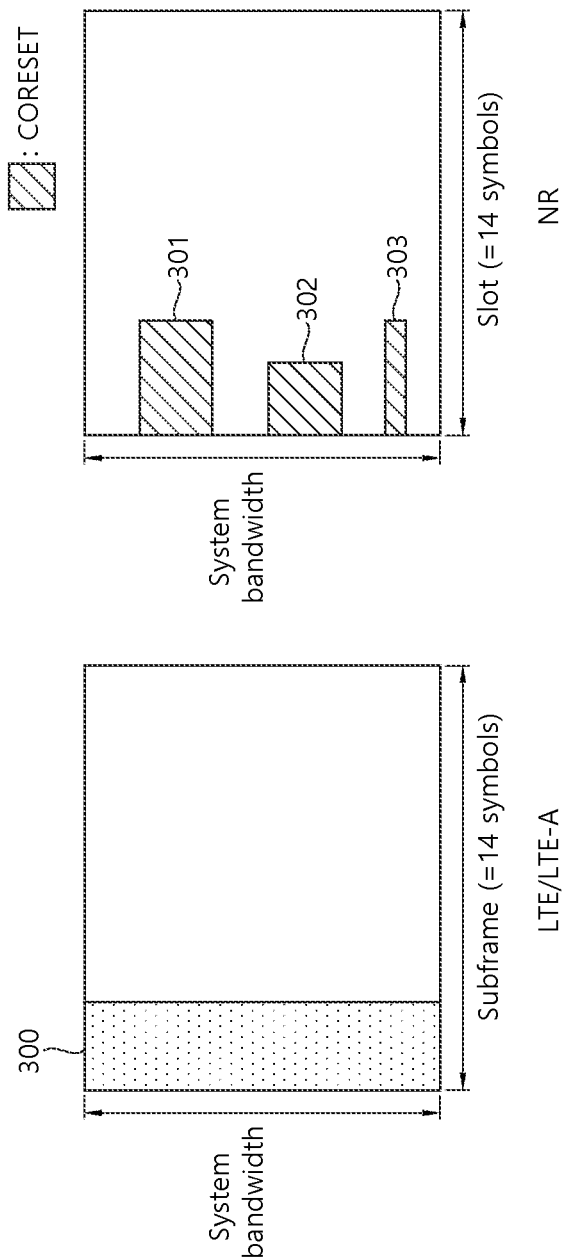
FIG. 9 is a diagram illustrating a difference between a related art control region and the CORESET in NR.

FIG. 9 is a diagram illustrating a difference between a related art control region and the CORESET in NR.

Referring to FIG. 9, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 9, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
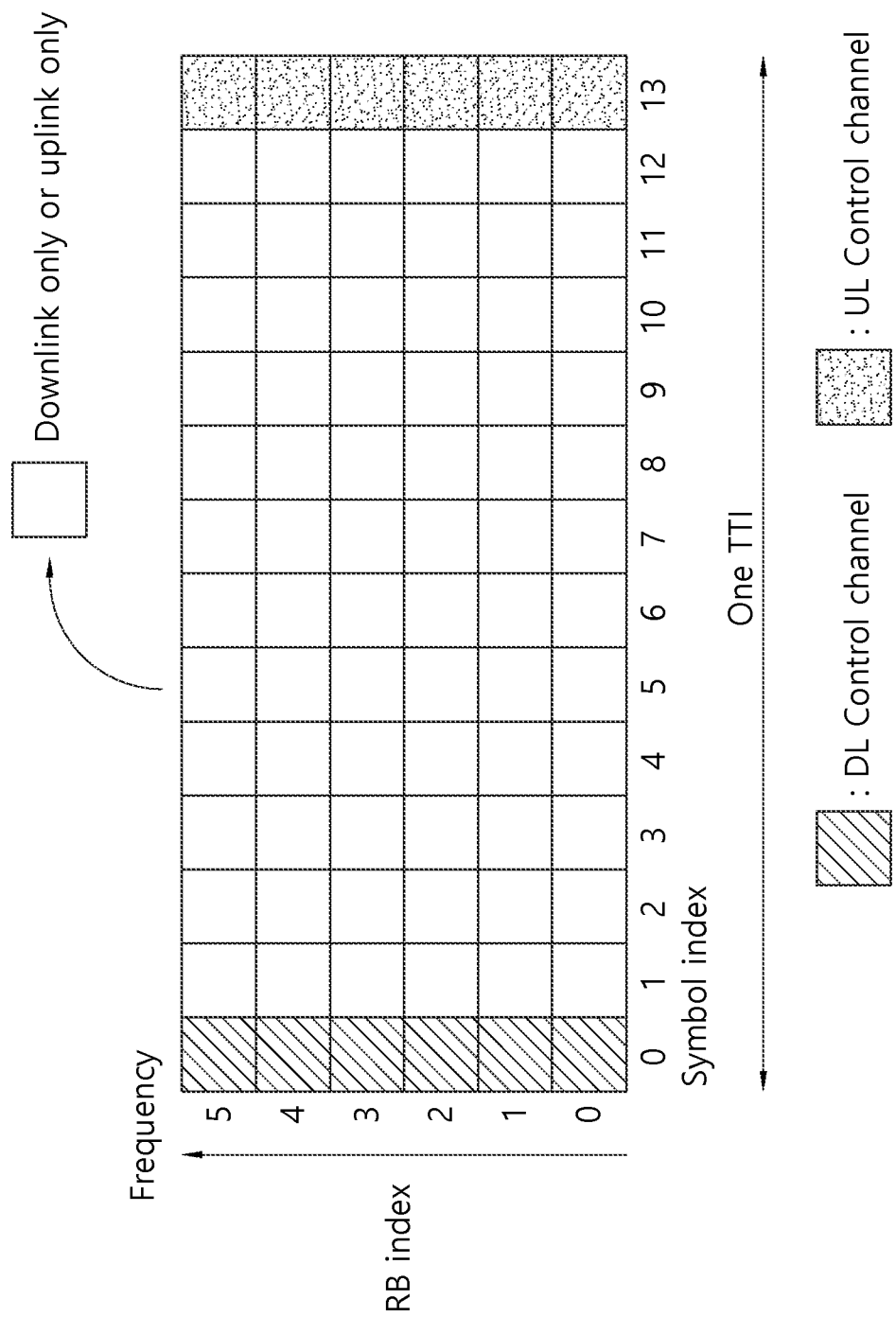
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

Figure 11:
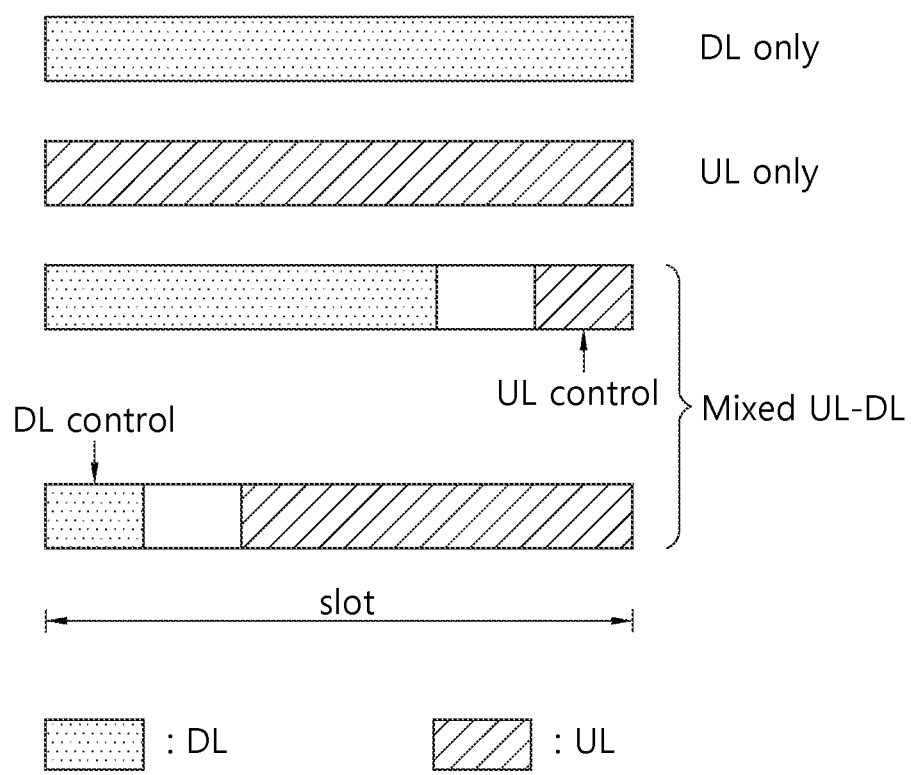
FIG. 11 illustrates an example of a self-contained slot structure.

FIG. 11 illustrates an example of a self-contained slot structure.

Referring to FIG. 11, one slot may have a self-contained structure in which all of a DL control channel, DL or UL data, and a UL control channel may be included. For example, first N symbols in a slot may be used to transmit a DL control channel (hereinafter, a DL control region), and the last M symbols in a slot may be used to transmit a UL control channel (hereinafter, a UL control region). N and M are each an integer of 0 or greater. A resource region (hereinafter, a data region) between the DL control region and the UL control region may be used for DL data transmission or UL data transmission. As an example, the following configuration may be considered. Each interval is listed in chronological order.

1. DL only configuration
2. UL only configuration
3. Mixed UL-DL configuration
   DL region+GP (Guard Period)+UL control region
   DL control region+GP+UL region Here, the DL region may be (i) a DL data region, (ii) a DL control area+a DL data region. The UL region may be (i) a UL data region, (ii) a UL data region+a UL control region.

A PDCCH may be transmitted in the DL control region, and a PDSCH may be transmitted in the DL data region. A PUCCH may be transmitted in the UL control region, and a PUSCH may be transmitted in the UL data region. On the PDCCH, downlink control information (DCI), for example, DL data scheduling information, UL data scheduling information, and the like may be transmitted. On the PUCCH, uplink control information (UCI), for example, positive acknowledgment/negative acknowledgment (ACK/NACK) information for DL data, channel state information (CSI), scheduling request (SR), and the like may be transmitted. The GP provides a time gap when the BS (or gNB) and the UE switch from a transmission mode to a reception mode or from the reception mode to the transmission mode. Some symbols at a time point at which the DL is switched to UL within a subframe may be set as a GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
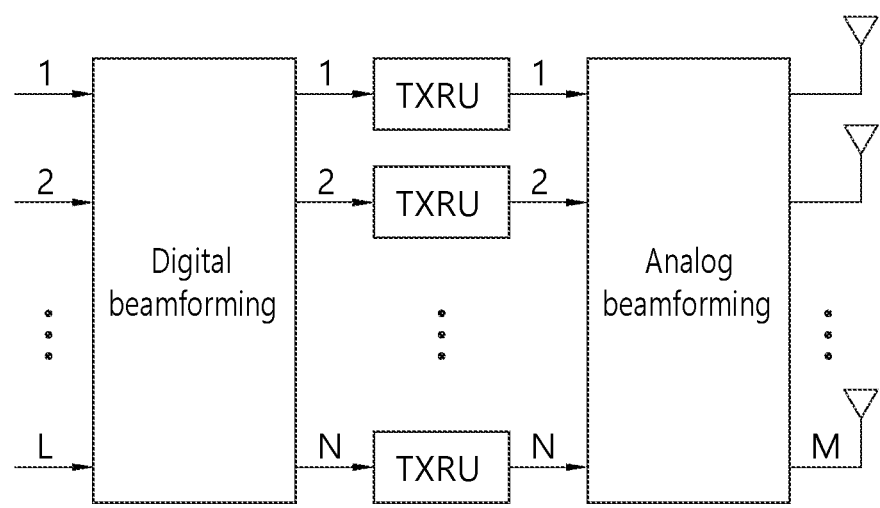
FIG. 12 is an abstract schematic diagram illustrating hybrid beamforming from the viewpoint of TXRUs and physical antennas.

FIG. 12 is an abstract schematic diagram illustrating hybrid beamforming from the viewpoint of TXRUs and physical antennas.

In FIG. 12, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 12, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 13:
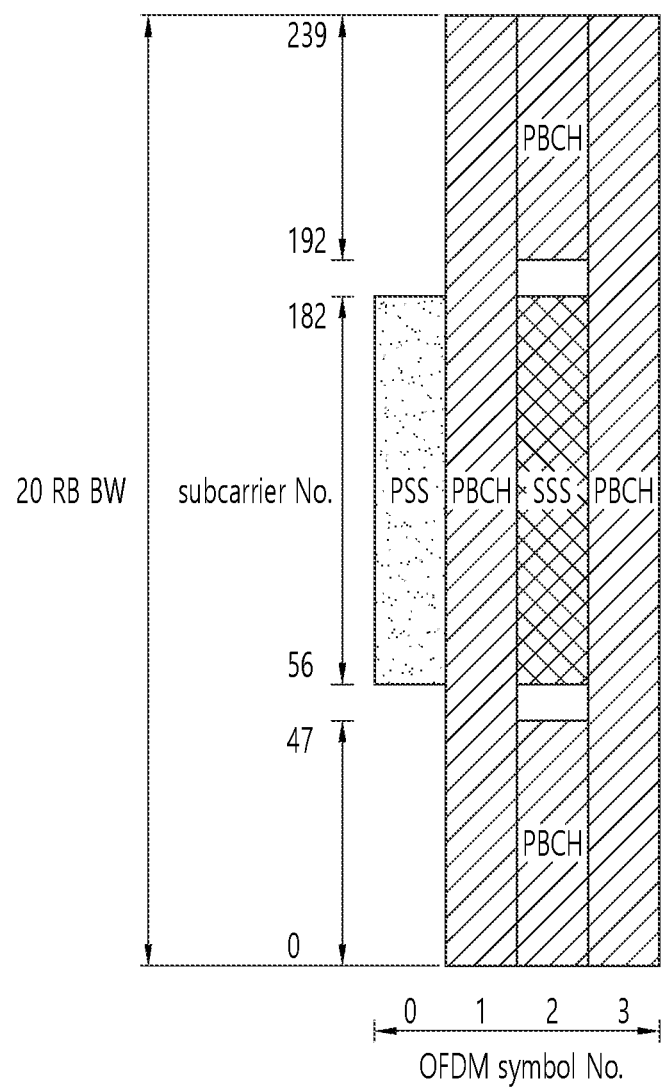
FIG. 13 schematically illustrates a synchronization signal/PBCH (SS/PBCH) block.

FIG. 13 schematically illustrates a synchronization signal/PBCH (SS/PBCH) block.

Referring to FIG. 13, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

Regarding a half frame having SS/PBCH blocks, the indexes of first symbols of candidate SS/PBCH blocks are determined according to the subcarrier spacing of SS/PBCH blocks described blow.

Case A—Subcarrier spacing of 15 kHz: The first symbols of the candidate SS/PBCH blocks have an index represented by {2, 8}+14*n where n=0, 1 for a carrier frequency of 3 GHz or less and n=0, 1, 2, 3 for a carrier frequency which is greater than 3 GHz and is less than or equal to 6 GHz.

Case B—Subcarrier spacing of 30 kHz: The first symbols of the candidate SS/PBCH blocks have an index represented by {4, 8, 16, 20}+28*n where n=0 for a carrier frequency of 3 GHz or less and n=0, 1 for a carrier frequency which is greater than 3 GHz and is less than or equal to 6 GHz.

Case C—Subcarrier spacing of 30 kHz: The first symbols of the candidate SS/PBCH blocks have an index represented by {2, 8}+14*n where n=0, 1 for a carrier frequency of 3 GHz or less and n=0, 1, 2, 3 for a carrier frequency which is greater than 3 GHz and is less than or equal to 6 GHz.

Case D—Subcarrier spacing of 120 kHz: The first symbols of the candidate SS/PBCH blocks have an index represented by {4, 8, 16, 20}+28*n where n=0, 1, 2, 3, 5, 6, 7, 8, 10, 11, 12, 13, 15, 16, 17, 18 fora carrier frequency greater than 6 GHz.

Case E—Subcarrier spacing of 240 kHz: The first symbols of the candidate SS/PBCH blocks have an index represented by {8, 12, 16, 20, 32, 36, 40, 44}+56*n where n=0, 1, 2, 3, 5, 6, 7, 8 for a carrier frequency greater than 6 GHz.

The candidate SS/PBCH blocks in the half frame are indexed in ascending order from 0 to L−1 on the time axis. The UE needs to determine two LSBs for L=4 of the SS/PBCH block index per half frame and three LSBs for L>4 from one-to-one mapping with the index of a DM-RS sequence transmitted in the PBCH. For L=64, the UE needs to determine three MSBs of the SS/PBCH block index per half frame by PBCH payload bits.

The indexes of SS/PBCH blocks in which the UE cannot receive other signals or channels in REs overlapping with REs corresponding to the SS/PBCH blocks may be set via a higher-layer parameter 'SSB-transmitted-SIB1'. Further, the indexes of SS/PBCH blocks per serving cell in which the UE cannot receive other signals or channels in REs overlapping with REs corresponding to the SS/PBCH blocks may be set via a higher-layer parameter 'SSB-transmitted'. The setting via 'SSB-transmitted' may override the setting via 'SSB-transmitted-SIB1'. The periodicity of a half frame for reception of SS/PBCH blocks per serving cell may be set via a higher-layer parameter 'SSB-periodicityServingCell'. When the UE does not receive the setting of the periodicity of the half frame for the reception of the SS/PBCH blocks, the UE needs to assume the periodicity of the half frame. The UE may assume that the periodicity is the same for all SS/PBCH blocks in a serving cell.

Figure 14:
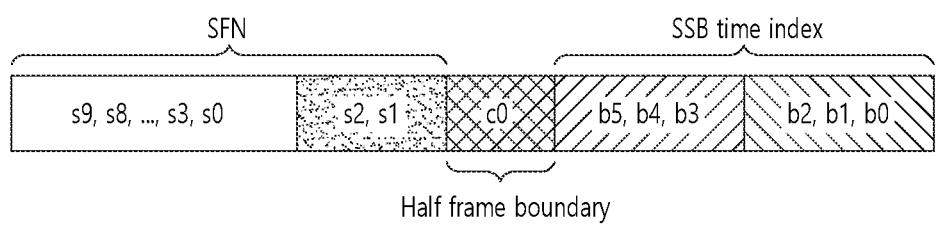
FIG. 14 illustrates a method for a UE to obtain timing information.

FIG. 14 illustrates a method for a UE to obtain timing information.

First, a UE may obtain six-bit SFN information through a master information block (MIB) received in a PBCH. Further, the UE may obtain a four-bit SFN in a PBCH transport block.

Second, the UE may obtain a one-bit half frame indicator as part of a PBCH payload. In less than 3 GHz, the half frame indicator may be implicitly signaled as part of a PBCH DMRS for Lmax=4.

Finally, the UE may obtain an SS/PBCH block index by a DMRS sequence and the PBCH payload. That is, the UE may obtain three bits of LSB of the SS block index by the DMRS sequence for a period of 5 ms. Also, three bits of MSB of timing information are explicitly carried in the PBCH payload (for more than 6 GHz).

In initial cell selection, the UE may assume that a half frame having SS/PBCH blocks occurs with a periodicity of two frames. Upon detecting an SS/PBCH block, when $k_{SSB} \leq 23$ for FR1 and $k_{SSB} \leq 11$ for FR2, the UE determines that a control resource set for a Type0-PDCCH common search space exists. When $k_{SSB} > 23$ for FR1 and $k_{SSB} > 11$ for FR2, the UE determines that there is no control resource set for the Type0-PDCCH common search space.

For a serving cell in which SS/PBCH blocks are not transmitted, the UE obtains time and frequency synchronization of the serving cell based on reception of SS/PBCH blocks on a PCell or PSCell of a cell group for the serving cell.

Hereinafter, acquisition of system information will be described.

System information (SI) is divided into a master information block (MIB) and a plurality of system information blocks (SIBs) where:

the MIB is transmitted always on a BCH according to a period of 40 ms, is repeated within 80 ms, and includes parameters necessary to obtain system information block type1 (SIB1) from a cell;

SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;

SIBs other than SIB1 are carried via system information (SI) messages transmitted on the DL-SCH. Each SI message is transmitted within a time-domain window (referred to as an SI window) periodically occurring;

For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
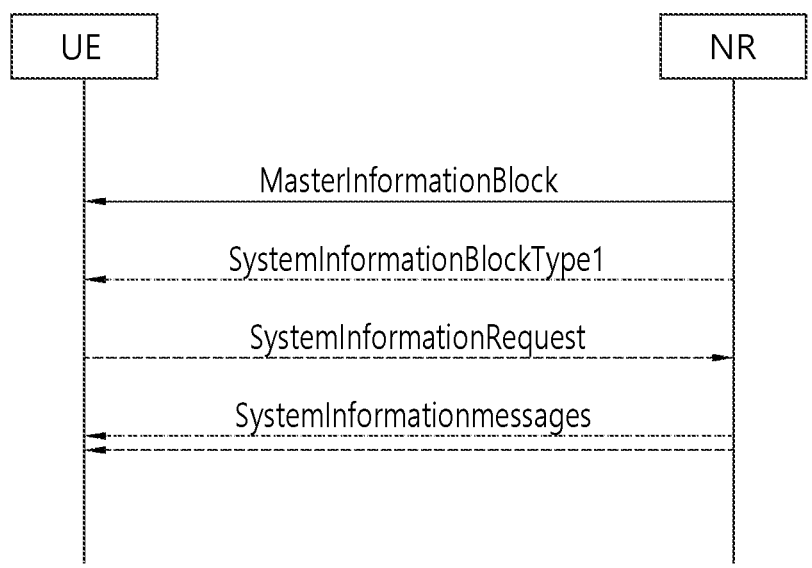
FIG. 15 illustrates an example of a system information acquisition process of a UE.

FIG. 15 illustrates an example of a system information acquisition process of a UE.

Referring to FIG. 15, the UE may receive an MIB from a network and may then receive SIB1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 4.

TABLE 4

| | Type of signal | Operation/obtained information |
| --- | --- | --- |
| Step 1 | Uplink PRACH preamble | To obtain initial beam Random election of RA-preamble ID |

TABLE 4-continued

|  | Type of signal | Operation/obtained information |
|---|---|---|
| Step 2 | Random access response on DL-SCH | Timing alignment information RA-preamble ID Initial uplink grant, temporary C-RNTI |
| Step 3 | Uplink transmission on UL-SCH | RRC connection request UE identifier |
| Step 4 | Downlink contention resolution | C-RNTI on PDCCH for initial access C-RNTI on PDCCH for RRC_CONNECTED UE |

Figure 16:
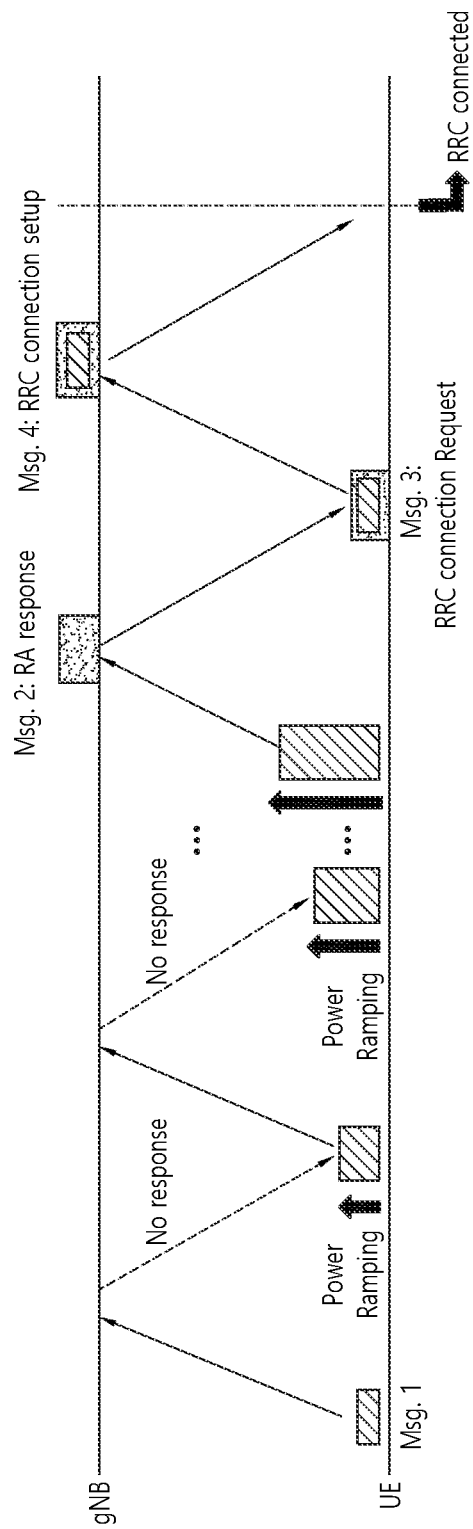
FIG. 16 illustrates a random access procedure.

FIG. 16 illustrates a random access procedure.

Referring to FIG. 16, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 17:
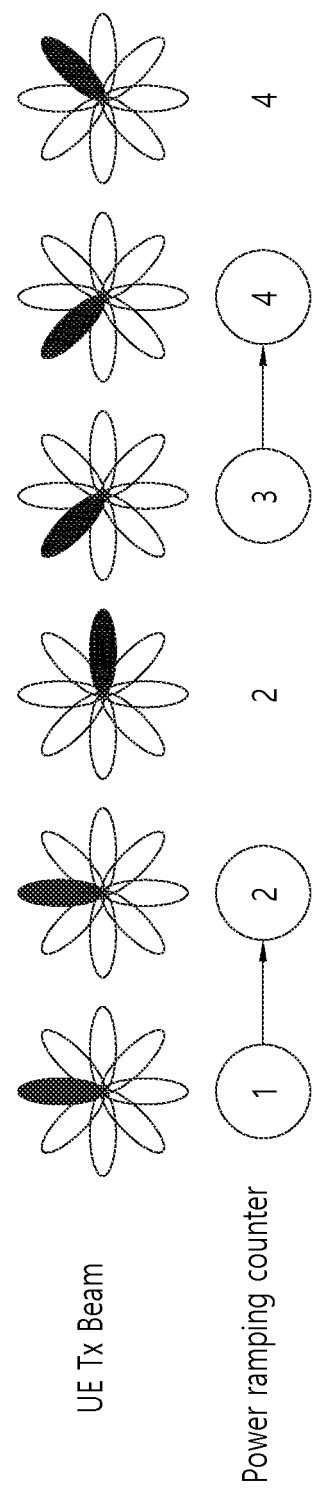
FIG. 17 illustrates a power ramping counter.

FIG. 17 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 17, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 18:
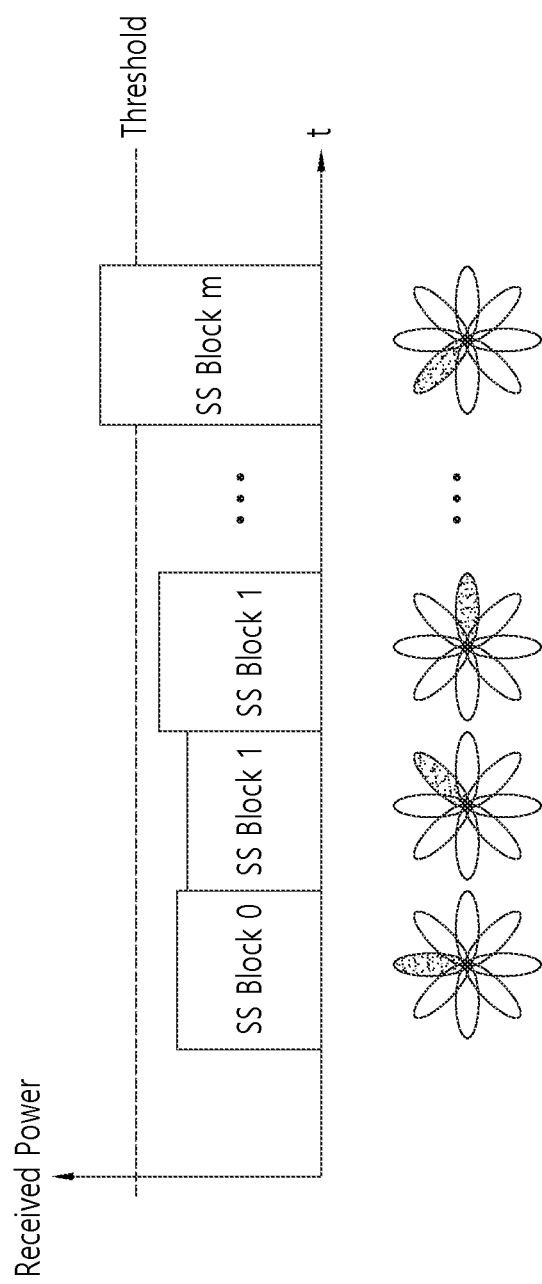
FIG. 18 illustrates the concept of the threshold of an SS block in a relationship with an RACH resource.

FIG. 18 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 18, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Further, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with (=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

Hereinafter, a channel access procedure according to licensed-assisted access (LAA) will be described. Here, LAA may refer to a method of performing data transmission and reception in an unlicensed band in combination with an unlicensed band (e.g., a Wi-Fi band). Here, a cell accessed by a UE in the unlicensed band may be referred to as a USCell (or LAA SCell), and a cell accessed by the UE in the licensed band may be referred to as a PCell.

First, a downlink channel access procedure will be described.

An eNB operating with LAA SCell(s) needs to perform the following channel access procedure to access channels on which transmission(s) of LSS SCell(s) are performed.

Hereinafter, a channel access procedure for transmission(s) including a PDSCH/PDCCH/EPDCCH will be described.

When a channel in an idle state is sensed first for a slot duration of a defer duration $T_d$ and a counter N is 0 in step 4, the eNB can perform transmission including PDSCH/PDCCH/EPDCCH on a carrier on which transmission(s) of LAA SCell(s) are performed. The counter N is adjusted by sensing a channel additional slot duration(s) according to the steps below.

1) N is set to $N=N_{init}$. Here, $N_{init}$ is an arbitrary number uniformly distributed between 0 and $CW_p$. Then, the procedure proceeds to step 4.
2) If N>0 and the eNB selects decreasing of the counter, N=N−1 is set.
3) When a channel with respect to an additional slot duration is sensed and the additional slot duration is idle, the procedure proceeds to step 4. If not, the procedure proceeds to step 5.
4) The procedure ends if N=0 and proceeds to step 2 if not.
5) The channel is sensed until a busy slot is detected within the additional defer duration $T_d$ or all slots of the additional defer duration $T_d$ are sensed as being idle.
6) If it is sensed that the channel is idle in all slot durations of the additional defer duration $T_d$, the procedure proceeds to step 4. If not, the procedure proceeds to step 5.

When the eNB has not perform transmission including PDSCH/PDCCH/EPDCCH on a carrier on which transmission(s) of LAA SCell(s) are performed after step 4 of the procedure, if the eNB is ready to transmit the PDSCH/PDCCH/EPDCCH, the eNB can perform transmission including PDSCH/PDCCH/EPDCCH on the carrier when it is sensed that the channel is idle in at least a slot duration Tis and the channel is idle in all slot durations of the defer duration $T_d$ immediately before the transmission. When the eNB senses that the channel is not idle in the slot duration Tis or senses that the channel is not idle in arbitrary slot durations of the defer duration $T_d$ immediately before intended transmission when the eNB initially senses the channel after the eNB is ready to perform transmission, the eNB senses that the channel is idle in slot durations of the defer duration $T_d$ and then proceeds to step 1.

The defer duration $T_d$ is configured as a duration of $T_f=16$ µs immediately after consecutive slot durations $m_p$. Here, each slot duration is $T_{sl}=9$ µs and $T_f$ includes an idle slot duration $T_{sl}$ at the start point of $T_f$.

The slot duration $T_{sl}$ is considered to be idle when the eNB senses the channel for the slot duration and power detected at least for 4 µs by the eNB in the slot duration is lower than an energy detection threshold $X_{Thresh}$. Otherwise, the slot duration Tis is considered to be busy.

$CW_p$ ($CW_{min,p} \leq CW_p \leq CW_{max,p}$) is a contention window. Application of $CW_p$ will be described in a contention window application procedure.

$CW_{min,p}$ and $CW_{max,p}$ are selected before step 1 of the foregoing procedure.

As illustrated in Table 5, $m_p$, $CW_{min,p}$, and $CW_{max,p}$ are based on a channel access priority class related to eNB transmission.

Adjustment of $X_{Thresh}$ will be described in an energy detection threshold adaptation procedure.

If N>0 in the aforementioned procedure, when the eNB transmits a discovery signal that does not include a PDSCH/PDCCH/EPDCCH, the eNB should not reduce N in slot duration(s) overlapping with discovery signal transmission.

The eNB should not perform continuous transmission on a carrier on which transmission(s) of LAA SCell(s) are performed for a duration that exceeds $T_{mcot,p}$ given in Table 5.

If absence of other technologies sharing carriers can be ensured in the long term (for example, according to a level of regulation) for p=3 and p=4, $T_{mcot,p}=10$ ms. If not, $T_{mcot,p}=8$ ms.

Table 5 shows a channel access priority class.

TABLE 5

| Channel access priority class (p) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Hereinafter, a channel access procedure for transmissions including discovery signal transmission(s) without a PDSCH will be described.

An eNB can transmit a discovery signal without a PDSCH on a carrier on which transmission(s) of LAA SCell(s) are performed if a transmission duration is less than 1 ms immediately after sensing that a channel is idle for at least a sensing interval of $T_{drs}=25$ µs. $T_{drs}$ is configured as $T_f=16$ µs immediately after one slot duration $T_{sl}=9$ µs and $T_f$ includes the idle slot duration $T_{sl}$ at the start point of $T_f$. If it is sensed that the channel is idle for slot durations of $T_{drs}$, the channel is considered to be idle for $T_{drs}$.

Hereinafter, a contention window adjustment procedure will be described.

When an eNB performs transmissions including a PDSCH related to channel access priority class p on a carrier, the eNB maintains a contention window value $CW_p$, and adjusts $CW_p$ for transmissions using the following steps before step 1 of the foregoing procedure.

1) For all priority classes $p \in \{1, 2, 3, 4\}$, $CW_p = CW_{min,p}$ is set.
2) If at least Z=80% of HARQ-ACK values corresponding to PDSCH transmission(s) is determined to be NACK in a reference subframe k, the procedure increases $CW_p$ to a next highest permitted value for all priority classes $p \in \{1, 2, 3, 4\}$ and remains in step 2. If not, the procedure proceeds to step 1.

The reference subframe k is a subframe in which most recent transmission performed by an eNB on a carrier expected to be available for at least some HARQ-ACK feedbacks starts.

The eNB needs to adjust the value of $CW_p$ for all priority classes $p \in \{1, 2, 3, 4\}$ only once on the basis of the given reference subframe k.

If $CW_p = CW_{max,p}$, the next highest permitted value $CW_{max,p}$ for $CW_p$ adjustment.

When Z is determined,
- If eNB transmission(s) available for HARQ-ACK feedback start at the second slot of the subframe k, HARQ-ACK values corresponding to PDSCH transmission(s) in a subframe k+1 can also be used by being added to HARQ-ACK values corresponding to PDSCH transmission(s) in the subframe k.
- If HARQ-ACK values correspond to PDSCH transmission(s) on an LAA SCell allocated according to an (E)PDCCH transmitted on the same LAA SCell,
  if the eNB has not detected HARQ-ACK feedback for PDSCH transmission or the eNB detects "DTX", "NACK/DTX" or "any" state, it is computed as NACK.

If HARQ-ACK values correspond to PDSCH transmission(s) on an LAA SCell allocated according to an (E)PDCCH transmitted on another serving cell,
  if HARQ-ACK feedback for PDSCH transmission is detected by the eNB, "NACK/DTX" or "any" state is computed as NACK and "DTX" state is ignored.
  If HARQ-ACK feedback for PDSCH transmission is not detected by the eNB,
    if PUCCH format 1b using channel selection is expected to be used by a UE, "NACK/DTX" state corresponding to "no transmission" is computed as NACK and "DTX" state corresponding to "no transmission" is ignored. If not, HARQ-ACK for PDSCH transmission is ignored.
If PDSCH transmission has two codewords, a HARQ-ACK value of each codeword is separately considered.
Bundled HARQ-ACK over M subframes is considered as M HARQ-ACK responses.

If the eNB performs transmission that includes a PDCCH/EPDCCH having DCI format 0A/0B/4A/4B and does not include a PDSCH associated with channel access priority class p on a channel starting at a time to, the eNB maintains the contention window value $CW_p$ and, adjusts $CW_p$ for transmissions using the following steps prior to step 1 of the above-described procedure.

1) For all priority classes $p \in \{1, 2, 3, 4\}$, $CW_p = CW_{min,p}$ is set.
2) When 10% or less of UL transport blocks scheduled by the eNB has been successfully received using type-2 channel access procedure within an interval from $t_0$ to $t_0 + T_{CO}$, the procedure increases $CW_p$ to a next highest permitted value for all priority classes $p \in \{1, 2, 3, 4\}$ and remains in step 2. If not, the procedure proceeds to step 1.

Here, $T_{CO}$ is calculated as described in a channel access procedure for uplink transmission(s) described below.

If $CW_p = CW_{max,p}$ is consecutively used K times for generation of $N_{init}$, $CW_p$ is reset to $CW_{min,p}$ only for a priority class p at which $CW_p = CW_{max,p}$ is consecutively used K times for generation of $N_{init}$. K is selected by the eNB from a set of values of $\{1, 2, \ldots, 8\}$ for each of priority classes $p \in \{1, 2, 3, 4\}$.

Hereinafter, an energy detection threshold adaptation procedure will be described.

An eNB which is accessing a carrier on which transmission(s) of LAA SCell(s) are performed needs to set the energy detection threshold $X_{Thresh}$ to be equal to or less than a maximum energy detection threshold $X_{Thresh\_max}$.

$X_{Thresh\_max}$ is determined as described later.

If absence of other technologies sharing carriers can be ensured in the long term (for example, according to a level of regulation), $X_{Thresh\_max} = \min\{T_{max} + 10 \text{ dB}, X_r\}$.

Xr is a maximum energy detection threshold defined in dB according to regulatory requirements when the regulatory requirements are defined. If not, $X_r = T_{max} + 10$ dB.

If not, $X_{Thresh\_max} = \max\{-72 + 10*\log 10(\text{BWMHz}/20 \text{ Mhz}) \text{ dBm}, \min\{T_{max}, T_{max} - T_A + (P_H + 10*\log 10(\text{BWMHz}/20 \text{ MHz}) - P_{TX})\}\}$.

Here,
$T_A = 10$ dB for transmission(s) including a PDSCH.
$T_A = 5$ dB for transmissions including discovery signal transmission(s) without a PDSCH.
$P_H = 23$ dBm.
PTX is the set maximum eNB output power in dBm with respect to a carrier.

An eNB uses the maximum transmission power set with respect to a single carrier irrespective of whether a single carrier transmission or multi-carrier transmission is used.

$T_{max}(\text{dBm}) = 10*\log 10(3.16228*10^{-8}(\text{mW/MHz})*\text{BWMHz(MHz)})$.

BWMHz is a single carrier bandwidth in MHz.

Hereinafter, a channel access procedure for transmission(s) on a plurality of carriers will be described.

An eNB can access a plurality of carriers on which transmission(s) of LAA SCells are performed according to one of type-A and type-B procedures described later.

Hereinafter, a type-A mult-carrier access procedure will be described.

An eNB needs to perform channel access on each carrier $c_i \in C$ according to the aforementioned channel access procedure for transmission(s) including a PDSCH/PDCCH/EPDCCH. Here, C is a set of carriers intended to be transmitted by the eNB, $i = 0, 1, \ldots, q-1$, and q is the number of carriers intended to be transmitted by the eNB.

The counter N described in the aforementioned channel access procedure for transmission(s) including a DSCH/PDCCH/EPDCCH is determined for each carrier $c_i(c\_i)$ and represented as $N_{c\_i}$. $N_{c\_i}$ is maintained in type A1 or type A2.

Hereinafter, type A1 will be described.

The counter N described in the aforementioned channel access procedure for transmission(s) including a DSCH/PDCCH/EPDCCH is determined for each carrier $c_i$ and represented as $N_{c\_i}$.

If absence of other technologies sharing carriers is not ensured in the long term (for example, according to a level of regulation), when the eNB stops transmission on any one carrier $c_j \in C$, the eNB can resume $N_{c\_i}$ reduction for each carrier $c_i \neq c_j$ after idle slots are sensed after waiting for a duration of $4T_{sl}$ or after $N_{c\_i}$ is reinitialized.

Hereinafter, type A2 will be described.

The counter N described in the aforementioned channel access procedure for transmission(s) including a DSCH/PDCCH/EPDCCH is determined for a carrier $c_j \in C$ and represented as $N_{c\_j}$. Here, $c_j$ is a carrier having a largest $CW_p$ value. For each carrier $c_i$, $N_{c\_i} = N_{c\_j}$. When the eNB stops transmission on any one carrier for which $N_{c\_j}$ has been determined, the eNB needs to reinitialize $N_{c\_i}$ for all carriers.

Hereinafter, a type-B multi-carrier access procedure will be described.

A carrier $c_j \in C$ is selected by an eNB as follows.
  The eNB uniformly randomly selects $c_j$ from C prior to respective transmissions on a plurality of carriers $c_i \in C$, or
  the eNB does not select $c_j$ more than once per second.

Here, C is a set of carriers intended to be transmitted by the eNB, i is $0, 1, \ldots, q-1$, and q is the number of carriers intended to be transmitted by the eNB.

For transmission on a carrier $c_j$,
  the eNB needs to perform channel access on a carrier $c_j$ according to the aforementioned channel access procedure including a PDSCH/PDCCH/EPDCCH having a modification for type B1 or type B described below.

For transmission on a carrier corresponding to $c_i \in C$ and $c_i \neq c_j$,
  for each carrier $c_i$, the eNB needs to sense the carrier $c_i$ for at least the sensing interval $T_{mc} = 25$ μs immediately before transmission on the carrier $c_j$ and the eNB can perform transmission on the carrier $c_i$ immediately after sensing that the carrier $c_i$ is idle for at least the sensing interval $T_{mc}$. The carrier $c_i$ is considered to be idle for $T_{mc}$ if it is sensed that a channel is idle for all time intervals in which idle sensing is performed on the carrier $c_j$ within the given interval $T_{mc}$.

The eNB should not continuously perform transmission on a carrier corresponding to $c_i \in C$, $c_i \neq c_j$ for a period that exceeds $T_{mcot,p}$ given in Table 5. Here, the value of $T_{mcot,p}$ is determined using a channel access parameter used for carriers $c_j$.

Hereinafter, type B1 will be described.

A single $CW_p$ value is maintained for a set C of carriers

When $CW_p$ is determined for channel access on a carrier $c_j$, step 2 described in the contention window adjustment procedure is modified as follows.

If at least Z=80% of HARQ-ACK values corresponding to PDSCH transmission(s) in reference subframes k of all carriers $c_i \in C$ is determined to be NACK, the procedure increases $CW_p$ to a next highest permitted value for respective priority classes $p \in \{1, 2, 3, 4\}$. If not, the procedure proceeds to step 1.

Hereinafter, type B2 will be described.

$CW_p$ is independently maintained for each carrier $c_i \in C$ using the aforementioned contention window adjustment procedure.

When $N_{init}$ is determined for carriers $c_j$, the value of $CW_p$ of a carrier $c_i \in C$ is used. Here, $c_{j1}$ is a carrier having a largest $CW_p$ value among all carriers in the set C.

Hereinafter, an uplink channel access procedure will be described.

A UE and an eNB which schedules uplink transmission(s) for the UE need to perform the following procedures to access channel(s) on which transmission(s) of LAA SCell(s) are performed for the UE.

Hereinafter, a channel access procedure for uplink transmission(s) will be described.

A UE can access a carrier on which uplink transmission(s) of LAA SCell(s) are performed according to one of type-1 and type-2 uplink channel access procedures. The type 1 channel access procedure and the type 2 channel access procedure will be described later.

If an uplink grant that schedules PUSCH transmission indicates the type-1 channel access procedure, the UE needs to use the type-1 channel access procedure in order to perform transmissions including PUSCH transmission unless otherwise described.

If the uplink grant that schedules PUSCH transmission indicates the type-2 channel access procedure, the UE needs to use the type-2 channel access procedure in order to perform transmissions including PUSCH transmission unless otherwise described.

The UE needs to use the type-1 channel access procedure when the UE performs SRS transmissions including no PUSCH transmission. An uplink channel access priority class p=1 is used for SRS transmissions including no PUSCH.

Table 6 shows a channel access priority class for uplink.

TABLE 6

| Channel access priority class (p) | $m_p$ | $CW_{min, p}$ | $CW_{max, p}$ | $T_{ulmcot, p}$ | Allowed $CW_p$ sizes |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 ms or 10 ms | {15, 31, 63, 127, 255, 511, 1023} |

TABLE 6-continued

| Channel access priority class (p) | $m_p$ | $CW_{min, p}$ | $CW_{max, p}$ | $T_{ulmcot, p}$ | Allowed $CW_p$ sizes |
|---|---|---|---|---|---|
| 4 | 7 | 15 | 1023 | 6 ms or 10 ms | {15, 31, 63, 127, 255, 511, 1023} |

Note 1:
$T_{ulmcot, p}$ = 10 ms if higher layer parameter 'absenceOfAnyOtherTechnology-r14' indicates TRUE for p = 3, 4 and $T_{ulmcot, p}$ = 6 ms if not.

Note 2:
When $T_{ulmcot, p}$ = 6 ms, this can be increased to 8 ms by inserting one or more gaps. A minimum gap duration must be 100 μs. A maximum duration before insertion of any gap must be 6 ms.

When "UL configuration for LAA" field configures "UL offset" l and "UL duration" d for a subframe n, if end of UE transmission occurs within or before a subframe n+l+d−1, the UE can use channel access type 2 for transmissions within a subframe n+l+i irrespective of channel access type signaled by an uplink grant for such subframes, and i=0, 1, . . . , d−1.

When the UE has scheduled transmissions including a PUSCH in a set of subframes $n_0, n_1, \ldots, n_{w-1}$ using PDCCH DCI format 0B/4B and has not accessed a channel for transmission in a subframe $n_k$, the UE needs to attempt transmission in a subframe $n_{k+1}$ according to a channel access type indicated in DCI. Here, $k \in \{0, 1, \ldots, w-2\}$ and w is the number of scheduled subframes indicated in the DCI.

If the UE is scheduled to perform transmissions which do not have gaps including a PUSCH in the set of subframes $n_0, n_1, \ldots, n_{w-1}$ using one or more PDCCH DCI formats 0A/0B/4A/4B and performs transmission in a subframe $n_k$ after accessing a carrier according to one of the type-1 and type-2 uplink channel access procedures, the UE can continue transmission in subframes after $n_k$. Here, $k \in \{0, 1, \ldots, w-1\}$.

If the start of UE transmission in a subframe n+1 is immediately after the end of UE transmission in a subframe n, the UE does not expect indication of different channel access types for transmissions in such subframes.

When the UE is scheduled to perform transmission without a gap in subframes $n_0, n_1, \ldots, n_{w-1}$ using one or more PDCCH DCI formats 0A/0B/4A/4B, has stopped transmission for or before a subframe $n_{k1}$ for which $k1 \in \{0, 1, \ldots, w-2\}$, and senses that a channel is continuously idle after transmission has been stopped, the UE can perform transmission in the following subframe $n_{k2}$ for which $k2 \in \{1, \ldots, w-1\}$ using the type-2 channel access procedure. If the channel sensed by the UE is not continuously idle after the UE stops transmission, the UE can perform transmission in the following subframe $n_{k2}$ for which $k2 \in \{1, \ldots, w-1\}$ using a type-1 channel access procedure having an uplink channel access priority class indicated in DCI corresponding to the subframe $n_{k2}$.

If the UE receives a UL grant, DCI indicates PUSCH transmission which starts in a subframe n using a type-1 channel access procedure and the UE has an ongoing type-1 channel access procedure before the subframe n, If an uplink channel access priority class value $p_1$ used for the continuous type-1 channel access procedure is equal to or greater than an uplink channel access priority class value $p_2$ indicated by DCI, the UE can perform PUSCH transmission in response to the UL grant by accessing a carrier using the continuous type-1 channel access procedure.

If the uplink channel access priority class value $p_1$ used for the continuous type-1 channel access procedure is less than the uplink channel access priority class value $p_2$ indicated by the DCI, the UE needs to end the continuous channel access procedure.

If the UE is scheduled to perform transmission on the set C of carriers in the subframe n, UL grants which schedule PUSCH transmissions on the set C of carriers indicate the type-1 channel access procedure, the same "PUSCH starting position" is indicated by all carriers in the set C of carriers, and carrier frequencies of the set C of carriers are a subset of predefined sets of carrier frequencies, the UE can perform transmission on a carrier $c_i \in C$ using the type-2 channel access procedure in the following case.

If the type-2 channel access procedure is performed on the carrier $c_i$ immediately before UE transmission on a carrier corresponding to $c_j \in C$, $i \neq j$ and when the UE has accessed a carrier $c_j$ using the type-1 channel access procedure, here, the carrier $c_j$ is uniformly randomly selected by the UE from the set C of carriers before the type-1 channel access procedure is performed on any carrier in the set C of carriers.

When an eNB has performed transmission on a carrier according to a channel access procedure for transmission(s) including a PDSCH/PDCCH/EPDCCH, the eNB can indicate the type-2 channel access procedure in DCI of a UL grant which schedules transmission(s) including a PUSCH on a carrier in the subframe n. Alternatively, when the eNB has performed transmission on a carrier according to the channel access procedure for transmission(s) including a PDSCH/PDCCH/EPDCCH, the eNB can indicate that the type-2 channel access procedure for transmission(s) including a PUSCH on a carrier can be performed in the subframe n using "UL configuration for LAA" field. Alternatively, when the subframe n is generated within a time interval that starts at $t_0$ and ends at $t_0 + T_{CO}$, the eNB can schedule transmissions including a PUSCH on a carrier in the subframe n, which follow transmission by the eNB on a carrier having a duration of $T_{short\_ul}=25$ μs. Here, $T_{CO}=T_{mcot,p}+T_g$, $t_0$ is a time instance at which an eNB starts transmission, the value of $T_{mcot,p}$ is determined by an eNB as described in the downlink channel access procedure, $T_g$ is a total time interval of gaps of all durations which exceed 25 μs generated between downlink transmission of an eNB and uplink transmission scheduled by the eNB and between arbitrary two uplink transmissions which start at $t_0$ and are scheduled by the eNB.

If continuous scheduling is possible, the eNB needs to schedule uplink transmissions between $t_0$ and $t_0+T_{CO}$ in consecutive subframes.

For uplink transmission on a carrier which follows transmission by the eNB on a carrier having a duration of $T_{short\_ul}=25$ μs, the UE can use the type-2 channel access procedure.

If the eNB indicates the type-2 channel access procedure for the UE in DCI, the eNB indicates a channel access priority class used to acquire access to a channel in the DCI.

Hereinafter, a type-1 uplink channel access procedure will be described.

The UE can perform transmission using the type-1 channel access procedure after sensing that a channel is idle first for a slot duration of a defer duration $T_d$ and after the counter N is 0 in step 4. The counter N is adjusted by sensing a channel with respect to additional slot duration(s) according to the following steps.

1) $N=N_{init}$ is set. Here, $N_{init}$ is an arbitrary number uniformly distributed between 0 and $CW_p$. Then, the procedure proceeds to step 4.
2) If N>0 and the eNB selects decrease of the counter, $N=N-1$ is set.
3) If a channel with respect to an additional slot duration is sensed and the additional slot duration is idle, the procedure proceeds to step 4. If not, the procedure proceeds to step 5.
4) The procedure ends if N=0 and proceeds to step 2 if not.
5) The channel is sensed until a busy slot is detected within an additional defer duration $T_d$ or it is sensed that all slots of the additional defer duration $T_d$ are idle.
6) If it is sensed that the channel is idle for all slot durations of the additional defer duration $T_d$, the procedure proceeds to step 4. If not, the procedure proceeds to step 5.

When the UE has not performed transmission including PUSCH transmission on a carrier on which transmission(s) of LAA SCell(s) are performed after step 4 of the above-described procedure, the UE can perform transmission including PUSCH transmission on the carrier if it is sensed that a channel is idle in at least the slot duration Tis when the UE is ready to perform transmission including PUSCH transmission and it is sensed that the channel is idle for all slot durations of the defer duration $T_d$ immediately before transmission including PUSCH transmission. If it is not sensed that the channel is idle in the slot duration Tis when the UE has initially sensed the channel after the UE is ready to perform transmission or it is not sensed that the channel is idle for arbitrary slot durations of the defer duration $T_d$ immediately before intended transmission including PUSCH transmission, the UE senses that the channel is idle for slot durations of the defer duration $T_d$ and then proceeds to step 1.

The defer duration $T_d$ is configured as a duration of $T_f=16$ μs immediately after consecutive slot durations $m_p$. Here, each slot duration is $T_{sl}=9$ μs and $T_f$ includes an idle slot duration $T_{sl}$ at the start point of $T_f$.

The slot duration Tis is considered to be idle if the UE senses the channel for the slot duration and power detected by the UE for at least 4 μs in the slot duration is less than the energy detection threshold $X_{Thresh}$. If not, the slot duration $T_{sl}$ is considered to be busy.

$CW_p$ ($CW_{min,p} \leq CW_p \leq CW_{max,p}$) is a contention window. Adjustment of $CW_p$ will be described in the contention window adjustment procedure.

$CW_{min,p}$ and $CW_{max,p}$ are selected before the aforementioned step 1.

$m_p$, $CW_{min,p}$ and $CW_{max,p}$ are based on a channel access priority class signaled to the UE as shown in Table 6.

$X_{Thresh}$ adaptation will be described in an energy detection threshold adaptation procedure which will be described later.

Hereinafter, a type-2 UL channel access procedure will be described.

If an uplink UE uses a type-2 channel access procedure for transmission including PUSCH transmission, the UE can perform transmission including PUSCH transmission immediately after sensing that a channel is idle for at least a sensing interval of $T_{short\_ul}=25$ μs. $T_{short\_ul}$ is configured as a duration of $T_f=16$ μs immediately followed by one shot duration of $T_{sl}=9$ μs, and $T_f$ includes an idle slot duration $T_{sl}$ at the start point of $T_f$. If a channel is sensed as being idle for slot durations of $T_{short\_ul}$, the channel is considered to be idle for $T_{short\_ul}$.

Hereinafter, the contention window adjustment procedure will be described.

If a UE performs transmission using the type-1 channel access procedure associated with a channel access priority class p on a carrier, the UE needs to maintain a contention window value $CW_p$ and adjust $CW_p$ for such transmissions before step 1 of the aforementioned type-1 uplink channel access procedure using the following procedures.

If an NDI value with respect to at least one HARQ procedure associated with HARQ_ID ref is toggled, $CW_p = CW_{min,p}$ is set for all priority classes $p \in \{1, 2, 3, 4\}$.

If not, $CW_p$ is increased to a next highest permitted value for all the priority classes $p \in \{1, 2, 3, 4\}$.

HARQ_ID ref is a HARQ process ID of UL-SCH in a reference subframe $n_{ref}$. The reference subframe $n_{ref}$ is determined as follows.

When the UE has received an uplink grant in a subframe $n_g$, a subframe $n_w$ is a most recent subframe prior to a subframe $n_g-3$ in which the UE has transmitted UL-SCH using the type-1 channel access procedure.

If the UE performs transmission which starts in a subframe $n_0$ without gaps and includes UL-SCH in subframes $n_0, n_1, \ldots, n_w$, the reference subframe $n_{ref}$ is the subframe $n_0$, If not, the reference subframe $n_{ref}$ is the subframe $n_w$.

If the UE is scheduled to perform transmissions including PUSCH transmission without gaps in a set of subframes $n_0, n_1, \ldots, n_{w-1}$ using the type-1 channel access procedure and any transmission including PUSCH transmission cannot be performed in the set of subframes, the UE can maintain the value of $CW_p$ without changing the same for all priority classes $p \in \{1, 2, 3, 4\}$.

If a reference subframe for finally scheduled transmission is also $n_{ref}$, the UE can maintain the value of $CW_p$ for all priority classes $p \in \{1, 2, 3, 4\}$ using the type-1 channel access procedure as in finally scheduled transmission including PUSCH transmission.

If $CW_p = CW_{max,p}$, a next highest permitted value for $CW_p$ adjustment is $CW_{max,p}$.

If $CW_p = CW_{max,p}$ is consecutively used K times for generation of $N_{init}$, $CW_p$ is reset to $CW_{min,p}$ only for a priority class p at which $CW_p = CW_{max,p}$ is consecutively used K times for generation of $N_{init}$. K is selected by the UE from a set of values of $\{1, 2, \ldots, 8\}$ for each of the priority classes $p \in \{1, 2, 3, 4\}$.

Hereinafter, energy detection threshold adaptation procedure.

A UE which has accessed a carrier on which transmission(s) of LAA SCell(s) are performed needs to set the energy detection threshold $X_{Thresh}$ to below a maximum energy detection threshold $X_{Thresh}$ max.

$X_{Thresh\_max}$ is determined as follows.

If the UE is configured by higher layer parameter "maxEnergyDetectionThreshold-r14", $X_{Thresh\_max}$ is set to the same value as a value signaled by the higher layer parameter.

If not, the UE needs to determine $X'_{Thresh\_max}$ according to a default maximum energy detection threshold computation procedure which will be described later.

If the UE is configured by higher layer parameter "energyDetectionThresholdOffset-r14", $X_{Thresh\_max}$ is set by applying $X'_{Thresh\_max}$ according to an offset value signaled by the higher layer parameter.

If not, the UE needs to set $X_{Thresh\_max} = X'_{Thresh\_max}$.

Hereinafter, the default maximum energy detection threshold computation procedure will be described.

If higher layer parameter "absenceOfAnyOtherTechnology-r14" indicates "TRUE":

$X'_{Thresh\_max} = \min\{T_{max}+10 \text{ dB}, X_r\}$, here, $X_r$ is a maximum energy detection threshold defined in dBm according to regulatory requirements when the regulatory requirements are defined. If not $X_r = T_{max}+10$ dB.

If not, $X'_{Thresh\_max} = \max\{-72+10*\log 10(\text{BWMHz}/20 \text{ MHz}) \text{ dBm}, \min\{T_{max}, T_{max}-T_A+(P_H \pm 10*\log 10(\text{BWMHz}/20 \text{ MHz})-P_{TX}\}\}$ Here, $T_A = 10$ dB $P_H = 23$ dBm $P_{TX}$ is set to $P_{CMAX\_H,c}$.

$T_{max}(\text{dBm}) = 10*\log 10(3.16228*10^{-8}(\text{mW/MHz})*\text{BWMHz}(\text{MHz}))$ BWMHz is a single carrier bandwidth in MHz.

Hereinafter, a wireless communication system supporting an unlicensed band will be described in detail.

With demands for greater communication capacity from a growing number of communication devices, the efficient utilization of a limited frequency band is becoming an increasingly important requirement for future wireless communication systems. Cellular communication systems, such as LTE/NR systems, are also considering using an unlicensed band, for example a 2.4 GHz band generally used by an existing Wi-Fi system or 5 GHz and 60 GHz bands newly emerging, for traffic offloading.

FIG. 19 illustrates an example of a wireless communication system supporting an unlicensed band.

Referring to FIG. 19, a cell operating in a license band (hereinafter, also referred to as an L-band) may be defined as an L-cell, and a carrier of the L-cell may be referred to as a (DL/UL) LCC. Further, a cell operating in an unlicensed band (hereinafter, also referred to as a U-band) may be defined as a U-cell, and a carrier of the U-cell may be referred to as a (DL/UL) UCC. A carrier/carrier-frequency of a cell may refer to an operating frequency (e.g., center frequency) of the cell. A cell/carrier (e.g., component carrier (CC)) may be collectively referred to as a cell.

As illustrated in FIG. 19(*a*), when a UE and a base station transmit and receive signals through an LCC and a UCC which are subjected to carrier aggregation, the LCC may be set as a primary CC (PCC) and the UCC may be set as a secondary CC (SCC). Alternatively, as illustrated in FIG. 19(*b*), the UE and the base station may transmit and receive signals through a single UCC or a plurality of UCCs subjected to carrier aggregation. That is, the UE and the base station may transmit and receive signals only through a UCC(s) without any LCC. In the unlicensed band of the NR system, both the NSA mode and the SA mode may be supported.

Hereinafter, a signal transmission/reception operation in an unlicensed band described above in the present disclosure may be performed based on all the above-described deployment scenarios (unless specified otherwise).

In an unlicensed band, a method of performing wireless transmission and reception through contention between communication nodes may be assumed. Therefore, it is required that each communication node performs channel sensing before transmitting a signal to verify that a different communication node is not performing signal transmission.

For convenience, this operation is referred to as a listen-before-talk (LBT) or a channel access procedure (CAP).

In particular, an operation of verifying whether the different communication node is performing signal transmission may be referred to as carrier sensing (CS), and a case where it is determined that the different communication node is not performing signal transmission may be referred to as a clear channel assessment (CCA) having been verified.

A base station (eNB) or a UE of an LTE/NR system also needs to perform an LBT for signal transmission in an unlicensed band (U-band). When the base station or the UE of the LTE/NR system transmits a signal, other communication nodes, such as a Wi-Fi node, also need to perform an LBT so as not to cause interference. For example, in the Wi-Fi standard (801.11ac), a CCA threshold is defined as −62 dBm for a non-Wi-Fi signal and as −82 dBm for a Wi-Fi signal. That is, a station (STA, UE) or an access point (AP) does not transmit a signal so as not to cause interference when a signal other than a Wi-Fi signal is received with a power of −62 dBm or more for example.

For the UE to transmit uplink data in the unlicensed band, first, the base station needs to succeed in an LBT for UL grant transmission in the unlicensed band, and the UE also needs to succeed in an LBT for UL data transmission. That is, the UE can attempt UL data transmission only when both LBTs of the base station and the UE are successful.

Figure 20:
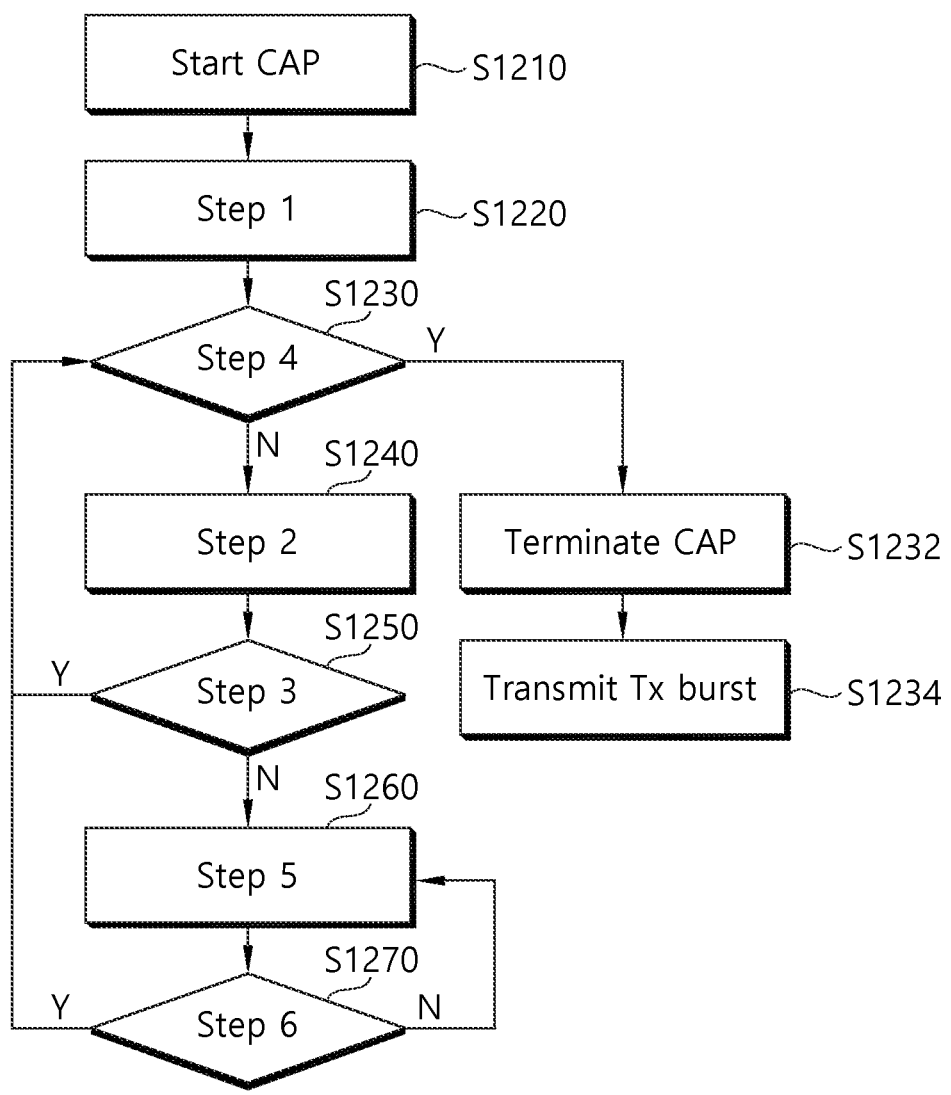
FIG. 20 is a flowchart of a first downlink CAP operation for transmitting a downlink signal through an unlicensed band of a BS.

FIG. 20 is a flowchart of a first downlink CAP operation for transmitting a downlink signal through an unlicensed band of a BS.

Referring to FIG. 20, the BS may initiate a channel access procedure (CAP) for downlink signal transmission (e.g., signal transmission including PDSCH/PDCCH) through an unlicensed band (S1210). The BS may randomly select a backoff counter N in a contention window (CW) according to step 1. Here, the value N is set to the initial value $N_{init}$ (S1220). $N_{init}$ is selected as a random value among values between 0 and $CW_p$. Subsequently, if the backoff counter value N is 0 according to step 4 (S1230; Y), the BS terminates the CAP process (S1232). Subsequently, the BS may perform Tx burst transmission including the PDSCH/PDCCH (S1234). Meanwhile, if the backoff counter value is not 0 (S1230; N), the BS decreases the backoff counter value by 1 according to step 2 (S1240). Subsequently, the BS determines whether the channel of U-cell(s) (the cell in the unlicensed band) is idle (S1250). If the channel is idle (S1250; Y), the BS determines whether a backoff counter value is 0 (S1230). If the channel is not idle in step S1250, that is, if the channel is busy (S1250; N), the BS determines whether the corresponding channel is idle for a deter duration $T_d$ (25 usec or more) longer than a slot time (e.g., 9 usec) according to step 5 (S1260). If the channel is idle in the deter duration (S1270; Y), the BS may resume the CAP process again. Here, the deter duration may consist of 16 μsec interval and mp consecutive slot times which immediately follow (e.g., 9 usec). Meanwhile, if the channel is busy in the deter duration (S1270; N), the BS performs step S1260 again to determine whether the channel of the U-cell(s) is idle in a new deter duration. The mp, minimum CW, maximum CW, maximum channel occupancy time (MCOT), and allowed CW sizes applied to the CAP according to the channel access priority class may be referred to Table 5 above.

A size of a contention window applied to the first downlink CAP may be determined based on various methods. For example, the size of the contention window may be adjusted based on a probability that HARQ-ACK values corresponding to PDSCH transmission(s) within a certain time period (e.g., a reference TU) are determined as NACK. When the BS transmits a downlink signal including a PDSCH related to a channel access priority class p on a carrier, if a probability that HARQ-ACK values corresponding to the PDSCH transmission(s) within a reference time interval/opportunity k (or reference slot k) are determined as NACK is at least Z=80%, the BS increases the CW values set for each priority class to a next higher allowed order. Alternatively, the BS maintains the CW values set for each priority class as initial values. The reference time interval/opportunity (or reference slot) may be defined as a start time interval/opportunity (or start slot) in which the most recent signal transmission on a corresponding carrier in which at least some of the HARQ-ACK feedback is available is performed.

Meanwhile, the BS may perform downlink signal transmission (e.g., signal transmission including discovery signal transmission and not including PDSCH) through an unlicensed band based on the second downlink CAP method to be described later.

When a length of the signal transmission period of the BS is less than 1 ms, the BS may transmit a downlink signal (e.g., including discovery signal transmission and not including PDSCH) through the unlicensed band immediately after the corresponding channel is sensed to be idle during at least a sensing period ($T_{drs}$=25 μs). Here, $T_{drs}$ includes an interval $T_f$ (=16 us) immediately following one slot section $T_{sl}$=9 μs.

A third downlink CAP method is as follows.

The BS may perform the following CAP to transmit a downlink signal through multiple carriers in an unlicensed band.

1) Type A: The BS performs CAP on multiple carriers based on a counter N (counter N considered in CAP) defined for each carrier, and performs downlink signal transmission based thereon.

Type A1: Counter N for each carrier is determined independently of each other, and downlink signal transmission through each carrier is performed based on the counter N for each carrier.

Type A2: Counter N for each carrier is determined as a value N for a carrier having the largest contention window size, and downlink signal transmission through a carrier is performed based on a counter N for each carrier.

2) Type B: The BS performs a CAP based on the counter N only on a specific carrier among a plurality of carriers, determines whether a channel for the other remaining carrier is idle before signal transmission on the specific carrier, and performs downlink signal transmission.

Type B1: A single contention window size is defined for a plurality of carriers, and the BS uses the single contention window size when performing a CAP based on the counter N for a specific carrier.

Type B2: The contention window size is defined for each carrier, and the largest contention window size among the contention window sizes is used when determining the $N_{init}$ value for a specific carrier.

The UE performs contention-based CAP for uplink signal transmission in the unlicensed band. The UE performs a type 1 or type 2 CAP to transmit an uplink signal in the unlicensed band. In general, the UE may perform the CAP (e.g., type 1 or type 2) configured by the BS for uplink signal transmission.

Figure 21:
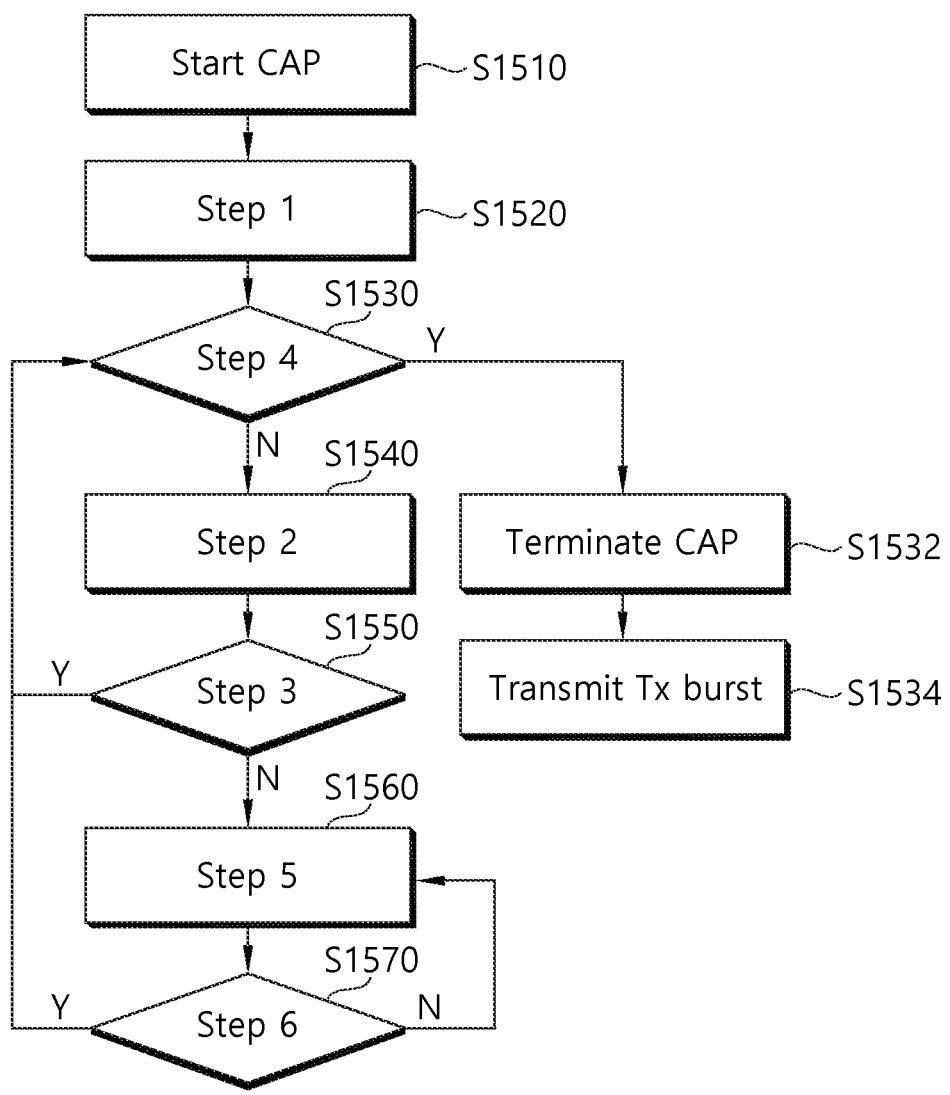
FIG. 21 is a flowchart of a type 1 CAP operation of a UE for transmitting an uplink signal.

FIG. 21 is a flowchart of a type 1 CAP operation of a UE for transmitting an uplink signal.

The UE may initiate a channel access procedure (CAP) for signal transmission through an unlicensed band (S1510). The UE may randomly select a backoff counter N within a contention window (CW) according to step 1. Here, the Value N is set to an initial value $N_{init}$ (S1520). $N_{init}$ is selected as an arbitrary value from 0 to $CW_p$. Subsequently, if the backoff counter value N is 0 according to step 4 (S1530; Y), the UE terminates the CAP process (S1532). Subsequently, the UE may perform Tx burst transmission (S1534). Meanwhile, if the backoff counter value is not 0 (S1530; N), the UE decreases the backoff counter value by 1 according to step 2 (S1540). Subsequently, the UE determines whether the channel of the U-cell(s) (the cell in the unlicensed band) is idle (S1550). If the channel is idle (S1550; Y), the UE determines whether the backoff counter value is 0 (S1530). If, however, the channel is not idle in step S1550, that is, if the channel is busy (S1550; N), the UE determines whether the corresponding channel is idle in a defer duration $T_d$ (25 usec or more) longer than a slot time (e.g., 9 usec) according to step 5 (S1560). If the channel is idle in the deter duration (S1570; Y), the UE may resume the CAP process again. Here, the deter duration may consist of 16 µsec intervals and mp consecutive slot times that immediately follow (e.g., 9 usec). Meanwhile, if the channel is busy in the deter duration (S1570; N), the UE performs step S1560 again and determines whether the channel is idle in a new deter duration.

The mp, minimum CW, maximum CW, maximum channel occupancy time (MCOT), and allowed CW sizes applied to the CAP according to the channel access priority class may be referred to Table 6 above.

The contention window size applied to the type 1 uplink CAP may be determined based on various methods. As an example, the contention window size may be adjusted based on whether to toggle a new data indicator (NDI) value for at least one HARQ processor related to HARQ_ID ref, which is a HARQ process ID of UL-SCH within a certain time period (e.g., a reference TU). In a case in which the UE performs signal transmission using the type 1 channel access procedure related to the channel access priority class p on the carrier, when the NDI value for at least one HARQ process related to HARQ_ID ref is toggled, the UE sets $CW_p$ to $CW_{min,p}$ ($CW_p = CW_{min,p}$) for all priority classes $p \in \{1, 2, 3, 4\}$, or otherwise, the UE increases $CW_p$ for all priority classes $p \in \{1, 2, 3, 4\}$ to a next highest allowed value.

The reference time interval/opportunity $n_{ref}$ (or reference slot $n_{ref}$) may be determined as follows.

In a case in which the UE receives UL grant in the time interval/opportunity (or slot) $n_g$, starts from the time interval/opportunity (or slot) no within a time interval/opportunity (or slot) $n_0, n_1, \ldots n_w$, and performs transmission including a gap-free UL-SCH (here, a time interval/opportunity (or slot) $n_w$ is the latest time interval/opportunity (or slot) before a time interval/opportunity (or slot) $n_g-3$ in which the UE transmitted UL-SCH based on the type 1 CAP), the reference time interval/opportunity (or slot) $n_{ref}$ is a time interval/opportunity (or slot) no.

(2) Type 2 Uplink CAP Method

When the UE uses type 2 CAP to transmit an uplink signal (e.g., a signal including a PUSCH) through an unlicensed band, the UE may transmit the uplink signal (e.g., the signal including a PUSCH) through the unlicensed band immediate after sensing that a channel is idle for at least a sensing interval $T_{short\_ul}=25$ µs. $T_{short\_ul}$ may include an interval $T_f=16$ µs immediately after one slot interval $T_{sl}=9$ µs. $T_f$ includes an idle slot period Tis at a start point of the $T_f$.

Further, in the LTE system, a delay of at least 4 msec is required between an UL grant and UL data scheduled through the UL grant. Therefore, if a different transmission node coexisting in the unlicensed band achieves access first during the corresponding time, scheduled UL data transmission may be delayed. For this reason, a method for increasing efficiency of UL data transmission in the unlicensed band is under discussion.

In LTE licensed-assisted access (LAA), a base station may report a subframe or slot allowed/available for an autonomous uplink (AUL) to a UE through a bitmap of X bits (e.g., X=40 bits), and thus the base station may report autonomous UL transmission of transmitting UL data without a UL grant to the UE.

When receiving an indication of automatic transmission activation (auto Tx activation), the UE can transmit uplink data without a UL grant in the subframe or slot indicated by the bitmap. Just as the base station transmits a PDCCH, which is scheduling information necessary for decoding, when transmitting a PDSCH to the UE, the UE may transmit AUL UCI, which is information necessary for the base station to decode a PUSCH, when transmitting the PUSCH in an AUL.

The AUL UCI may include information necessary to receive an AUL PUSCH, such as an HARQ ID, a new data indicator (NDI), a redundancy version (RV), a starting AUL subframe (SF) position, and a last AUL SF position, and information for sharing a UE-initiated COT with the base station.

Specifically, sharing a UE-initiated COT with the base station refers to an operation that enables the UE to transfer some of occupied channels to the base station through a random-backoff category-4 LBT (or type-1 channel access procedure) and the base station to transmit a PDCCH (and/or PDSCH) when a channel is idle through a one-shot LBT of 25 usec (using a timing gap provided by the UE emptying the last symbol).

In NR, in order to support UL transmission with relatively high reliability and low latency, the base station also supports time-domain, frequency-domain, and code-domain resources as configured grant type 1 (hereinafter, also referred to as type 1) and configured grant type 2 (hereinafter, also referred to as type 2) configured for the UE through i) a higher-layer signal (e.g., RRC signaling) or ii) a combination of a higher-layer signal and an L1 (physical-layer) signal (e.g., DCI).

The UE may perform UL transmission using a resource configured as type 1 or type 2 without receiving a UL grant from the base station. For type 1, all of the period of a configured grant, an offset relative to system frame number (SFN)=0, time/frequency resource allocation, the number of repetitions, a DMRS parameter, a modulation and coding scheme (MCS)/transport block size (TBS), a power control parameter and the like may be configured only with a higher-layer signal, such as RRC signaling, without an L1 signal. For type 2, the period of a configured grant, and a power control parameter are configured through a higher-layer signal, such as RRC signaling, and remaining resource information (e.g., an offset of initial transmission timing, time/frequency resource allocation, a DMRS parameter, an MCS/TBS, and the like) is indicated through activation DCI, which is an L1 signal.

The AUL of LTE LAA and the configured grant method of NR are significantly different in an HARQ-ACK feedback transmission method for a PUSCH transmitted by a UE without a UL grant and whether there is UCI transmitted together with a PUSCH.

Regarding an HARQ-ACK feedback transmission method, explicit HARQ-ACK feedback information is transmitted through AUL-downlink feedback information (DFI) in LTE LAA, whereas an HARQ process is (implicitly) determined using a symbol index, a symbol period, and an equation of the number of HARQ processes in the configured grant method of NR.

Regarding UCI transmitted together with a PUSCH, in LTE LAA, information including an HARQ ID, an NDI, and an RV is transmitted as AUL-UCI whenever an AUL PUSCH is transmitted. In the configured grant method of NR, a UE is recognized/identified using a time/frequency resource and a DMRS resource used by the UE for PUSCH transmission. In LTE LAA, however, a UE is recognized/identified using a DMRS resource and a UE ID explicitly included in AUL-UCI transmitted together with a PUSCH.

<Structure of Uplink and Downlink Channels>

1. Downlink Channel Structure

The BS transmits a related signal to the UE through a downlink channel to be described later, and the UE receives the related signal from the BS through a downlink channel to be described later.

(1) Physical Downlink Shared Channel (PDSCH)

The PDSCH carries downlink data (e.g., DL-shared channel transport block (DL-SCH TB)), and a modulation scheme such as quadrature phase shift keying (QPSK), quadrature amplitude modulation (QAM), 64 QAM, 256 QAM, etc. is applied thereto. A codeword is generated by encoding a TB. The PDSCH may carry up to two codewords. Scrambling and modulation mapping are performed on each codeword, and modulation symbols generated from each codeword are mapped to one or more layers (layer mapping). Each layer is mapped to a resource along with a demodulation reference signal (DMRS) to generate an OFDM symbol signal, and the OFDM symbol signal is transmitted through a corresponding antenna port.

(2) Physical Downlink Control Channel (PDCCH)

The PDCCH carries downlink control information (DCI), and a QPSK modulation method is applied thereto. One PDCCH includes 1, 2, 4, 8, and 16 control channel elements (CCEs) according to an aggregation level (AL). One CCE includes six resource element groups (REGs). One REG is defined by one OFDM symbol and one (P)RB.

Figure 22:
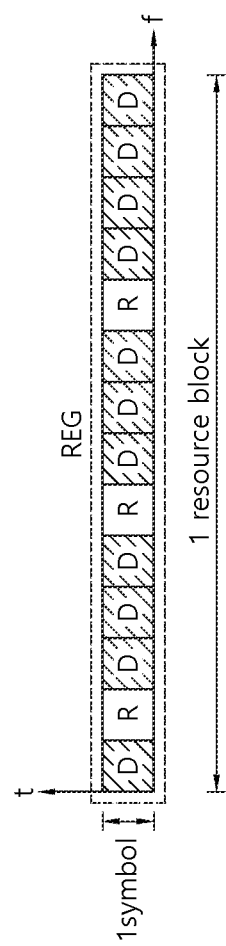
FIG. 22 illustrates one REG structure.

FIG. 22 illustrates one REG structure.

In FIG. 22, D represents a resource element (RE) to which DCI is mapped, and R represents an RE to which a DMRS is mapped. The DMRS may be mapped to the 1st, 5th, and 9th REs in a frequency domain direction within one symbol.

The PDCCH is transmitted through a control resource set (CORESET). The CORESET is defined as a REG set having a given numerology (e.g., SCS, CP length, etc.). A plurality of OCRESETs for one UE may overlap in the time/frequency domain. The CORESET may be set through system information (e.g., MIB) or UE-specific higher layer (e.g., radio resource control, RRC, layer) signaling. Specifically, the number of RBs constituting the CORESET and the number of symbols (maximum 3) may be set by higher layer signaling.

Precoder granularity in the frequency domain for each CORESET may be set to one of the following by higher layer signaling:

sameAsREG-bundle: Same as a REG bundle size in the frequency domain.

allContiguousRBs: Same as the number of consecutive RBs in the frequency domain inside the CORESET.

REGs in the CORESET are numbered in a time-first mapping manner. That is, the REGs are numbered sequentially from 0, starting from a first OFDM symbol in the lowest-numbered resource block inside the CORESET.

A mapping type from the CCE to the REG is set to one of a non-interleaved CCE-REG mapping type or an interleaved CCE-REG mapping type.

Figure 23:
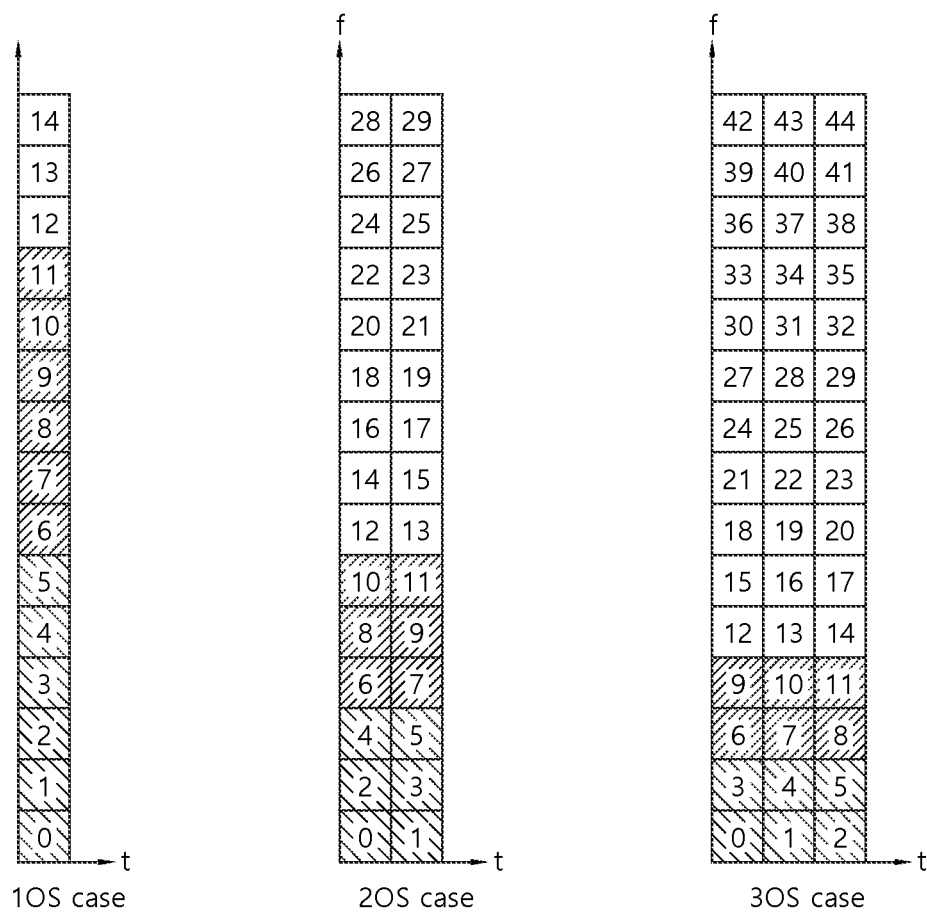
FIG. 23 illustrates a non-interleaved CCE-REG mapping type.
Figure 24:
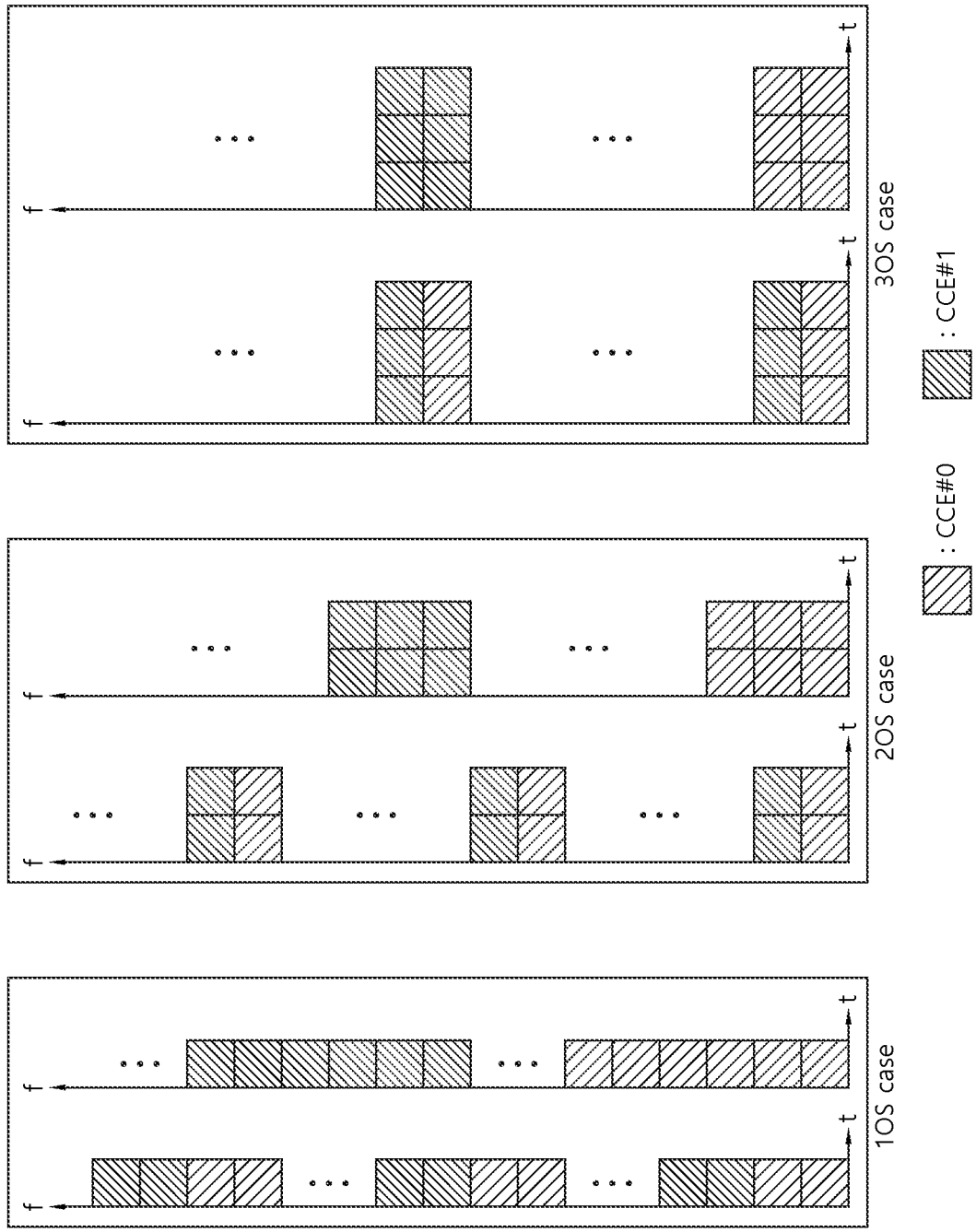
FIG. 24 illustrates an interleaved CCE-REG mapping type.

FIG. 23 illustrates a non-interleaved CCE-REG mapping type, and FIG. 24 illustrates an interleaved CCE-REG mapping type.

Non-interleaved CCE-REG mapping type (or localized mapping type): 6 REGs for a given CCE constitute one REG bundle, and all REGs for a given CCE are contiguous. One REG bundle corresponds to one CCE.

Interleaved CCE-REG mapping type (or distributed mapping type): 2, 3 or 6 REGs for a given CCE constitute one REG bundle, and the REG bundle is interleaved in the CORESET. The REG bundle in the CORESET including 1 OFDM symbol or 2 OFDM symbols includes 2 or 6 REGs, and the REG bundle in the CORESET including 3 OFDM symbols includes 3 or 6 REGs. A size of the REG bundle may be set for each CORESET.

Figure 25:
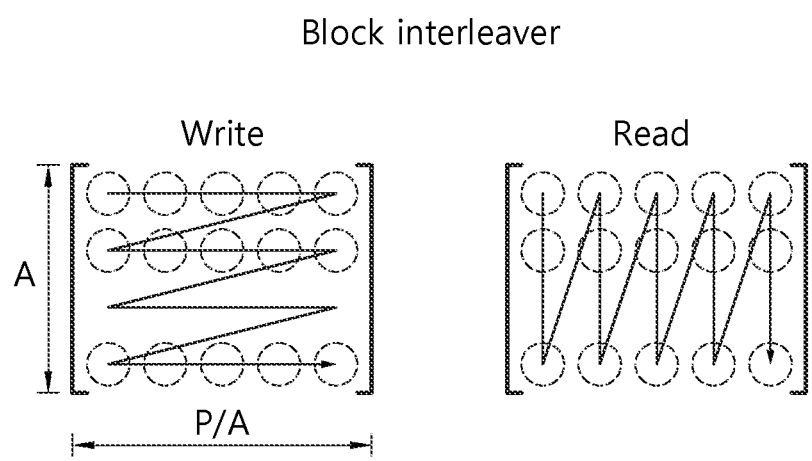
FIG. 25 illustrates a block interleaver.

FIG. 25 illustrates a block interleaver.

Referring to FIG. 25, the number (A) of rows of a (block) interleaver for an interleaving operation is set to one of 2, 3, and 6. When the number of interleaving units for a given CORESET is P, the number of columns of the block interleaver is equal to P/A. As shown in FIG. 25, a write operation for the block interleaver is performed in a row-first direction, and a read operation is performed in a column-first direction. A cyclic shift (CS) in an interleaving unit may be applied based on an ID that may be set independently for an ID that may be set for the DMRS.

The UE acquires DCI transmitted through the PDCCH by performing decoding (or blind decoding) on a set of PDCCH candidates. The set of PDCCH candidates decoded by the UE is defined as a set of PDCCH search spaces. The search space set may be a common search space or a UE-specific search space. The UE may acquire DCI by monitoring PDCCH candidates in one or more search space sets configured by MIB or higher layer signaling. Each CORESET setting is related to one or more sets of search spaces, and each set of search spaces is related to one COREST setting. One set of search spaces is determined based on the following parameters.

controlResourceSetId: It represents a control resource set related to the search space set.

monitoringSlotPeriodicityAndOffset: It indicates PDCCH monitoring period interval (slot unit) and PDCCH monitoring interval offset (slot unit)

monitoringSymbolsWithinSlot: It indicates the PDCCH monitoring pattern in a slot for PDCCH monitoring (e.g., indicates first symbol(s) of the control resource set)

nrofCandidates: It indicates the number of PDCCH candidates per AL={1, 2, 4, 8, 16} (value of one of 0, 1, 2, 3, 4, 5, 6, 8)

Table 7 illustrates features of each search space type.

TABLE 7

| Type | Search Space | RNTI | Use Case |
|---|---|---|---|
| Type0-PDCCH | Common | SI-RNTI on a primary cell | SIB decoding |
| Type0A-PDCCH | Common | SI-RNTI on a primary cell | SIB decoding |

TABLE 7-continued

| Type | Search Space | RNTI | Use Case |
|---|---|---|---|
| Type1-PDCCH | Common | RA-RNTI or TC-RNTI on a primary cell | Msg2, Msg4 decoding in RACH |
| Type2-PDCCH | Common | P-RNTI on a primary cell | Paging decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 8 illustrates DCI formats transmitted through the PDCCH.

TABLE 8

| DCI format | Use case |
|---|---|
| 0_0 | PUSCH scheduling in one cell |
| 0_1 | PUSCH scheduling in one cell |
| 1_0 | PDSCH scheduling in one cell |
| 1_1 | PDSCH scheduling in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, DCI format 0_1 may be used to schedule a TB-based (or TB-level) PUSCH or code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or CBG-based (or CBG-level) PDSCH. DCI format 2_0 may be used to deliver a dynamic slot format information (e.g., dynamic SFI) to a UE, and DCI format 2_1 may be used to deliver downlink pre-emption information to the UE. DCI format 2_0 and/or DCI format 2_1 may be delivered to UEs in a corresponding group through a group-common PDCCH, which is a PDCCH delivered to UEs defined as one group.

2. Uplink Channel Structure

The UE transmits a related signal to the BS through an uplink channel to be described later, and the BS receives the related signal from the UE through an uplink channel to be described later.

(1) Physical Uplink Shared Channel (PUSCH)

The PUSCH carries uplink data (e.g., UL-shared channel transport block (UL-SCH TB)) and/or uplink control information (UCI), and may be transmitted based on a cyclic prefix-orthogonal frequency division multiplexing (CP-OFDM) waveform (waveform) or a discrete Fourier transform-spread-orthogonal frequency division multiplexing (DFT-s-OFDM) waveform. When the PUSCH is transmitted based on the DFT-s-OFDM waveform, the UE transmits the PUSCH by applying transform precoding. For example, when transform precoding is not available (e.g., transform precoding is disabled), the UE transmits the PUSCH based on the CP-OFDM waveform, and when transform precoding is available (e.g., transform precoding is enabled), the UE may transmit the PUSCH based on the CP-OFDM waveform or the DFT-s-OFDM waveform. PUSCH transmission is dynamically scheduled by a UL grant in DCI, or may be semi-statically scheduled based on higher layer (e.g., RRC) signaling (and/or Layer 1 (L1) signaling (e.g., PDCCH)). PUSCH transmission may be performed based on a codebook or a non-codebook.

(2) Physical Uplink Control Channel (PUCCH)

The PUCCH carries uplink control information, HARQ-ACK, and/or scheduling request (SR), and may be classified as a short PUCCH and a long PUCCH according to a PUCCH transmission length.

Table 9 illustrates PUCCH formats.

TABLE 9

| PUCCH format | OFDM symbols $N_{symb}^{PUCCH}$ | Number of bits | Usage | others |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI of a maximum size of 2 bits, and is mapped and transmitted on a sequence basis. Specifically, the UE transmits a specific UCI to the BS by transmitting one of the plurality of sequences through the PUCCH of PUCCH format 0. The UE transmits a PUCCH of PUCCH format 0 within a PUCCH resource for corresponding SR configuration only when transmitting a positive SR.

PUCCH format 1 carries UCI having a maximum size of 2 bits, and modulation symbols are spread by an orthogonal cover code (OCC) (set to be different according to frequency hopping) in the time domain. The DMRS is transmitted in a symbol in which a modulation symbol is not transmitted (that is, it is transmitted after undergoing time division multiplexing (TDM)).

PUCCH format 2 carries UCI having a bit size larger than 2 bits, and a modulation symbol is transmitted after undergoing frequency division multiplexing (FDM) with the DMRS. The DM-RS is located at symbol indexes #1, #4, #7, and #10 in a resource block given with a density of ⅓. A pseudo noise (PN) sequence is used for a DM_RS sequence. Frequency hopping may be activated for 2-symbol PUCCH format 2.

PUCCH format 3 is not UE-multiplexed in the same physical resource blocks, and carries UCI having a bit size greater than 2 bits. In other words, the PUCCH resource of PUCCH format 3 does not include an orthogonal cover code. The modulation symbol is time division multiplexed (TMDed) with the DMRS and transmitted.

PUCCH format 4 supports multiplexing of up to 4 UEs in the same physical resource block, and carries UCI having a bit size larger than 2 bits. In other words, the PUCCH resource of PUCCH format 3 includes an orthogonal cover code. The modulation symbol is transmitted after undergoing TDM (Time Division Multiplexing) with the DMRS.

<Signal Transmission and Reception Based on Configured Grant or Semi-Persistent Scheduling (SPS)>

In downlink, the BS may dynamically allocate resources for downlink transmission to the UE through PDCCH(s) (including DCI format 1_0 or DCI format 1_1). In addition, the BS may transmit to a specific UE that some of the pre-scheduled resources are pre-empted for signal transmission to other UEs through PDCCH(s) (including DCI format 2_1). In addition, the BS may set a period of downlink assignment through higher layer signaling based on a semi-static scheduling (SPS) method, and provide downlink assignment for initial HARQ transmission to the UE by signaling activation/deactivation of set downlink assignment through the PDCCH. In this case, when retransmission for initial HARQ transmission is required, the BS explicitly schedules retransmission resources through the PDCCH. When downlink assignment through DCI and downlink assignment based on semi-persistent scheduling collide, the UE may prioritize downlink assignment through DCI.

Similar to the downlink, in the uplink, the BS may dynamically allocate resources for uplink transmission to the UE through PDCCH(s) (including DCI format 0_0 or DCI format 0_1). In addition, the BS may allocate uplink resources for initial HARQ transmission to the UE based on a configured grant method (similar to SPS). However, uplink resources for retransmission are explicitly allocated through PDCCH(s). As such, an operation in which uplink resources are previously set by the BS without a dynamic grant (e.g., an uplink grant through scheduling DCI) is referred to as a "configured grant". The configured grant is defined as two types below.

Type 1: Uplink grant of a certain period is provided by higher layer signaling (configured without separate first layer signaling)

Type 2: An uplink grant is provided by configuring a period of the uplink grant by higher layer signaling and signaling activation/deactivation of the configured grant through the PDCCH.

Figure 26:
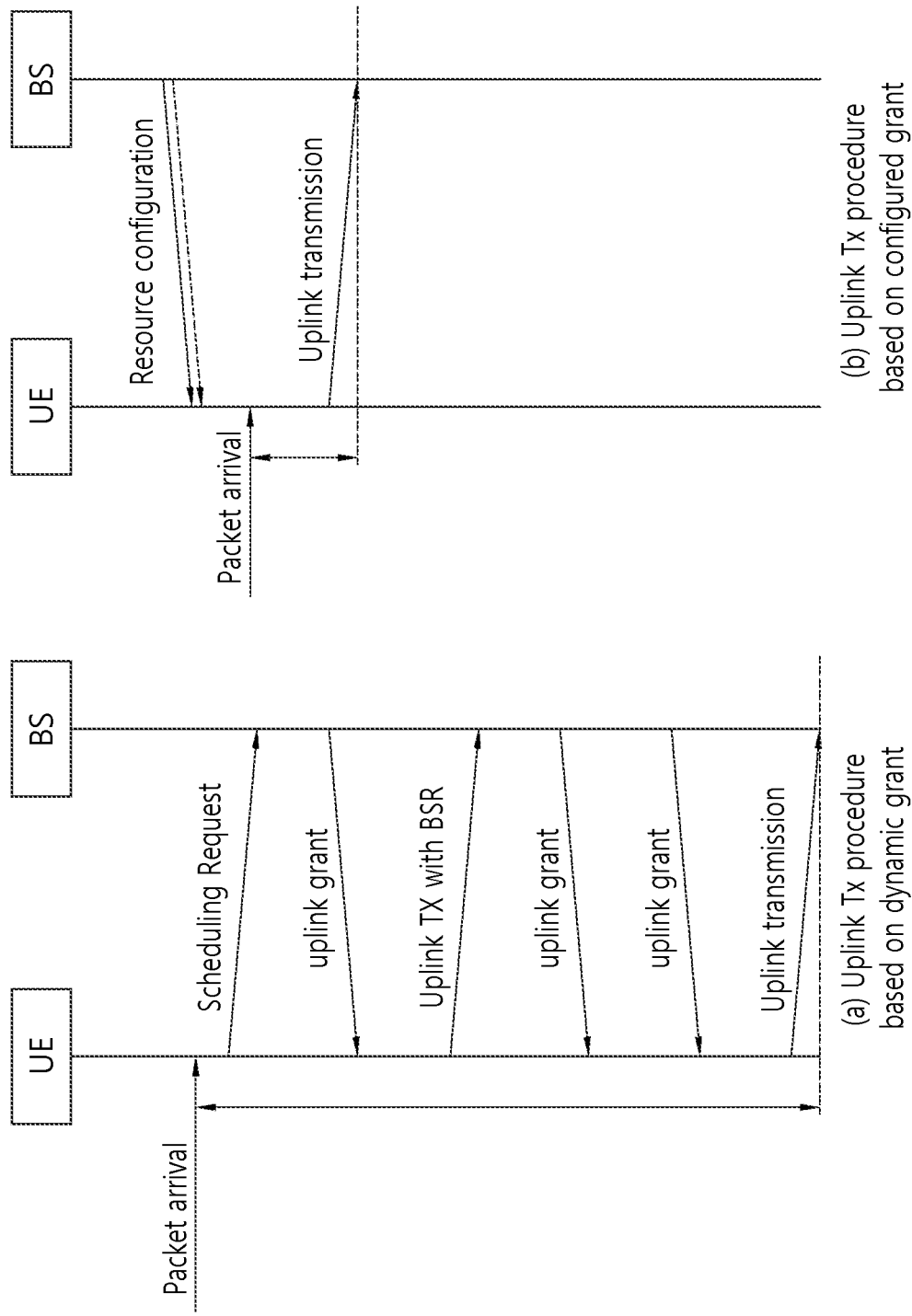
FIG. 26 illustrates an uplink transmission operation of a UE.

FIG. 26 illustrates an uplink transmission operation of a UE.

The UE may transmit a packet to be transmitted based on a dynamic grant (FIG. 26(a)) or a preconfigured grant (FIG. 26(b)).

Resources for a grant configured for a plurality of UEs may be shared. Uplink signal transmission based on the configured grant of each UE may be identified based on time/frequency resources and reference signal parameters (e.g., different cyclic shifts, etc.). Therefore, when the uplink transmission of the UE fails due to signal collision or the like, the BS may identify the corresponding UE and explicitly transmit a retransmission grant for the corresponding transport block to the corresponding UE.

By the configured grant, K repeat transmissions including initial transmission is supported for the same transport block. An HARQ process ID for an uplink signal that is repeatedly transmitted K times is determined to be the same based on resources for initial transmission. A redundancy version for the corresponding transport block that is repeatedly transmitted K times has one pattern among {0,2,3,1}, {0,3,0,3} or {0,0,0,0}.

Figure 27:
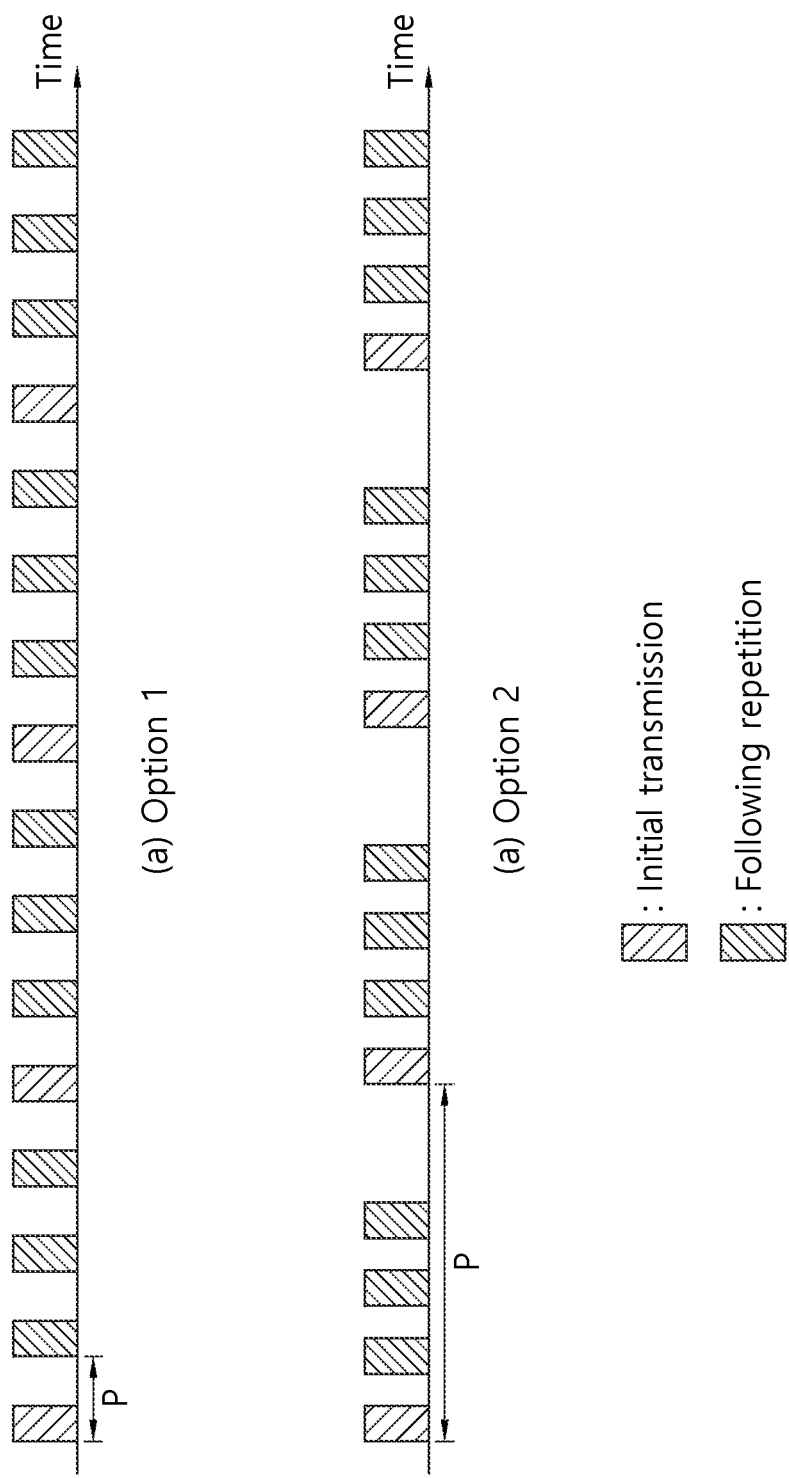
FIG. 27 illustrates repeated transmission based on a configured grant.

FIG. 27 illustrates repeated transmission based on a configured grant.

Referring to FIG. 27, the UE may perform repeated transmission until one of the following conditions is met:
  When an uplink grant for the same transport block is successfully received
  When the number of repeated transmissions for the corresponding transport block reaches K
  (In the case of option 2), when an end point of period P has reached Symbols/abbreviations/terms used in the present disclosure are as follows.

PDCCH: physical downlink control channel
PUSCH: physical uplink shared channel
DCI: downlink control information
UL grant: uplink scheduling grant
UL: uplink
DL: downlink
COT: channel occupancy time. It may refer to a channel occupancy time during which signal can be transmitted, if LBT is successful. The COT initiated/occupied by DL transmission may be referred to as a BS (gNB)-initiated COT. The COT initiated/occupied by UL transmission may be referred to as a UE-initiated COT.
LBT: listen before talk
CUL: configured grant UL access or configured grant UL transmission
CS: carrier sensing
CCA: clear channel assessment
CC: component carrier
STA: station
AP: access point
eMBB: enhanced mobile broad band
URLLC: ultra-reliable low latency
mMTC: massive machine-type communication
BW: bandwidth
BWP: bandwidth part
AUL: autonomous UL access
AUL-UCI: autonomous UL access-uplink control information
CUL-UCI: configured grant UL access-uplink control information In the unlicensed (NR-U) system, a bandwidth of a resource allocated to the UE for transmission of the "configured grant" may include a plurality of LBT sub-bands in units of 20 MHz. The present disclosure proposes a method allowing a UE to share an uplink channel occupancy time (COT0 acquired through category 4 LBT with a BS so that the uplink COT may be utilized for downlink transmission of the BS in the above situation.

As more communication devices increasingly require larger communication capacity, efficient use of a limited frequency band in the next wireless communication system is becoming more important. It is considered that cellular communication systems such as LTE/NR systems also utilize unlicensed bands such as the 2.4 GHz band mainly used by existing WiFi systems or unlicensed bands such as the 5 GHz and 60 GHz bands that are newly attracting attention for traffic offloading.

Basically, the unlicensed band is based on the assumption of a method of wireless transmission/reception through contention between communication nodes. Therefore, it is required for each communication node to perform channel sensing before transmitting a signal to determine that another communication node does not transmit a signal. For convenience, this operation is called listen before talk (LBT) or a channel access procedure. In particular, an operation of determining whether another communication node transmits a signal may be defined as carrier sensing (CS), and a case in which it is determined that another communication node does not transmit a signal is defined as that a clear channel assessment (CCA) is checked.

A BS (eNB or gNB) or a UE of the LTE/NR system should also perform LBT for signal transmission in an unlicensed band (which may be referred to as a U-band for convenience). In addition, when the BS or the UE of the LTE/NR system transmits a signal, other communication nodes such as WiFi should also perform LBT and do not cause interference. For example, in the WiFi standard (801.11ac), a CCA threshold is defined as −62 dBm for non-WiFi signals and −82 dBm for WiFi signals. This may mean that, for example, when a signal other than WiFi is received with a power of −62 dBm or more, a station (STA) or an access point (AP) does not transmit a signal so as not to cause interference.

In the NR system, up to 400 MHz per component carrier (CC) may be supported. If the UE operating in such a broadband CC always operates with a radio frequency (RF) unit which is for the entire CC turned on, battery consumption of the UE may increase. Or, when considering several use cases (e.g., eMBB, URLLC, mMTC, etc.) operating within one broadband CC, different numerology (e.g., subcarrier spacing) for each frequency band within the CC may be supported. Alternatively, each UE may have different capabilities for a maximum bandwidth.

In consideration of these, the BS may instruct the UE to operate only in a partial bandwidth rather than in the entire bandwidth of the broadband CC. For convenience, the partial bandwidth may be defined as a bandwidth part (BWP). The BWP may include consecutive resource blocks (RBs) on the frequency axis and may correspond to one numerology (e.g., subcarrier spacing, CP length, slot/mini-slot duration).

Meanwhile, the BS may set multiple BWPs even within one CC configured to the UE. For example, in a PDCCH monitoring slot, a BWP occupying a relatively small frequency domain may be configured, and a PDSCH indicated by the PDCCH may be scheduled on a larger BWP. Alternatively, when the UEs are concentrated on a specific BWP, some UEs may be configured in other BWPs for load balancing.

Alternatively, in consideration of frequency domain inter-cell interference cancellation between neighboring cells, some spectrum of the total bandwidth may be excluded and both BWPs may be configured within the same slot. That is, the BS may configure at least one DL/UL BWP for the UE associated with the broadband CC, and may activate at least one of the DL/UL BWP(s) configured at a specific time point (by L1 signaling or MAC CE or RRC signaling). In addition, when switching to another configured DL/UL BWP may be indicated (by L1 signaling or MAC CE or RRC signaling, etc.) or when a timer value based on a timer expires, switching to the designated DL/UL BWP may be made. In this case, the activated DL/UL BWP may be defined as an activated DL/UL BWP.

However, in a situation such as when the UE is in the process of initial access or before RRC connection is set up, the configuration for the DL/UL BWP may not be received. In this situation, the DL/UL BWP assumed by the UE may be defined as an initially activated DL/UL BWP.

Meanwhile, in order to transmit uplink data of the UE in the unlicensed band, the BS should first succeed in LBT for UL grant transmission on the unlicensed band and the UE should also succeed in LBT for UL data transmission. That is, UL data transmission may be attempted only when both LBTs of the BS and the UE are successful.

In addition, in the LTE system, a delay of at least 4 msec is required between a UL grant and UL data scheduled from the UL grant. If another transmission node coexisting in the unlicensed band accesses first for the corresponding time, UL data transmission may be delayed. For this reason, there is a need for a method of increasing efficiency of UL data transmission in an unlicensed band.

In the LTE system, the BS may inform the UE about an autonomous uplink (AUL) subframe or slot capable of performing autonomous UL transmission capable of transmitting UL data without a UL grant, through an X bit bitmap (e.g., X=40 bits).

When the UE is instructed to activate autonomous uplink transmission, the UE may perform uplink data transmission without a UL grant in a subframe or slot indicated in the bitmap. When transmitting the PDSCH, the BS may transmit the PDCCH, which is scheduling information necessary for decoding, to the UE together. Similarly, in AUL, the UE may transmit AUL UCI, which is information necessary for the BS to decode the PUSCH, together when transmitting the PUSCH.

The AUL-UCI may include information required for receiving AUL PUSCH such as a HARQ ID, new data indicator (NDI), redundancy version (RV), AUL subframe (SF) starting position, AUL SF ending position, etc., and information for sharing UE-initiated COT with the BS.

Sharing the UE-initiated COT with the BS, specifically, refers to an operation that the UE transfers some of the channels captured by the UE to the BS through a category 4 LBT (or type 1 channel access procedure) based on random-backoff and the BS transmits the PDCCH (and PDSCH) through a 25-usec one short LBT (by utilizing a timing gap prepared by emptying a last symbol by the UE) when a channel is idle.

Meanwhile, in the NR-U system based on the NR in the non-licensed band, a "configured grant" for the UE to transmit the PUSCH with a previously configured resource without a UL grant, similar to the AUL of the LTE system.

The present disclosure proposes a method in which, when a BW of a resource allocated for the "configured grant" uplink transmission (CUL) (hereinafter, simply referred to as "configured grant or "CUL") includes a plurality of 20 MHz-unit LBT subbands, the UE shares a remaining COT with the BS to utilize the COT for downlink transmission after performing uplink transmission in the COT acquired through the category 4 LBT.

An NR-based channel access scheme (which may refer to LBT) for an unlicensed band may be classified as follows.

Category 1 (Cat-1): Next transmission is performed immediately after a short switching gap in the COT immediately after previous transmission is finished, and the switching gap may be shorter than 16 μs and may include a transceiver turnaround time.

Category 2 (Cat-2): It is an LBT method without back-off. Transmission may be performed when it is determined that a channel is idle for a specific time immediately before transmission.

Category 3 (Cat-3): It is an LBT method that backs off with a fixed contention window size (CWS). A transmitting entity extracts a random number N from 0 to a maximum CWS value (fixed), and each time it is determined that a channel is idle, the transmitting entity reduces a counter value, and when the counter value is 0, the transmitting entity may perform transmission.

Category 4 (Cat-4): It is an LBT method that backs off with a variable contention window size (CWS). A transmitting entity extracts a random number N from 0 to a maximum CWS value (variable), and each time it is determined that a channel is idle, the transmitting entity reduces a counter value, and when the counter value is 0, the transmitting entity may perform transmission. In the case of receiving feedback that the transmission was not properly received, the transmitting entity increases the maximum CWS value to a higher value, and performs again the LBT procedure by extracting a random number from the increased CWS value.

1) UE (Entity A):

A UE may be previously allocated a frequency-axis resource that may be used for "configured grant" uplink transmission from a BS. However, in the NR, a BW of the resource allocated/configured in this way may be greater than a BW of an LBT subband in units of 20 MHz. When a PUSCH is actually transmitted using the "configured grant" resource, the UE may perform category 4 LBT for each LBT subband in the 20 MHz unit and transmit the PUSCH only in a successful LBT subband. Therefore, the BW of the resource allocated for the purpose of the "configured grant" and the transmission BW used for PUSCH transmission after the UE actually performs the LBT may be different.

In order to seamlessly share COT with the BS, it is necessary for the UE to inform the BS of the transmission BW actually used for actual transmission. For example, the UE may be allocated a "configured grant" resource for a 40 MHz BW including LBT subbands 1 and 2 each having a 20 MHz BW. In this case, only LBT subband 1 may succeed in LBT, uplink transmission may be performed only through the corresponding 20 MHz, and a remaining COT may be shared with the BS. Then, it may be desirable for the BS to perform downlink transmission only at 20 MHz (LBT subband 1) transmitted by the UE after successive LBT.

Meanwhile, depending on the LBT result, the BW actually used for transmission may change instantaneously. Therefore, it may be difficult in terms of complexity of UE implementation to predict and mapping information on a BW to be used for actual transmission for CUL-UCI in advance and to map immediately after LBT success, when CUL-UCI similar to AUL-UCI is introduced into NR-U. In consideration of this, methods for the UE to signal the information on the transmission BW actually used for transmission to the BS when performing COT sharing between uplink and downlink are proposed as follows.

[Proposed Method #1] In the proposed method #1, signaling for a transmission BW is indicated as "unknown" (which may be a specific state of a specific field) during an X slot (or X ms) immediately after "configured grant" uplink transmission and information on an actual transmission BW is included in CUL-UCI in a CUL PUSCH burst transmitted thereafter and signaled.

However, the X value may be capability of the UE, may be a predetermined value, may be a preset/indicated value, or may be a value fixed to X=1.

If a specific subband is set as a default or reference subband among LBT subbands in a 20 MHz unit belonging to the BW allocated to CUL, the UE may attempt CUL PUSCH transmission only when the LBT of the default or reference LBT subband is successful. In this case, the BS receiving the transmission BW as "unknown" in CUL-UCI may use only the default or reference subband of the corresponding UE for COT sharing. The UE also signals the transmission BW as "unknown", and thus it may be assumed that downlink reception through COT sharing is received only in a corresponding default or reference subband.

Conversely, although the BS has received the transmission BW as "unknown" in CUL-UCI, if it is assumed that the BS may know the actual transmission BW of the UE through a DM-RS or an uplink initial signal, it may be assumed that, although the transmission BW is signaled as "unknown" in CUL-UCI from the point of view of the UE, the entirety of a portion of the transmission BW is received through downlink reception based on COT sharing. That is, the UE may not expect to share a downlink COT through subbands larger than at least the transmission BW thereof.

In particular, the above operations may also be applied even to a case in which a corresponding slot in which the COT sharing indication bit is activated indicates signaling for the transmission BW, as "unknown", when indicating that COT sharing is available through CUL-UCI after a Y slot (or Y ms) is applied.

[Proposed Method #2] In proposed method #2, signaling for the transmission BW is indicated in 20 MHz or a minimum unit (or signaled specific BW) of an LBT subband during X slot (or Xms) immediately after the "configured grant" uplink transmission, and information on an actually transmitted BW of the UE is included in a CUL-UCI in the CUL PUSCH burst transmitted thereafter and signaled. However, the X value may be the capability of the UE, may be a predetermined value, a set/indicated value, or a value fixed to X=1.

If a specific subband among LBT subbands of 20 MHz unit belonging to the BW allocated to CUL is set as a default or reference subband, the UE may attempt to perform CUL PUSCH transmission only when LBT of the default or reference LBT subband is successful. Here, the BS receiving the transmission BW in the CUL-UCI in the minimum unit of 20 MHz or the LBT subband may use only the default or reference subband of the corresponding UE for COT sharing. It may also be assumed that the UE also signals the transmission BW in a 20 MHz or LBT subband and downlink reception through COT sharing is received only in a corresponding default or reference subband.

In particular, when indication that COT sharing is available after a Y slot (or Y ms) through CUL-UCI is applied, the above operations may be applied even to a case in which a corresponding slot in which a COT sharing indication bit is activated performs signaling for the transmission BW in 20 MHz or in a minimum unit of the LBT subband (or signaled specific BW).

[Proposed Method #3] In proposed method #3, signaling for the transmission BW actually transmitted by the UE is informed to the BS through a DM-RS or UL initial signal, not CUL-UCI.

Different DM-RS sequences or signals may be predefined according to the BW actually transmitted by the UE. Alternatively, only a portion of a signal generated for a DM-RS sequence or signal for the entire allocated BW, which is successful for LBT, may be transmitted. For example, an LBT-failed portion may be punctured and transmitted. A corresponding signal may be transmitted in a first symbol of a CUL PUSCH or in a configured/indicated symbol.

Assuming that the BS may know actual transmission BW of the UE through the DM-RS or UL initial signal, it is assumed that downlink reception through COT sharing is received as all or a portion of the transmission BW on the UE side. That is, the UE may not expect to share a downlink COT through subbands larger than at least the transmission BW actually transmitted by the UE.

Figure 28:
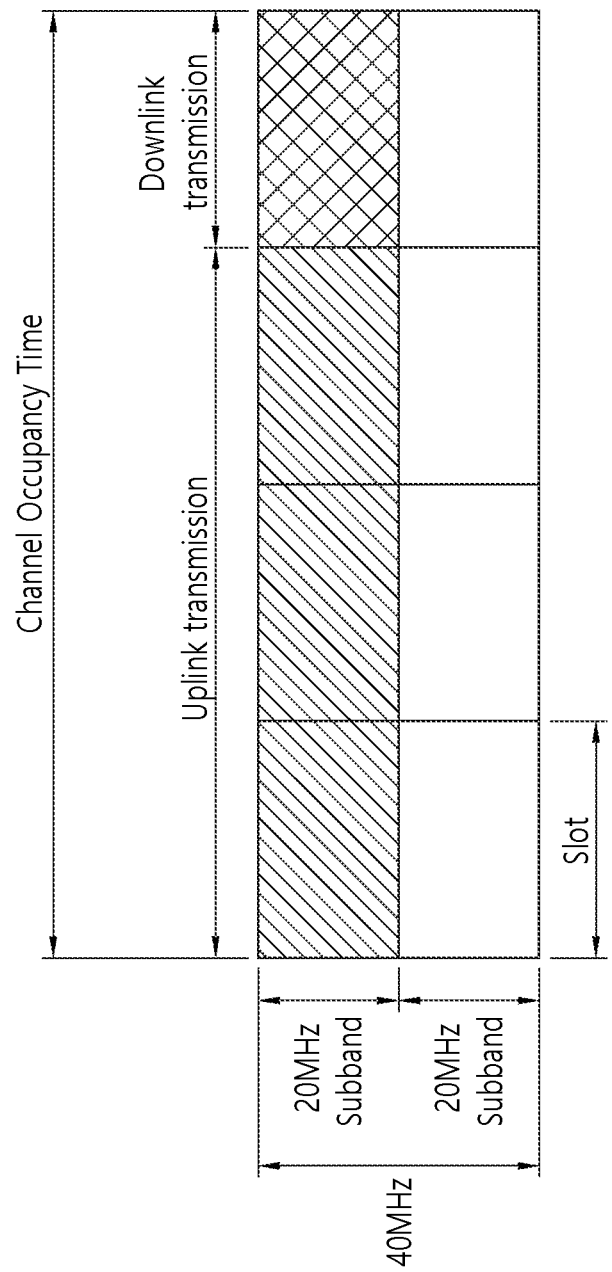
FIG. 28 is an example of COT sharing between uplink and downlink.

FIG. 28 is an example of COT sharing between uplink and downlink.

Referring to FIG. 28, a resource having a 40 MHz BW is allocated/configured for "configured grant" uplink transmission to a UE. The resource includes two 20 MHz LBT subbands. The UE may perform category 4 LBT in 40 MHz BW allocated/configured for CUL transmission, for example, may succeed in LBT only in the upper 20 MHz subband, and may share COT 1 slot remaining after transmitting a CUL PUSCH within the COT for a total of 4 slots through the upper 20 MHz BW with the BS for downlink transmission by the BS. In this case, the UE may expect DL transmission of the BS within the 20 MHz BW transmitted by succeeding in the actual LBT within the shared COT.

The UE may inform the information on the transmitted BW actually transmitted up to X slots (or X ms) in the CUL-UCI that is multiplexed with the CUL PUSCH and transmitted, in units of "unknown" or 20 MHz or LBT subbands. Alternatively, information on the BW in which the CUL PUSCH was actually transmitted may be notified to the BS through a DM-RS or UL initial signal, so that the BS having shared COT may use it when performing downlink transmission.

[Proposed Method #4] When the UE transmits the "configured grant" uplink, CUL-UCI including information on the transmission BW may be mapped and transmitted together as follows.
  (1) CUL-UCI may always be mapped from the last symbol in the slot (or from symbol K).
  (2) Among the information in CUL-UCI, information on the transmission BW is always mapped from the last symbol in the slot (or from symbol K) by applying separate encoding from other information in CUL-UCI.
  (3) If a gap between a first symbol to which CUL-UCI is mapped and an (actual) transmission start time of the CUL-PUSCH in the slot (or the most preceding transmission time among candidates that may start transmission within the slot or the most posterior transmission among the candidates that may start transmission within the slot) is larger than a Y symbol (or Y usec), the CUL-UCI may be mapped from the last symbol in the slot.

However, the Y value may be capability of the UE and may be a predetermined value or a set/indicated value. In addition, when the gap is smaller than Y in (3), information on the transmission BW may be transmitted to the BS by the methods of [Proposed Method #1], [Proposed Method #2], and [Proposed Method #3] of the present disclosure.

Or even in the case of (1) and/or (2) above, if the gap between the first symbol to which CUL-UCI is mapped and the transmission start time of the CUL-PUSCH in the slot (or the most preceding transmission time among candidates that may start transmission within the slot or the most posterior transmission among the candidates that may start transmission within the slot) is larger than the Y symbol (or Y usec), information on the actual transmission BW may be included, and if the gap between the first symbol to which CUL-UCI is mapped and the transmission start time of the CUL-PUSCH in the slot (or the most preceding transmission time among candidates that may start transmission within the slot or the most posterior transmission among the candidates that may start transmission within the slot) is smaller than the Y symbol (or Y usec), information on the transmission BW may be transmitted to the BS by the methods of [Proposed Method #1], [Proposed Method #2], and [Proposed Method #3] of the present disclosure.

However, the K value may be predetermined or signaled as a specific value. Alternatively, the K value may be determined as a position relative to the position of the DM-RS symbol.

It may be difficult for the UE to map and transmit the CUL-UCI containing information on the transmission BW immediately after LBT success, considering the complexity of the UE implementation. However, as described above, in the CUL-UCI mapping method, (1) when it is always mapped from the last symbol in the slot, (2) when CUL-UCI containing information on the transmission BW is always from the last symbol in the slot or (3) when an interval between the first symbol to which CUL-UCI is mapped from the start of PUSCH transmission is greater than Y, time for information on the transmission BW may be secured after the UE succeeds in LBT.

If the CUL-PUSCH supports a plurality of transmission start points and an actual transmission start point starts from a specific symbol in the slot so a gap to the first symbol to which CUL-UCI is mapped is smaller than Y, then it may be difficult to map the CUL-UCI including information on the transmission BW directly to the slot in which the corresponding CUL-PUSCH is transmitted. Therefore, in this case, information on the transmission BW may be transmitted to the BS in the method like Proposed Method #1 to #3.

[Proposed Method #9] A bandwidth (BW) of DL/UL BWP configured to the UE and a size of configured/indicated "configured grant" frequency resource may be a broadband (>20 MHz) including a plurality of LBT sub-bands. In this case, the BS may share a remaining COT with the UE after DL transmission in the COT acquired through LBT and inform the UE that UL transmission is available. In this case, information on which band, within the COT acquired by the BS, the CUL PUSCH transmission of the UE is available may be informed or indicated to the UE through a (group-common) PDCCH as follows.

Figure 29:
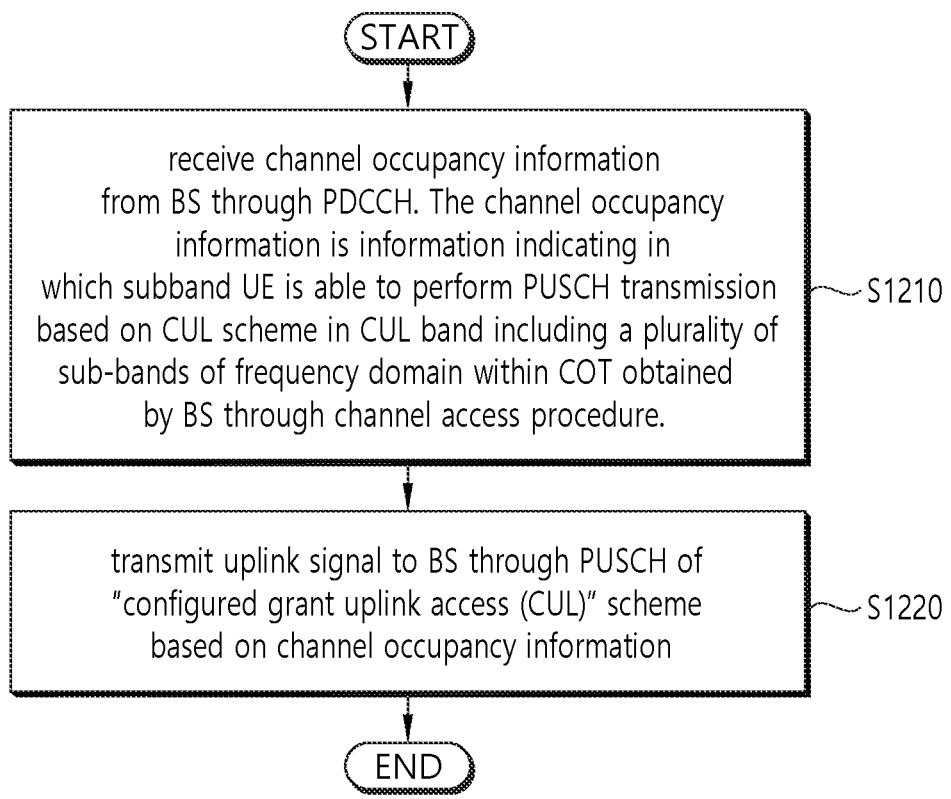
FIG. 29 illustrates a method for transmitting an uplink signal by a UE according to Proposed Method #9.

FIG. 29 illustrates a method for transmitting an uplink signal by a UE according to Proposed Method #9.

Referring to FIG. 29, channel occupancy information is received from a BS through a physical downlink control channel (PDCCH) (S1210). The channel occupancy information may be information indicating in which subband the UE may be able to perform PUSCH transmission based on a CUL scheme in a CUL band including a plurality of sub-bands of a frequency domain within a channel occupancy time (COT) obtained by the BS through a channel access procedure (i.e., LBT). The channel occupancy information may be referred to as information indicating frequency resources acquired or occupied by the BS through the LBT. That is, the channel occupancy information is a frequency resource in which the UE may transmit the PUSCH of the CUL scheme within the COT, and may indicate a frequency resource (subband) acquired or occupied by the BS through the LBT.

The channel occupancy information may include a bitmap indicating a subband in which the PUSCH transmission of the CUL scheme is available among the plurality of sub-bands.

The UE transmits the uplink signal to the BS through a physical uplink shared channel (PUSCH) of a "configured grant uplink access (CUL)" scheme based on the channel occupancy information (S1220).

The CUL scheme may be a transmission scheme for transmitting a PUSCH through a periodic resource configured through higher layer signaling without an uplink grant.

The PDCCH may be a PDCCH common to a group of UEs.

The CUL band may be set by higher layer signaling.

The UE may further receive information indicating that the UE may perform uplink transmission in a remaining time after the BS performs downlink transmission in the COT. In the remaining time, the UE may perform the PUSCH transmission of the CUL scheme only in CUL resource included in a subband indicated by the bitmap among the plurality of subbands.

Meanwhile, the UE may further receive information indicating a minimum priority class value. In this case, the UE may transmit the uplink signal through the PUSCH of the CUL scheme only when the priority class value of the uplink signal is equal to or greater than the minimum priority class value. When the priority class value of the uplink signal is less than the minimum priority class value, the UE may not transmit the uplink signal through the PUSCH based on the CUL scheme although there is a resource available for transmission of the PUSCH of the CUL scheme in a subband indicated by the channel occupancy information.

Before transmitting the PUSCH of the CUL scheme (referred to as "CUL PUSCH"), the UE may transmit the PUSCH of the CUL scheme only when a channel is idle by performing a channel access procedure. In this case, different LBT may be performed depending on whether the CUL PUSCH transmission is out of the subband range occupied by the BS during downlink transmission in the frequency domain (i.e., the subband range indicated by the channel occupancy information). For example, if the BS includes resources outside of the occupied subband during downlink transmission (e.g., CUL resource 4 in FIG. 31), Cat-4 LBT may be performed, and if the BS includes only the resources within the occupied subband are included (e.g., CUL resource 1 or 2 of FIG. 31), Cat-2 LBT may be performed.

Hereinafter, Proposed Method #9 will be described in more detail.

(1) In which band, based on a band of DL transmitted as the BS succeeds in LBT (or band corresponding to LBT subband(s) indicated to be available for DL), CUL PUSCH transmission is available may be informed through a (group-common) PDCCH. For example, in which band CUL PUSCH transmission is available may be informed through a bitmap included in the PDCCH (bit map corresponding to each LBT subband). The UE may determine whether the configured CUL PUSCH is valid and the LBT type.

Since the existing wireless communication system only supports DL/UL transmission in units of a single LBT subband (20 MHz), the BS may simply inform the group-common PDCCH as to whether or not AUL transmission of the UE is available within the COT acquired by itself. However, in NR, BWP having a BW greater than 20 MHz and CUL resource may be set, and when the UE and the BS attempts LBT in each of the plurality of LBT subbands constituting a corresponding band and is successful, DL/UL transmission is available. Therefore, the BS may need to inform the UE in which band within the acquired COT acquired by itself, UL transmission is available or CUL transmission is available.

The BS may map each LBT subband constituting the DL BWP/CC to each 1 bit on the bitmap and inform the UEs on which LBT subband it has succeeded in DL LBT (or whether DL on which LBT subband is available) through a (group-common) PDCCH. That is, the LBT subband enabled in the bitmap of the (group-common) PDCCH may be interpreted as being capable of UL transmission and COT sharing of the UE, and the BS may additionally inform the UE whether or not CUL transmission is available, to inform whether the UE can transmit the CUL PUSCH through the CUL resource preconfigured in the corresponding band.

Alternatively, the BS notifies only information on which LBT subband of the LBT subbands constituting the DL BWP/CC has succeeded in DL LBT to the UEs, and the UE may determine whether CUL transmission is available for CUL PUSCH (resource) previously set in the corresponding BWP/CC and/or an LBT type for CUL transmission.

Figure 30:
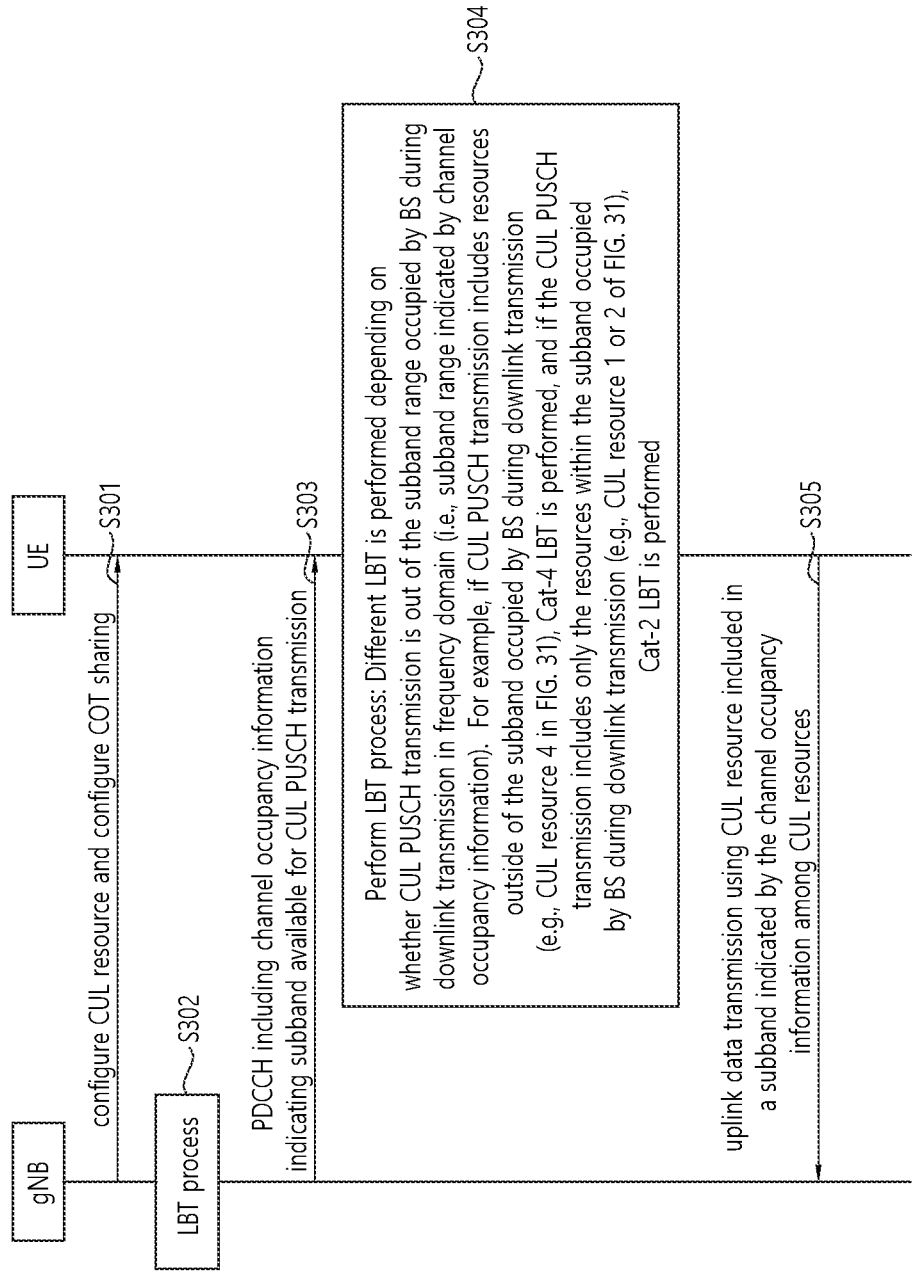
FIG. 30 illustrates an operation method between a BS and a UE based on Proposed Method #9.

FIG. 30 illustrates an operation method between a BS and a UE based on Proposed Method #9.

Referring to FIG. 30, the BS provides the UE with CUL resource configuration and COT sharing configuration (S301). The CUL resource configuration and the COT sharing configuration may be provided as separate messages, respectively, or may be provided through one message.

CUL resource configuration may inform periodic resources capable of transmitting a PUSCH of a "configured grant" scheme, and may be provided through higher layer signaling such as an RRC message. As described above, the CUL resource may include a plurality of subbands (e.g., 20 MHz), which are units for performing LBT, in the frequency domain. The COT sharing configuration may include information indicating whether the UE may perform uplink transmission (e.g., CUL PUSCH transmission) for a portion of time within the COT acquired by the BS (e.g., a time remaining after the BS performs downlink transmission).

The BS may acquire the COT by performing the LBT process (S302).

The BS may transmit a PDCCH including channel occupancy information indicating a subband in which CUL PUSCH transmission is available to the UE (S303). For example, the CUL resource configured for the UE may include a plurality of LBT subbands. The BS may inform the UE about which LBT subband among the plurality of LBT subbands is used for the UE to perform uplink transmission in the remaining time after the downlink transmission is performed in the COT. For example, if there are four LBT subbands in the plurality of LBT subbands, the LBT subband in which the UE may perform uplink transmission may be informed through a bitmap composed of 4 bits to correspond to each LBT subband. As described above, the channel occupancy information may be referred to as information indicating frequency resources acquired or occupied by the BS through the LBT. That is, the channel occupancy information may inform of the frequency resource (subband) acquired or occupied by the BS through the LBT as the frequency resource in which the UE may transmit the PUSCH of the CUL scheme within the COT.

The UE performs an LBT process (S304). In this case, different LBT may be performed depending on whether the CUL PUSCH transmission is out of the subband range occupied by the BS during downlink transmission in the frequency domain (i.e., the subband range indicated by the channel occupancy information). For example, if the CUL PUSCH transmission includes resources outside of the subband occupied by the BS during downlink transmission (e.g., CUL resource 4 in FIG. 31), Cat-4 LBT may be performed, and if the CUL PUSCH transmission includes only the resources within the subband occupied by the BS during downlink transmission (e.g., CUL resource 1 or 2 of FIG. 31), Cat-2 LBT may be performed.

Thereafter, uplink data transmission may be performed using CUL resource included in a subband indicated by the channel occupancy information among CUL resources (S305). In FIG. 30, for convenience, a case in which uplink data transmission is performed using CUL resources included in a subband indicated by the channel occupancy information among CUL resources is illustrated, but as described above, the CUL resource may include resource outside the subband (i.e., the subband range indicated by the channel occupancy information) occupied by a BS during downlink transmission (e.g., see CUL resource 4 in FIG. 31).

Figure 31:
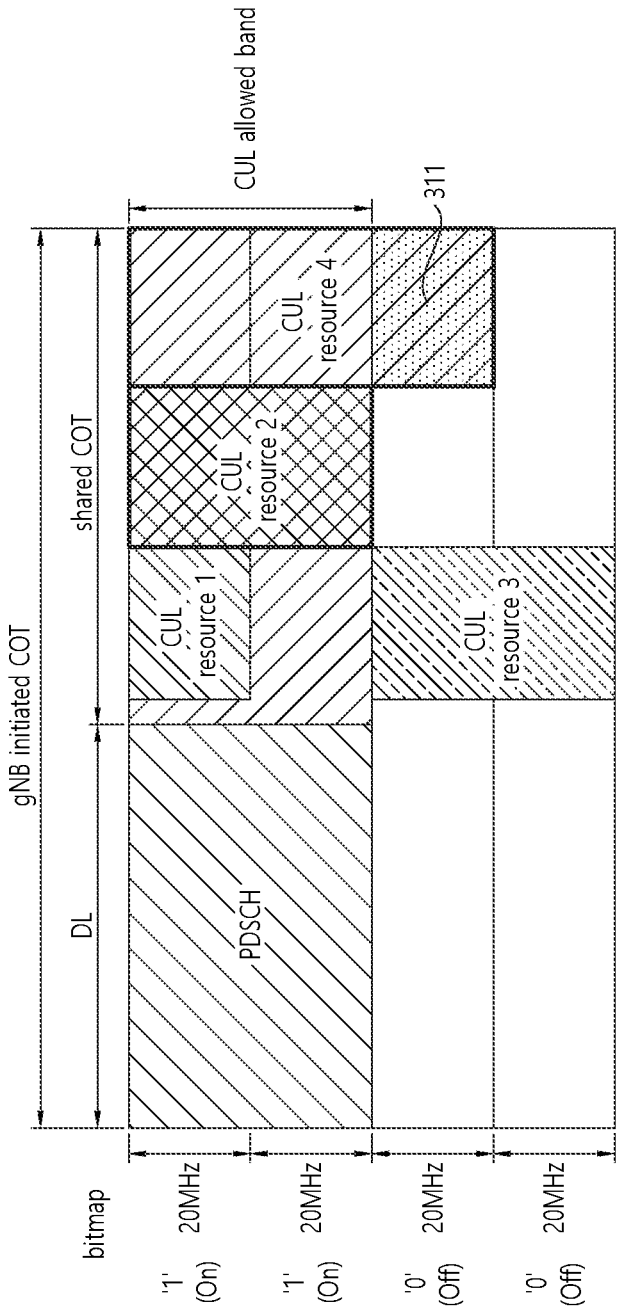
FIG. 31 shows an example of performing a CUL COT sharing operation only in a band that succeeds in DL LBT among a plurality of LBT subbands.

FIG. 31 shows an example of performing a CUL COT sharing operation only in a band that succeeds in DL LBT among a plurality of LBT subbands.

Referring to FIG. 31, a DL BWP of 80 MHz including four LBT subbands in a frequency domain may be configured. If the BS succeeds in LBT in only the upper two LBT subbands and performs DL transmission and wants to inform the UE(s) that COT sharing for UL transmission is available in the remaining COT period, the BS may set a bit value of a bitmap composed of 4 bits to "1100" and may information COT information of the BS and whether CUL transmission in the corresponding COT is available through the PDDCH (common to a group).

Here, a single or a plurality of "configured grant" resources (CUL resources) may be configured to the UE(s) (e.g., CUL resources may be 1 to 4). If a frequency resource of the "configured grant" is in the band where DL LBT succeeded and the BS indicates that CUL COT sharing is available in the band with (group-common) PDCCH, the UE having data to transmit among the UE(s) may transmit CUL PUSCH after performing Cat-2 LBT (or, if the gap between transmissions is 16 us, it may be transmitted without LBT).

As shown in the example of FIG. 31, when the BS informs the UE that CUL COT can be shared after transmitting the 40 MHz PDSCH using the upper two LBT subbands, since CUL resource 1 and CUL resource 2 among four "configured grant" resources (CUL resources 1, 2, 3, and 4) configured (or activated) for the UE are located in are located in the band where the DL LBT is successful, if the UE has data to be transmitted, the UE may perform Cat-2 LBT (or may transmit without LBT if a gap between transmissions is 16 μs or less), and perform CUL PUSCH transmission when the LBT is successful.

For example, in CUL resource 1, the UE transmits CUL PUSCH because there is data to be transmitted, and CUL resource 2 is available for transmission, but transmission may not be performed because there is no data to be transmitted.

In the case of CUL resource 4, since the bottom 20 MHz 311 of the three LBT subbands does not belong to the CUL allowed band, the BS's COT cannot be shared and transmitted. In this case, the UE may not attempt to transmit CUL PUSCH on CUL resource 4. Alternatively, the UE may attempt CUL PUSCH transmission using only the CUL-allowed band in CUL resource 4.

In the case of CUL resource 3, the configured frequency resource does not belong to the CUL-allowed band, but is located in a band that does not overlap with the successful DL LBT band and is not a DL interval, so the UE may transmit CUL PUSCH on CUL resource 3. Specifically, if there is data to be sent on CUL resource 3, the UE may perform a general Cat-4 LBT and transmit CUL PUSCH upon success.

In this proposal, in addition to whether or not to allow CUL PUSCH transmission in the shared COT, a minimum (or maximum) LBT priority class value for allowing transmission may be indicated. For example, as shown in FIG. 31, while allowing CUL PUSCH transmission in the gNB-initiated COT, LBT priority class #n may be indicated. In this case, if there is data to be transmitted by the UE and the data corresponds to the LBT priority class #k(<n), CUL PUSCH transmission may not be allowed even in CUL resource 1 and CUL resource 2. Here, regardless of the LBT priority class indicated on the CUL resource 3 phase (and regardless of whether CUL PUSCH transmission in the shared COT is allowed), the UE may perform Cat-4 LBT and transmit the CUL PUSCH upon success.

Figure 32:
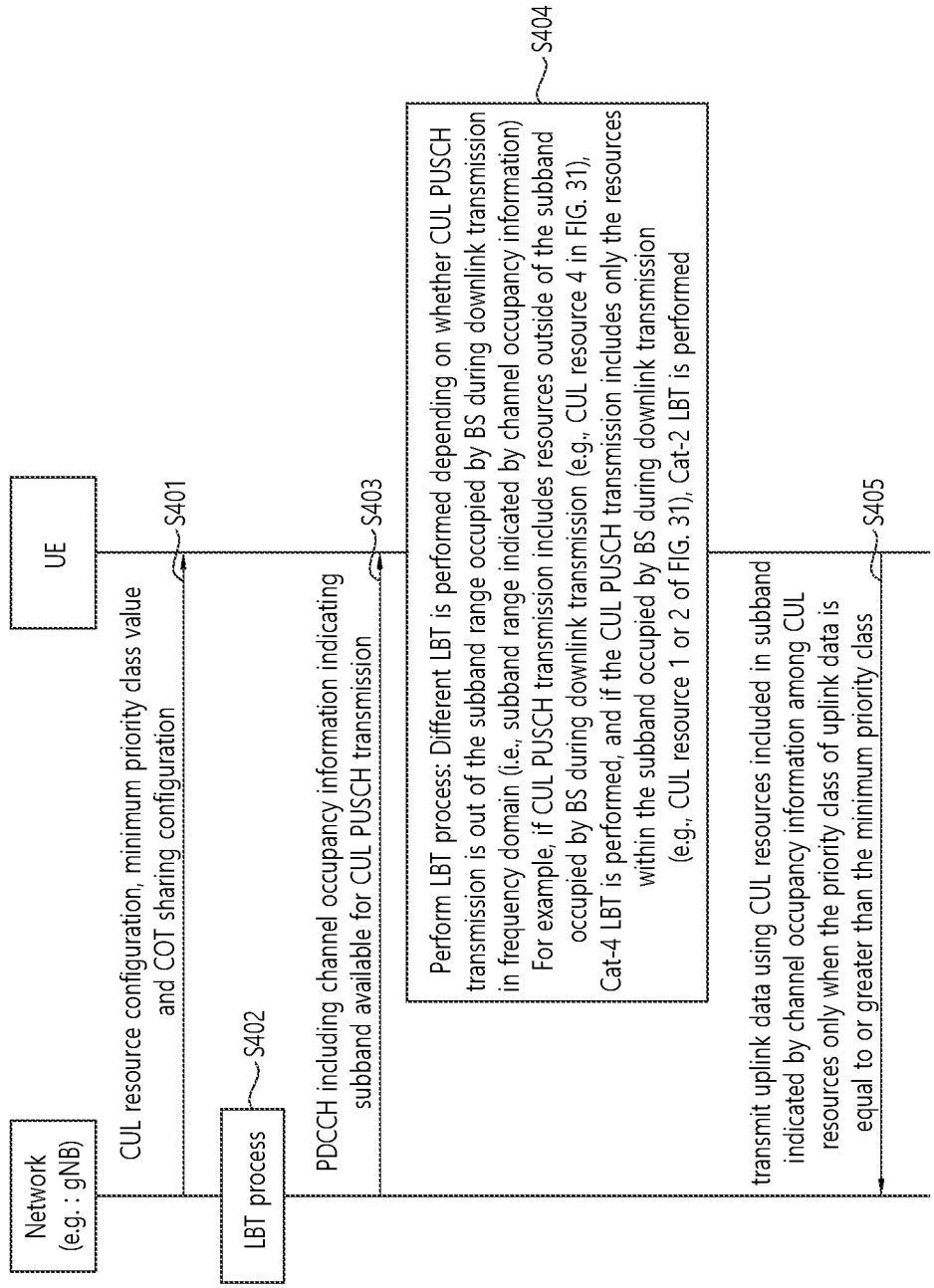
FIG. 32 illustrates another operation method between a BS and a UE based on Proposed Method #9.

FIG. 32 illustrates another operation method between a BS and a UE based on Proposed Method #9.

Referring to FIG. 32, the BS provides the UE with CUL resource configuration, a minimum priority class value, and COT sharing configuration (S401). The CUL resource configuration and the COT sharing configuration may be provided as separate messages, respectively, or may be provided through one message.

As described above, the CUL resource configuration may inform about periodic resources for transmitting a PUSCH of a "configured grant" scheme, and may be provided through higher layer signaling such as an RRC message. As described above, the CUL resource may include a plurality of subbands (e.g., 20 MHz), which are units for performing LBT, in the frequency domain. The COT sharing configuration may include information indicating whether the UE is able to perform uplink transmission (e.g., CUL PUSCH transmission) in a partial time within the COT acquired by the BS (e.g., a time remaining after the BS performs downlink transmission). A minimum priority class value may indicate a minimum priority class of CUL PUSCH that is allowed to be transmitted within the shared COT.

The BS may perform the LBT process (S402) and acquire the COT.

The BS may transmit a PDCCH including channel occupancy information indicating a subband in which CUL PUSCH transmission is available to the UE (S403). The UE undergoes the LBT process (S404). In this case, different LBT may be performed depending on whether the CUL PUSCH transmission is out of the subband range (i.e., the subband range indicated by the channel occupancy information) occupied by the BS during downlink transmission in the frequency domain. For example, if the BS includes resource outside of the occupied subband during downlink transmission (e.g., CUL resource 4 in FIG. 31), Cat-4 LBT is performed, and if only resource in the sub-band occupied by the BS during downlink transmission is included (e.g., CUL resource 1 or 2 of FIG. 31), Cat-2 LBT may be performed.

Only when the priority class of uplink data is equal to or greater than the minimum priority class, uplink data is transmitted using CUL resources included in a subband indicated by the channel occupancy information among CUL resources (S405). In FIG. 32, for convenience, a case in which uplink data transmission is performed using CUL resources included in a subband indicated by the channel occupancy information among CUL resources is illustrated, but as described above, the CUL resource may include resources outside the band (i.e., the subband range indicated by the channel occupancy information) occupied by the BS during downlink transmission (e.g., see CUL resource 4 in FIG. 31).

Meanwhile, if the BS indicates that (i) UL COT sharing is available with the PDCCH and (ii) information on the transmission available band in a bitmap, but CUL transmission is not allowed, transmission may not be allowed for CUL resources overlapping the COT sharing available band and the COT region.

Figure 33:
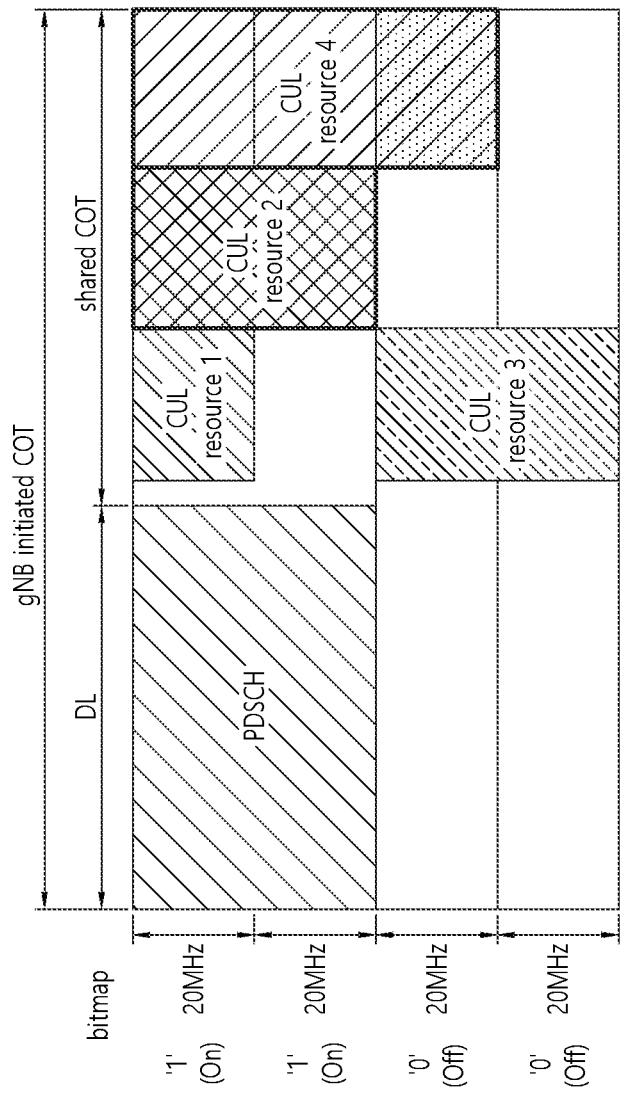
FIG. 33 shows an example of the operation of the UE and the BS when it is indicated that the BS does not allow CUL transmission in the shared COT.

FIG. 33 shows an example of the operation of the UE and the BS when it is indicated that the BS does not allow CUL transmission in the shared COT.

Referring to FIG. 33, after the BS transmits a 40 MHz PDSCH using the upper two LBT subbands, the BS may indicate to the UE that CUL COT sharing is available in the two LBT subbands. For example, the BS may indicate a bitmap "1100" through the (group-common) PDCCH. In addition, the BS may indicate that CUL transmission is impossible. In this case, for CUL resources 1, 2, and 4 configured in the subbands that have succeeded in the shared COT and DL LBT after the DL transmission is finished, CUL PUSCH transmission is not available because CUL transmission in the COT (although CUL resources are configured) is not allowed. However, since CUL resource 3 does not overlap the DL LBT success band of the BS and is not a DL period, CUL transmission is available in CUL resource 3 upon success after performing Cat-4 LBT regardless of the UL COT sharing of the BS.

The aforementioned [Proposed Method #9] may be applied not only for CUL PUSCH but also for UL transmissions configured by higher layer signaling such as RRC, for example, for UL transmissions such as semi-persistent PUCCH/SRS/PUSCH (i.e., if CUL transmission permission is indicated, RRC-configured UL transmissions are also allowed, and if CUL transmission is not allowed, RRC-configured UL transmissions are also not allowed).

In relation to the aforementioned Proposed Method #9, apart from indicating whether CUL PUSCH transmission is available within the COT of the BS through the (group-common) PDCCH, whether CUL PUSCH transmission is available may be informed to the UE through i) higher layer signaling such as RRC, ii) a physical layer signal such as DCI (transmitted through a UE-specific PDCCH) or iii) a combination thereof. If it is signaled to the UE that CUL PUSCH transmission is not available in any one of the above i) to iii), the CUL PUSCH is cannot be transmitted even if CUL PUSCH transmission is available is indicated in the COT through the (group-common) PDCCH.

As in the proposed method, the operation of notifying whether or not CUL PUSCH transmission is available to the UE through the (group-common) PDCCH and transmitting the CUL PUSCH may be allowed only when it is signaled to the UE that CUL PUSCH transmission is available by any one of the methods i) to iii).

When whether CUL PUSCH transmission is available is not separately signaled to the UE, the UE may assume that the CUL PUSCH can be transmitted in the CUL resource that is always configured separately from being indicated whether the CUL PUSCH transmission is available through the (group-common) PDCCH, and, for resources belonging to the LBT subband COT resource (meaning both time and frequency resources) of the BS, the Cat-2 LBT is applied, and for CUL resources that do not belong to the LBT subband COT obtained by the BS by DL LBT, the Cat-4 LBT may be applied, and CUL PUSCH may be transmitted upon success.

In a situation in which CUL PUSCH transmission is always allowed to the UE, as shown in CUL resource 4 of FIG. 31, when all configured CUL (frequency axis) resources do not belong to a CUL-allowed band (i.e., the CUL resource 4 includes three LBT subbands on the frequency axis, of which the lowest subband (20 MHz) does not belong to the CUL-allowed band), although CUL PUSCH transmission cannot be made through all CUL resources 4 by performing Cat-2 LBT, Cat-4 LBT may be performed, and In the case of success, CUL PUSCH transmission using CUL resource 4 may be allowed (even if CUL resource not belonging to the CUL-allowed band exists).

[Proposed Method #11] When the BS shares the remaining COT after DL transmission from the acquired COT to the UE, information on an LBT type and LBT gap of the UL(s) to be transmitted by the UE within the COT may be indicated/configured by i) (group-common) PDCCH or ii) through higher layer signaling, or iii) a combination of the PDCCH and higher layer signaling.

The LBT type that may be indicated above include, for example, Cat-1 LBT or Cat-2 LBT in a 16 us gap, and Cat-2 LBT in a 25 us gap.

(1) One of the available LBT types may be indicated as a (group-common) PDDCH.

(2) It is possible to configure which LBT type is used for UL transmission by higher layer (e.g., RRC) signaling.

(3) LBT types may be configured in advance by higher layer (e.g., RRC) signaling, and one of them may be dynamically indicated (e.g., through PDCCH).

In addition, a different LBT type may be indicated for a plurality of UL schedulings in the COT based on information on the COT structure of the BS (information on a DL region and a UL region). Also, even if 16 us Cat-1 LBT is indicated for a first scheduled UL and 16 us Cat-1 LBT is indicated for a second UL transmission, the UE may perform LBT by interpreting LBT type (for example, 16 us Cat-2 LBT) different from the LBT type indicated for the first UL.

There may be a plurality of LBT types that may be indicated to the UE. For example, there are Cat-1 LBT and Cat-2 LBT in the 16 us gap and Cat-2 LBT in the 25 us gap. In the existing LAA, even if the LBT type is indicated as Cat-4 in a UL grant indicated by the BS, if the UE recognizes the UL transmission transmitted within the COT of the BS, the UE may perform Cat-2 LBT instead of Cat-4 LBT. In NR-U, since there are three possible LBT types, the BS may indicate to the UE the LBT type to be performed by the UE in the COT by using a (group-common) PDCCH or higher layer signaling or a combination thereof.

The three types may be dynamically indicated by (group-common) PDCCH as in (1) described above, it may be configured to perform only a specific LBT type in advance with higher layer signaling as in (2), or LBT types may be previously configured through higher layer signaling and one of them may be dynamically indicated as in (3). For example, a 16 us Cat-2 LBT and a 25 us Cat-2 LBT may be set by higher layer signaling, and which of the two LBTs is to use may be indicated to the UE by one bit in the (group-common PDCCH).

A different LBT type may be indicated for a plurality of UL scheduling in the COT based on the information on the COT structure of the BS (information on the DL region and the UL region). Alternatively, although one LBT type is indicated, the UE may perform LBT by interpreting it as another LBT type. For example, when 16 us Cat-1 LBT is indicated for two UL scheduling in the COT of the BS, since there is a possibility that a previous UL transmission has not been properly performed, although 16 us Cat-1 LBT is indicated, the LBT immediately before the second UL may be interpreted as 16 us Cat-2 LBT and transmitted after confirming that a channel is idle.

2) BS (Entity B):

The BS may pre-allocate/configure the resource of the frequency axis that may be used for uplink transmission of the "configured grant" to the UE, and the BW of the resource allocated/configured in this way may be greater than the BW of the LBT subband of the 20 MHz. When actually transmitting using the "configured grant" resource, the UE may transmit the PUSCH only in the successful LBT subband by performing category 4 LBT for each LBT subband in 20 MHz unit. Therefore, the BW of the resource allocated for the "configured grant" purpose and the transmission BW used for transmission after the UE actually performs the LBT may be different. Therefore, in order to perform downlink transmission in a BW that does not exceed the BW transmitted by the UE within the COT shared with the BS, it is necessary to receive information on the transmission BW transmitted by the UE. For example, when the UE is assigned a "configured grant" resource for a 40 MHz BW including two LBT subbands 1 and 2 having a 20 MHz BW, only LBT subband 1 may succeed in LBT and the UE perform uplink transmission only through 20 MHz and share the remaining COT with the BS, the BS may perform downlink transmission only at the 20 MHz transmitted by the UE after a success in LBT. Therefore, when COT is shared between the uplink and the downlink, the BS may receive information on the actual transmission BW sent by the UE in the following methods.

[Proposed Method #5] CUL-UCI indicating signaling for the transmission BW as "unknown" (which may be a specific state of a specific field) may be received during an X slot (or X ms) immediately after "configured grant" uplink transmission, and CUL-UCI in the CUL PUSCH burst transmitted thereafter may receive information on the actual transmitted BW. However, the X value may be capability of the UE, may be a predetermined value, may be a set/indicated value, or a value fixed to X=1.

If a specific subband is set as a default or reference subband among LBT subbands of 20 MHz unit belonging to the BW allocated to CUL, the UE may attempt CUL PUSCH transmission only when LBT of least a default or reference LBT subband is successful. In this case, the BS receiving the transmission BW as "unknown" in CUL-UCI may use only the default or reference subband of the corresponding UE for COT sharing.

Conversely, even if the BS has received the transmission BW as "unknown" in CUL-UCI, if the BS may know (or may be assumed to know) the actual transmission BW through a DM-RS or an uplink initial signal, even if the transmission BW is signaled as "unknown" in the UCI, downlink transmission through COT sharing may be transmitted as the whole or only part of the transmission BW. That is, the BS may not perform downlink transmission through subbands larger than at least the transmission BW transmitted by the UE.

In particular, the above operations may also be applied even to a case in which a corresponding slot in which the COT sharing indication bit is activated indicates signaling for the transmission BW, as "unknown", when indicating that COT sharing is available through CUL-UCI after a Y slot (or Y ms) is applied.

[Proposed Method #6] CUL-UCI indicated by a minimum unit (or signaled specific BW) of the transmission BW of 20 MHz or LBT subband is received as signaling for transmission BW during X slot (or X ms) immediately after uplink transmission, and CUL-UCI in the CUL PUSCH burst transmitted thereafter may receive information on actual transmission BW. However, the X value may be capability of the UE, may be a predetermined value, a set/indicated value, or a value fixed to X=1.

If a specific subband is set as a default or reference subband among LBT subbands in a 20 MHz unit belonging to the BW allocated to CUL, the UE may attempt CUL PUSCH transmission only when the LBT of the default or reference LBT subband is successful. In this case, the BS receiving the transmission BW as 20 MHz or a minimum unit of LBT subband in CUL-UCI may use only the default or reference subband of the corresponding UE for COT sharing.

In particular, the above operations may also be applied even to a case in which a corresponding slot in which the COT sharing indication bit is activated indicates signaling for the transmission BW, as 20 MHz or a minimum unit of LBT subband (or signaled specific BW), when indicating that COT sharing is available through CUL-UCI after a Y slot (or Y ms) is applied.

[Proposed Method #7] Signaling for the transmitted BW actually transmitted from the UE may be received through a DM-RS or UL initial signal, not CUL-UCI.

Different DM-RS sequences or signals may be predefined according to the BW actually transmitted by the UE. Alternatively, only a portion of a signal generated for a DM-RS sequence or signal for the entire allocated BW, which is successful for LBT, may be transmitted (That is, an LBT-failed portion may be punctured and transmitted). A corresponding signal may be transmitted in a first symbol of a CUL PUSCH or in a configured/indicated symbol.

Assuming that the BS may know the BW actually transmitted by the UE through the DM-RS or UL initial signal, etc., downlink transmission through COT sharing from the BS's point of view may be transmitted through the entirety of a portion of the BW actually transmitted from the UE. That is, the BS may not share the downlink COT through subbands larger than at least the transmission BW actually transmitted by the UE.

As shown in FIG. 28, in a situation in which the BS allocates/configures a resource having a 40 MHz BW including two 20 MHz LBT subbands for "configured grant" uplink transmission to the UE, when the UE is successful in LBT only in the upper 20 MHz subband, COT 1 slot remaining after transmitting CUL PUSCH during 3 slots within COT for a total of 4 slots through 20 MHz BW may be shared for downlink transmission. In this case, it may be preferable for the BS to perform downlink transmission only in the BW transmitted by the UE within the shared COT.

Information on the BW in which the CUL PUSCH is actually transmitted may be known based on the "information on the actually transmitted BW" of the CUL-UCI included in the CUL PUSCH transmitted from the UE after X slot (or X ms) or a DM-RS or a UL initial signal, and may be utilized for downlink transmission in the shared COT based thereon.

[Proposed Method #8] When CUL-UCI including information on transmission BW in CUL-PUSCH is mapped as follows, corresponding information may be received and used when UL to DL COT is shared.

(1) CUL-UCI mapped from the last symbol in the slot (or from symbol K) may always be received.
(2) Among the information in CUL-UCI, separate encoding from the other information in the CUL-UCI may be applied to information on the transmission BW and mapped CUL-UCI may be received from the last symbol in the slot (or from symbol K).
(3) If a gap between a first symbol to which CUL-UCI is mapped and an (actual) transmission start time of the CUL-PUSCH in the slot (or the most preceding transmission time among candidates that may start transmission within the slot or the most posterior transmission among the candidates that may start transmission within the slot) is larger than a Y symbol (or Y usec), the CUL-UCI mapped from the last symbol in the slot may be received.

However, the Y value may be capability of the UE and may be a predetermined value or a set/indicated value. In addition, when the gap is smaller than Y in (3), information on the transmission BW may also be transmitted to the BS by the methods of [Proposed Method #1], [Proposed Method #2], and [Proposed Method #3] of the present disclosure.

Or even in the case of (1) and/or (2) above, if the gap between the first symbol to which CUL-UCI is mapped and the transmission start time of the CUL-PUSCH in the slot (or the most preceding transmission time among candidates that may start transmission within the slot or the most posterior transmission among the candidates that may start transmission within the slot) is larger than the Y symbol (or Y usec), information on the actual transmission BW may be included, and if the gap between the first symbol to which CUL-UCI is mapped and the transmission start time of the CUL-PUSCH in the slot (or the most preceding transmission time among candidates that may start transmission within the slot or the most posterior transmission among the candidates that may start transmission within the slot) is smaller than the Y symbol (or Y usec), information on the transmission BW may be transmitted to the BS by the methods of [Proposed Method #1], [Proposed Method #2], and [Proposed Method #3] of the present disclosure.

However, the K value may be predetermined or signaled as a specific value, or the K value may be determined as a position relative to the position of the DM-RS symbol.

It may be difficult for the UE to map and transmit the CUL-UCI containing information on the transmission BW immediately after LBT success, considering the complexity of the UE implementation. However, as described above, in the CUL-UCI mapping method, (1) when it is always mapped from the last symbol in the slot, (2) when CUL-UCI containing information on the transmission BW is always from the last symbol in the slot or (3) when an interval between the first symbol to which CUL-UCI is mapped from the start of PUSCH transmission is greater than Y, time for information on the transmission BW may be secured after the UE succeeds in LBT. Accordingly, the BS may receive the CUL-UCI mapped by the above methods and utilize the UL to DL COT sharing by referring to the information on the transmission BW.

If the CUL-PUSCH supports a plurality of transmission start points and an actual transmission start point starts from a specific symbol in the slot so a gap to the first symbol to which CUL-UCI is mapped is smaller than Y, then it may be difficult to map the CUL-UCI including information on the transmission BW directly to the slot in which the corresponding CUL-PUSCH is transmitted. Therefore, in this case, information on the transmission BW may be transmitted to the BS in the method like Proposed Method #1 to #3.

[Proposed Method #10] A bandwidth (BW) of DL/UL BWP configured to the UE and a size of configured/indicated "configured grant" frequency resource may be a broadband (>20 MHz) including a plurality of LBT subbands. In this case, the BS may share a remaining COT after DL transmission in the COT acquired through LBT and inform the UE that UL transmission is available. In this case, information on which band within the COT acquired by the BS may transmit the CUL PUSCH may be indicated to the UE through a (group-common) PDCCH as follows.

(1) In which band, based on a band of DL transmitted as the BS succeeds in LBT (or band corresponding to LBT subband(s) indicated to be available for DL) (which may include single or a plurality of LBT subbands), CUL PUSCH transmission is available may be informed through a bitmap corresponding to each LBT subband in the (group-common) PDCCH. In addition, the UE may determine whether the configured CUL PUSCH is valid and the LBT type.

Since the existing wireless communication system only supports DL/UL transmission in units of a single LBT subband (20 MHz), the BS may simply inform the group-common PDCCH as to whether or not AUL transmission of the UE is available within the COT acquired by itself. However, in NR, BWP having a BW greater than 20 MHz and CUL resource may be set, and when the UE and the BS attempts LBT in each of the plurality of LBT subbands constituting a corresponding band, and DL/UL transmission is available in the LBT subband when successful. Therefore, the BS may need to inform the UE in which band within the acquired COT acquired by itself, UL transmission is available or CUL transmission is available.

The BS may map each LBT subband constituting the DL BWP/CC to each 1 bit on the bitmap and inform the UEs on which LBT subband it has succeeded in DL LBT (or whether DL on which LBT subband is available) through a (group-common) PDCCH. That is, the LBT subband enabled in the bitmap of the (group-common) PDCCH may be interpreted as being capable of UL and COT sharing of the UE. The BS may inform the UE whether or not additional CUL transmission is performed, and when CUL transmission is allowed, the UE may transmit the CUL PUSCH through the CUL resource preset in the corresponding band. Alternatively, the BS notifies only information on which LBT subband of the LBT subbands constituting the DL BWP/CC has succeeded in DL LBT to the UEs, and the UE may determine whether CUL transmission is available for CUL PUSCH (resource) previously set in the corresponding BWP/CC and/or an LBT type for CUL transmission FIG. 34 illustrates performing a CUL COT sharing operation only in a band that succeeds in DL LBT among a plurality of LBT subbands.

Figure 34:
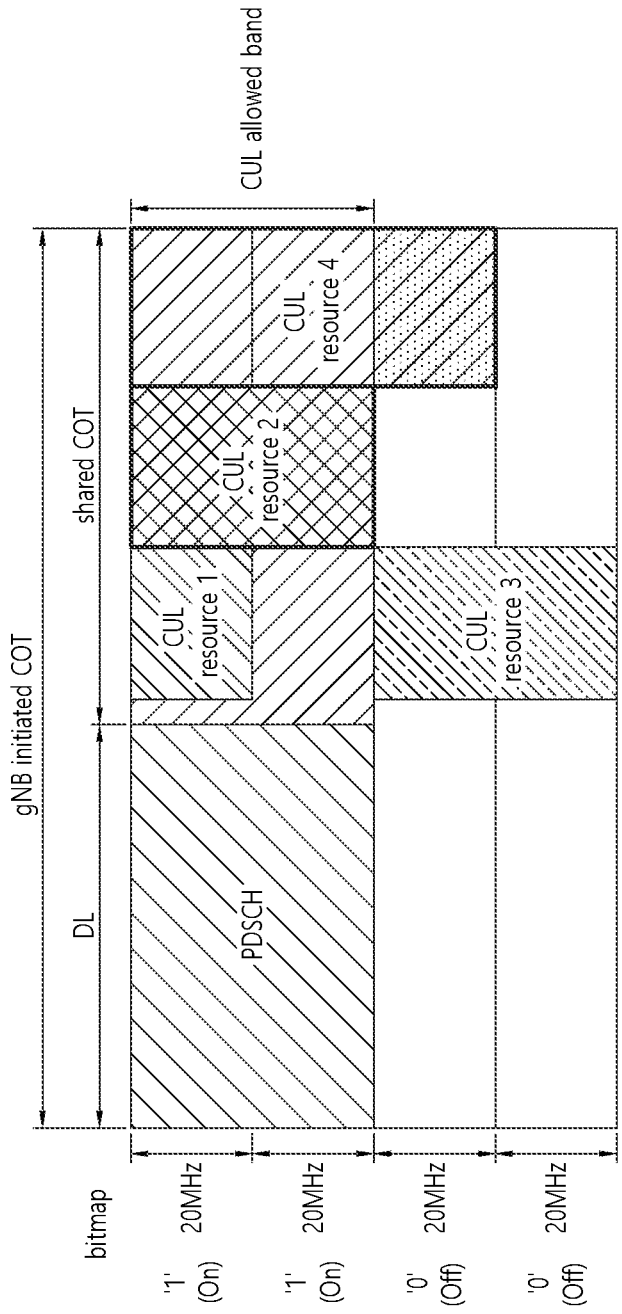
FIG. 34 illustrates performing a CUL COT sharing operation only in a band that succeeds in DL LBT among a plurality of LBT subbands.

As shown in FIG. 34, when a DL BWP of 80 MHz including four LBT subbands is configured, the BS may perform DL transmission by succeeding in LBT only in the upper two LBT subbands. And, if the BS wants to inform the UE(s) that UL COT sharing is available in the remaining COT period (time) and the band (frequency) successful in LBT, the BS may transmit a bitmap "1100" including 4 bits, COT information of the BS, and whether CUL in the corresponding COT can be transmitted to (group-common) PDCCH.

Here, the UE(s) may have been configured with a single or a plurality of "configured grant" resources (e.g., 1 to 4 CUL resources). If the frequency resource of the configured "configured grant" is within the band successful in DL LBT and the BS indicates that CUL COT sharing is available in the corresponding band by (group-common) PDCCH, the UE having data to be transmitted among the UE(s) may transmit CUL PUSCH after performing Cat-2 LBT (or may be transmitted without LBT if the gap between transmissions is 16 μs).

As in the example of FIG. 34, when the BS indicates to the UE that CUL COT can be shared after transmitting the 40 MHz PDSCH using the upper two LBT subbands, in the case of CUL resource 1 and CUL resource 2, among 4 "configured grant" resources configured (or activated) to the UE, a frequency resource is located in the DL LBT successful band, and thus, if there is data to be sent by the UE, CUL PUSCH transmission is available after Cat-2 LBT (or transmission may be made if the gap between transmission is less than 16 μs).

In the example of FIG. 34, in CUL resource 1, the UE transmits CUL PUSCH because there is data to be transmitted, and CUL resource 2 is available for transmission, but transmission may not be performed because there is no data to be transmitted. In the case of CUL resource 4, since the lower 20 MHz of the three LBT subbands does not belong to the CUL allowed band, the COT of the BS cannot be shared and transmitted. That is, in this case, the UE may not attempt to transmit CUL PUSCH on CUL resource 4. Alternatively, the UE may attempt CUL PUSCH transmission using only the CUL-allowed band in CUL resource 4. In the case of CUL resource 3, the configured frequency resource does not belong to the CUL-allowed band, but is located in a band that does not overlap the band successful in DL LBT band and is not a DL period, so the UE may perform CUL PUSCH transmission on CUL resource 3. Specifically, if there is data to be transmitted on CUL resource 3, the UE may perform a general Cat-4 LBT and transmit CUL PUSCH upon success.

Or, In relation to the aforementioned Proposed Method #10, apart from indicating whether CUL PUSCH transmission is available within the COT of the BS through the (group-common) PDCCH, whether CUL PUSCH transmission is available may be informed to the UE through i) higher layer signaling such as RRC, ii) a physical layer signal such as DCI (transmitted through a UE-specific PDCCH) or iii) a combination thereof. If it is signaled to the UE that CUL PUSCH transmission is not available in any one of the above i) to iii), the CUL PUSCH is cannot be transmitted even if CUL PUSCH transmission is available is indicated in the COT through the (group-common) PDCCH.

As in the proposed method, the operation of notifying whether or not CUL PUSCH transmission is available to the UE through the (group-common) PDCCH and transmitting the CUL PUSCH may be allowed only when it is signaled to the UE that CUL PUSCH transmission is available by any one of the methods i) to iii).

When whether CUL PUSCH transmission is available is not separately signaled to the UE, the UE may assume that the CUL PUSCH can be transmitted in the CUL resource that is always configured separately from being indicated whether the CUL PUSCH transmission is available through the (group-common) PDCCH, and, for resources belonging to the LBT subband COT resource (meaning both time and frequency resources) of the BS, the Cat-2 LBT is applied, and for CUL resources that do not belong to the LBT subband COT obtained by the BS by DL LBT, the Cat-4 LBT may be applied, and CUL PUSCH may be transmitted upon success.

In a situation in which CUL PUSCH transmission is always allowed to the UE, as shown in CUL resource 4 of FIG. 34, when all configured CUL (frequency axis) resources do not belong to a CUL-allowed band (i.e., the CUL resource 4 includes three LBT subbands on the frequency axis, of which the lowest subband (20 MHz) does not belong to the CUL-allowed band), although CUL PUSCH transmission cannot be made through all CUL resources 4 by performing Cat-2 LBT, Cat-4 LBT may be performed, and In the case of success, CUL PUSCH transmission using CUL resource 4 may be allowed (even if CUL resource not belonging to the CUL-allowed band exists).

In this proposal, in addition to indicating whether to allow CUL PUSCH transmission in the shared COT, a minimum (or maximum) LBT priority class value in which transmission is allowed may be indicated. For example, as shown in FIG. 34, LBT priority class #n may be indicated, while allowing CUL PUSCH transmission in a BS-initiated (gNB initiated) COT. Here, when there is data to be transmitted by the UE and the corresponding data corresponds to LBT priority class #k (<n), CUL PUSCH transmission may not be allowed even in CUL resource 1 and CUL resource 2. Here, regardless of the indicated LBT priority class (and regardless of whether CUL PUSCH transmission in the shared COT is allowed), the UE may transmit CUL PUSCH on the CUL resource 3 phase upon success by performing Cat-4 LBT.

Although the BS indicates that (i) UL COT sharing is available and (ii) transmission available band information by a bitmap through the (group-common) PDCCH, if CUL transmission is not allowed, transmission of CUL resources overlapped in the COT sharing available band and the COT region may not be allowed.

Figure 35:
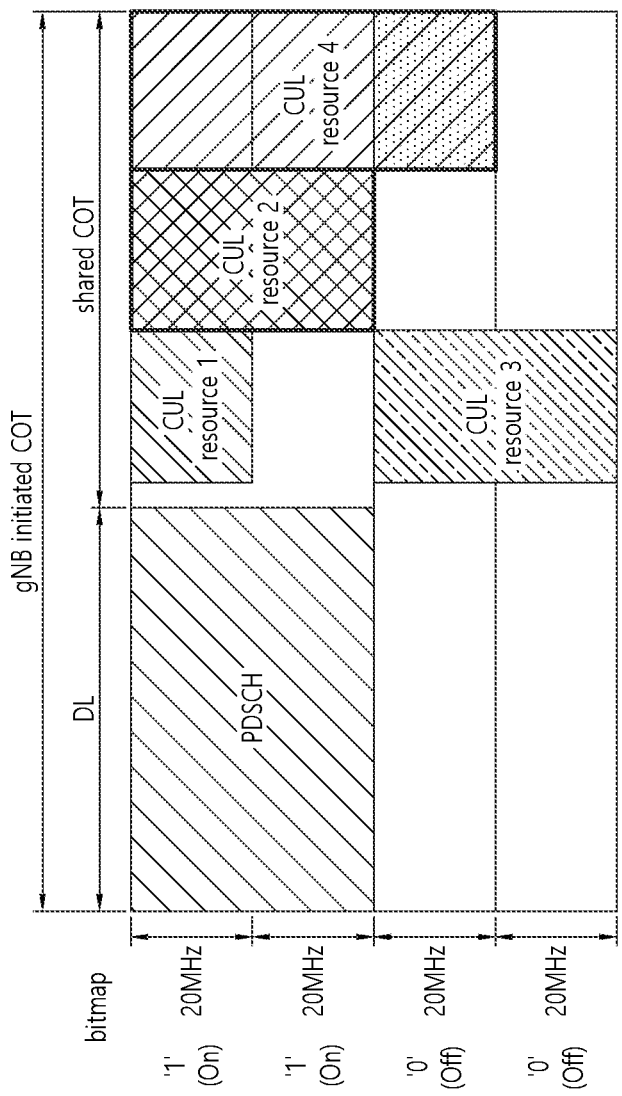
FIG. 35 illustrates an operation of the BS and the UE when it is indicated that the BS does not allow CUL transmission in the shared COT.

FIG. 35 illustrates an operation of the BS and the UE when it is indicated that the BS does not allow CUL transmission in the shared COT.

As shown in FIG. 35, the BS may indicate information on a transmittable band through a (group-common) PDCCH by a bitmap "1100" and indicate that CUL transmission is impossible. In this case, a COT (time) and CUL resources 1, 2, and 4 configured in a subband (frequency) that succeeded in DL LBT shared after the DL transmission is finished are not allowed to transmit CUL in the COT even though the CUL resource is configured, and thus, CUL PUSCH transmission is impossible. However, since CUL resource 3 does not overlap the DL LBT success band of the BS and is not a DL period, CUL transmission may be available in the corresponding CUL resource 3 upon success after performing Cat-4 LBT regardless of the UL COT sharing of the BS.

The aforementioned [Proposed Method #10] may be applied to UL transmissions configured by higher layer signaling such as RRC as well as CUL PUSCH, for example, UL transmission such as semi-persistent PUCCH/SRS/PUSCH (i.e., if CUL transmission permission is indicated, RRC-configured UL transmissions are also allowed, and vice versa is not allowed).

[Proposed Method #12] When sharing the remaining COT after DL transmission in the COT obtained by the BS to the UE, information on the LBT type and LBT gap of the UL(s) to be transmitted in the COT may be indicated/configured to the UE through (group-common) PDCCH or indicated/configured through higher layer signaling, or indicated/configured through a combination thereof.

However, the LBT types that may be indicated above include, for example, Cat-1 LBT or Cat-2 LBT in a 16 us gap, and Cat-2 LBT in a 25 us gap.

(4) One of the available LBT types may be indicated through a (group-common) PDDCH.
(5) Which LBT type is used for UL transmission through higher layer (e.g., RRC) signaling may be configured.
(6) LBT types may be configured through higher layer (e.g., RRC) signaling in advance, and one of them may be dynamically indicated.

In addition, a different LBT type may be indicated for a plurality of UL schedulings in the COT based on information on the COT structure of the BS (information on the DL region and the UL region). Even if 16 us Cat-1 LBT is indicated for a first scheduled UL and 16 μs Cat-1 LBT is indicated for a second UL transmission, the UE may perform LBT by interpreting an LBT type (for example, 16 us Cat-2 LBT) different from the LBT type indicated for the first UL.

There are three LBT types that may be indicated to the UE, that is, Cat-1 LBT and Cat-2 LBT in the 16 us gap and Cat-2 LBT in the 25 us gap. In the existing LAA, even if the LBT type is indicated as Cat-4 in the UL grant indicated by the BS, when it is recognized as UL transmission transmitted within the COT of the BS, the UE performed Cat-2 LBT instead of Cat-4 LBT. In NR-U, since there are three available LBT types, the BS may indicate to the UE the LBT type to be performed by the UE in the COT by using a (group-common) PDCCH or higher layer signaling or a combination thereof.

The three LBT types may be dynamically indicated by (group-common) PDCCH as in (a), or it may be configured to perform only a specific LBT type in advance with higher layer signaling as in (2). Alternatively, as in (3), LBT types to be indicated by higher layer signaling may be configured in advance and one of them may be dynamically indicated. For example, a 16 us Cat-2 LBT and a 25 us Cat-2 LBT may be set as higher layer signaling, and which LBT is to be used may be indicated to the UE through 1 bit in the (group-common) PDCCH.

In addition, a different LBT type may be indicated for a plurality of UL schedulings in the COT based on information on the COT structure of the BS (information on the DL region and the UL region). Alternatively, although one LBT type is indicated, the UE may perform LBT by interpreting it as another LBT type. For example, when 16 us Cat-1 LBT is indicated for two UL schedulings in the COT of the BS, in the case of the LBT immediately before the second UL, UL transmission may not have been properly performed, so 16 us Cat-2 may be interpreted as 16 us Cat-2 LBT and transmission is performed after confirming that the channel is idle, although 16 us Cat-1 LBT is indicated.

3) Receiver and Transmitter

Figure 36:
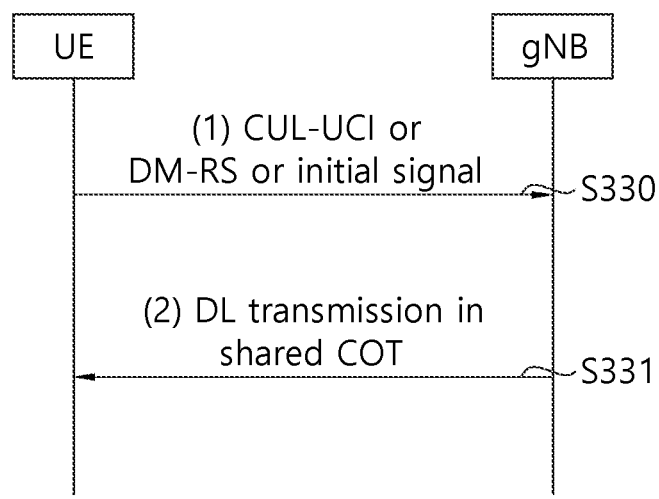
FIG. 36 illustrates signaling for a transmission BW between a UE and a BS and downlink transmission of a BS within a shared COT.

FIG. 36 illustrates signaling for a transmission BW between a UE and a BS and downlink transmission of a BS within a shared COT.

Referring to FIG. 36, when the UE transmits the CUL PUSCH only in BW successful in LBT among BWs allocated for the "configured grant", the UE may transmit information (information on transmission BW) on the BW (successful in LBT) currently transmitted through CUL-UCI, DM-RS or an initial signal (S330). That is, the UE may transmit the information on the BW (successful in LBT) currently transmitted through CUL-UCI, DM-RS or UL initial signal that is multiplexed with CUL-PUSCH and transmitted to the BS by using the methods of [Proposed Method #1] to [Proposed Method #6]

The BS that has shared the COT may perform downlink transmission based on the information on the transmission BW sent from the UE (S331).

4) Effects of the Present Disclosure

A UE or BS having shared COT may start transmission with only a category 2 LBT, that is, a one-shot LBT, without having to perform a random backoff-based category 4 LBT again (when a gap between DL to UL or between UL to DL is less than 25 μs). Therefore, when the UE shares the COT acquired through the category 4 LBT with the BS, the BS may quickly perform channel access and perform downlink transmission without having to perform the category 4 LBT again.

In NR-U, unlike LTE LAA, the UE may be assigned a BW of 20 MHz or higher. For example, a transmitting end may divide 40 MHz into LBT subbands in units of 20 MHz and perform LBT on each subband, so that transmission may be started only for BWs that have succeeded in LBT. Therefore, when the UE is allocated a BW of 20 MHz or higher as a "configured grant" resource, performs a category 4 LBT to perform transmission in the BW that has succeeded in LBT, and shares a remaining COT to the BS, it may be desirable for the BS to perform downlink transmission only with a BW equal to or smaller than the transmission BW used for link transmission when the UE succeeded in LBT. Therefore, when the UE signals information on the BW transmitted by the UE to the BS through a CUL-UCI or DM-RS or UL initial signal, the BS may utilize information on the BW when performing downlink transmission within the shared COT.

Figure 37:
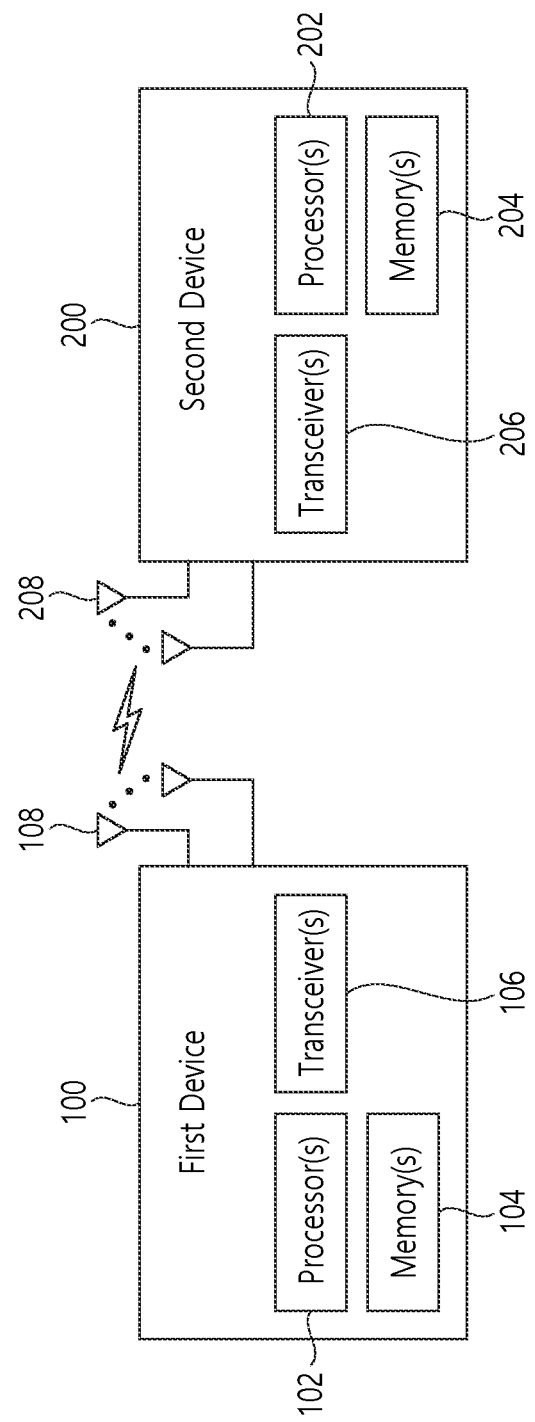
FIG. 37 illustrates a wireless device applicable to the present disclosure.

FIG. 37 illustrates a wireless device applicable to the present disclosure.

Referring to FIG. 37, a first wireless device 100 and a second wireless device 200 may transmit and receive wireless signals through various wireless access technologies (e.g., LTE and NR). Here, {first wireless device 100, second wireless device 200} may be matched to {wireless device 100x, BS 200} and/or {wireless device 100x, wireless device 100x).

The first wireless device 100 includes one or more processors 102 and one or more memories 104, and may further include one or more transceivers 106 and/or one or more antennas 108. The processor 102 may control the memory 104 and/or the transceiver 106 and may be configured to implement the descriptions, functions, procedures, proposals, methods, and/or operational flowcharts disclosed herein. For example, the processor 102 may generate first information/signal by processing information in the memory 104 and then transmit a wireless signal including the first information/signal through the transceiver 106. In addition, the processor 102 may receive a wireless signal including second information/signal through the transceiver 106 and then store information obtained by processing the second information/signal in the memory 104. The memory 104 may be connected to the processor 102 and may store various information related to the operation of the processor 102. For example, the memory 104 may perform some or all of the processes controlled by the processor 102 or store software codes including commands for performing the descriptions, functions, procedures, proposals, methods, and/or operational flowcharts disclosed herein. Here, the processor 102 and the memory 104 may be part of a communication modem/circuit/chip designed to implement wireless communication technology (e.g., LTE, NR). The transceiver 106 may be connected to the processor 102 and may transmit and/or receive wireless signals through one or more antennas 108. The transceiver 106 may include a transmitter and/or a receiver. The transceiver 106 may be mixed with a radio frequency (RF) unit. In the present disclosure, a wireless device may refer to a communication modem/circuit/chip.

The second wireless device 200 includes one or more processors 202 and one or more memories 204, and may further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed herein. For example, the processor 202 may generate third information/signal by processing information in the memory 204 and then transmit a wireless signal including the third information/signal through the transceiver 206. In addition, the processor 202 may receive a wireless signal including fourth information/signal through the transceiver 206 and then store information obtained by processing the fourth information/signal in the memory 204. The memory 204 may be connected to the processor 202 and may store various information related to the operation of the processor 202. For example, the memory 204 may perform some or all of the processes controlled by the processor 202 or store software codes including commands for performing the descriptions, functions, procedures, proposals, methods, and/or operational flowcharts disclosed herein. Here, the processor 202 and the memory 204 may be part of a communication modem/circuit/chip designed to implement wireless communication technology (e.g., LTE, NR). The transceiver 206 may be connected to the processor 202 and may transmit and/or receive wireless signals through one or more antennas 208. The transceiver 206 may include a transmitter and/or a receiver. The transceiver 206 may be mixed with a radio frequency (RF) unit. In the present disclosure, a wireless device may refer to a communication modem/circuit/chip.

Hereinafter, hardware elements of the wireless devices 100 and 200 will be described in more detail. Although not limited thereto, one or more protocol layers may be implemented by one or more processors 102, 202. For example, one or more processors 102 and 202 may implement one or more layers (e.g., functional layers such as PHY, MAC, RLC, PDCP, RRC, or SDAP). One or more processors 102 and 202 may generate one or more protocol data units (PDUs) and/or one or more service data units (SDUs) according to the descriptions, functions, procedures, proposals, methods, and/or operational flowcharts disclosed in this document. One or more processors 102 and 202 may generate messages, control information, data, or information according to the descriptions, functions, procedures proposals, methods, and/or operational flowcharts disclosed herein. One or more processors 102 and 202 generate signals (e.g., baseband signals) including PDUs, SDUs, messages, control information, data or information according to the functions, procedures, proposals and/or methods disclosed herein and provide the generated signal to one or more transceivers 106 and 206. One or more processors 102 and 202 may receive signals (e.g., baseband signals) from one or more transceivers 106 and 206 and acquire PDUs, SDUs, messages, control information, data or information according to the descriptions, functions, procedures, proposals, methods, and/or operational flowcharts disclosed herein.

The one or more processors 102 and 202 may be referred to as a controller, a microcontroller, a microprocessor, or a microcomputer. One of processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 102 and 202. The descriptions, functions, procedures, proposals, methods, and/or operational flowcharts disclosed in this document may be implemented using firmware or software, and firmware or software may be implemented to include modules, procedures, functions, and the like. Firmware or software set to perform the descriptions, functions, procedures, proposals, methods and/or operational flowcharts disclosed in this document may be included in one or more processors 102 and 202 or may be stored in one or more memories 104 and 204 and driven by one or more processors 102 and 202. The descriptions, functions, procedures, proposals, methods, and/or operational flowcharts disclosed in this document may be implemented using firmware or software in the form of codes, instructions, and/or sets of commands.

One or more memories 104, 204 may be connected to one or more processors 102 and 202 and may store various types of data, signals, messages, information, programs, codes, instructions, and/or commands. One or more memories 104 and 204 may include ROM, RAM, EPROM, flash memory, hard drive, register, cache memory, computer readable storage medium, and/or combinations thereof. One or more memories 104 and 204 may be located inside and/or outside one or more processors 102 and 202. In addition, one or more memories 104, 204 may be connected to one or more processors 102, 202 through various technologies such as wired or wireless connection.

The one or more transceivers 106 and 206 may transmit user data, control information, wireless signals/channels, and the like mentioned in the methods and/or operational flowcharts of this document to one or more other devices. One or more transceivers 106 and 206 may receive user data, control information, wireless signals/channels, etc. mentioned in the descriptions, functions, procedures, proposals, methods and/or operational flowcharts disclosed in this document from one or more other devices. For example, one or more transceivers 106 and 206 may be connected to one or more processors 102 and 202 and may transmit and receive wireless signals. For example, one or more processors 102 and 202 may control one or more transceivers 106 and 206 to transmit user data, control information, or wireless signals to one or more other devices. In addition, one or more processors 102, 202 may control one or more transceivers 106 and 206 to receive user data, control information, or wireless signals from one or more other devices. In addition, one or more transceivers 106 and 206 may be connected to one or more antennas 108 and 208, and one or more transceivers 106 and 206 may be configured to transmit and receive user data, control information, wireless signals/channels, and the like mentioned in the descriptions, functions, procedures, proposals, methods and/or operational flowcharts disclosed in this document through one or more antennas 108 and 208. In this document, one or more antennas may be a plurality of physical antennas or a plurality of logical antennas (e.g., antenna ports). One or more transceivers 106 and 206 may convert received wireless signals/channels, etc. from RF band signals to baseband signals to process received user data, control information, wireless signal/channels, etc. using one or more processors 102 and 202. One or more transceivers 106 and 206 may convert the user data, control information, wireless signals/channels, etc. processed using one or more processors 102 and 202 from baseband signals to RF band signals. To this end, one or more of the transceivers 106 and 206 may include (analog) oscillators and/or filters.

Figure 38:
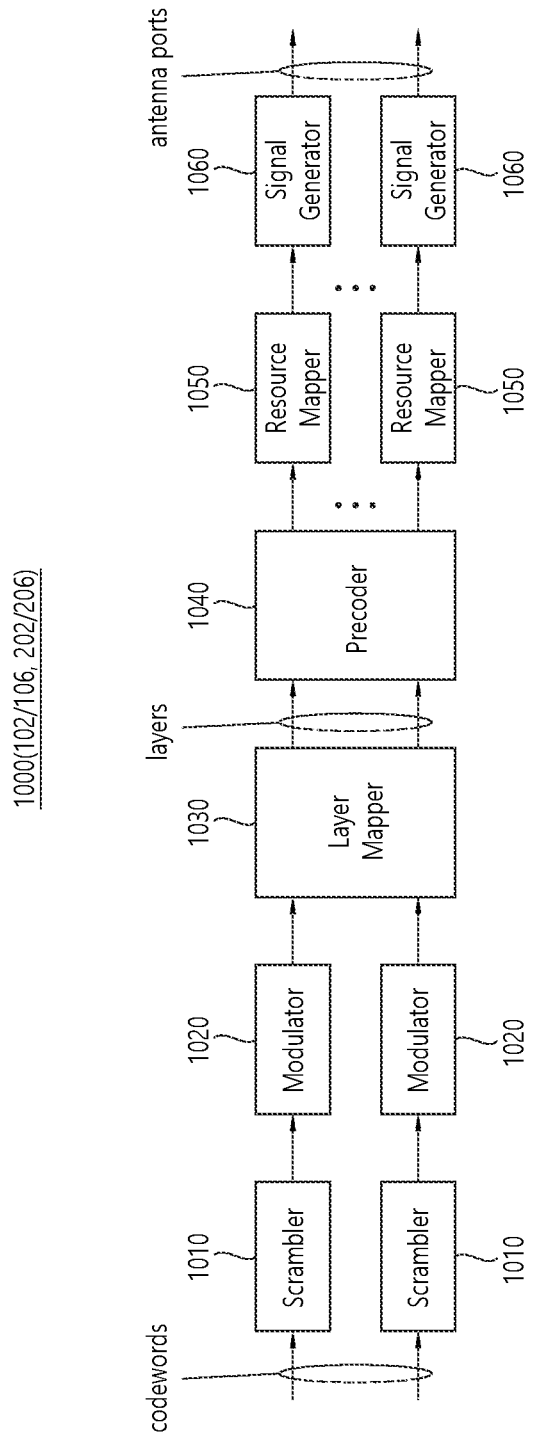
FIG. 38 exemplifies a signal processing circuit for a transmission signal.

FIG. 38 exemplifies a signal processing circuit for a transmission signal.

Referring to FIG. 38, a signal processing circuit 1000 includes a scrambler 1010, a modulator 1020, a layer mapper 1030, a precoder 1040, a resource mapper 1050, and a signal generator 1060. The operations/functions of FIG. 38 may be performed in the processors 102 and 202 and/or the transceivers 106 and 206 of FIG. 37 but are not limited thereto. The hardware elements of FIG. 38 may be implemented in the processors 102 and 202 and/or the transceivers 106 and 206 of FIG. 37. For example, blocks 1010 to 1060 may be implemented in the processors 102 and 202 of FIG. 37. In addition, blocks 1010 to 1050 may be implemented in the processors 102 and 202 of FIG. 37, and block 1060 may be implemented in the transceivers 106 and 206 of FIG. 37.

A codeword may be converted into a wireless signal through the signal processing circuit 1000 of FIG. 38. Here, the codeword is an encoded bit sequence of an information block. The information block may include a transport block (e.g., a UL-SCH transport block or a DL-SCH transport block). The wireless signal may be transmitted through various physical channels (e.g., PUSCH or PDSCH).

Specifically, the codeword may be converted into a scrambled bit sequence by the scrambler 1010. The scramble sequence used for scrambling is generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. The modulation symbols of each transport layer may be mapped to the corresponding antenna port(s) by the precoder 1040 (precoding). An output z of the precoder 1040 may be obtained by multiplying an output y of the layer mapper 1030 by an N*M precoding matrix W. Here, N is the number of antenna ports and M is the number of transmission layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols or DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an inverse fast Fourier transform (IFFT) module, a cyclic prefix (CP) inserter, a digital-to-analog converter (DAC), a frequency uplink converter, and the like.

A signal processing process for a received signal in the wireless device may be configured as the reverse of the signal processing process (1010 to 1060) of FIG. 38. For example, a wireless device (e.g., 100 or 200 in FIG. 37) may receive a wireless signal from the outside through an antenna port/transmitter. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be restored into a codeword through a resource de-mapper process, a postcoding process, a demodulation process, and a de-scramble process. The codeword may be restored to an original information block through decoding. Accordingly, a signal processing circuit (not shown) for a received signal may include a signal restorer, a resource demapper, a postcoder, a demodulator, a descrambler, and a decoder.

Figure 39:
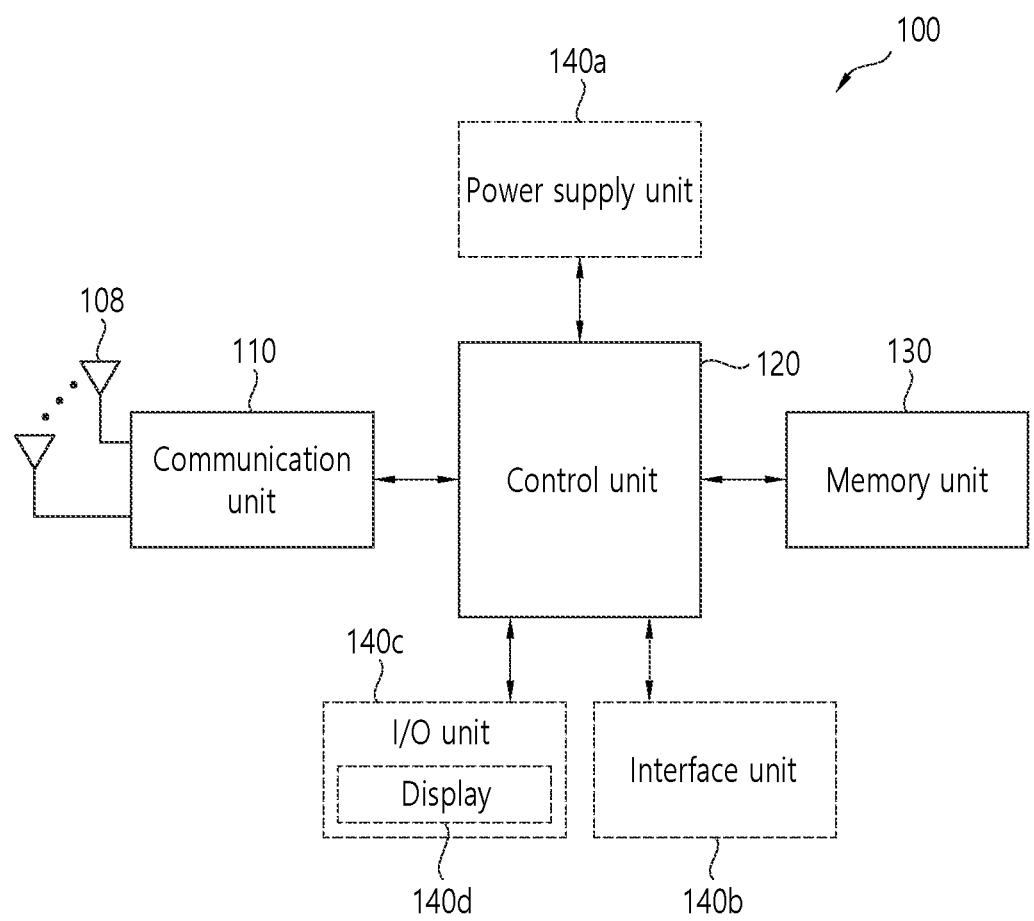
FIG. 39 illustrates a portable device applied to the present disclosure.

FIG. 39 illustrates a portable device applied to the present disclosure.

The portable device may include a smartphone, a smart pad, a wearable device (e.g., smart watch or smart glasses), a portable computer (e.g., a notebook), etc. The portable device may be referred to as a mobile station (MS), a user terminal (UT), a mobile subscriber station (MSS), a subscriber station (SS), an advanced mobile station (AMS), or a wireless terminal (WT).

Referring to FIG. 39, the portable device 100 may include an antenna unit 108, a communication unit 110, a controller 120, a memory unit 130, a power supply unit 140a, an interface unit 140b, and input/output unit 140c. The antenna unit 108 may be configured as a part of the communication unit 110. Blocks 110 to 130/140a to 140c correspond to blocks 110 to 130/140 of FIG. 43, respectively.

The communication unit 110 may transmit and receive signals (e.g., data, control signals, etc.) with other wireless devices and BSs. The controller 120 may perform various operations by controlling components of the portable device 100. The controller 120 may include an application processor (AP). The memory unit 130 may store data/parameters/programs/codes/commands required for driving the portable device 100. Also, the memory unit 130 may store input/output data/information, and the like. The power supply unit 140a supplies power to the portable device 100 and may include a wired/wireless charging circuit, a battery, and the like. The interface unit 140b may support connection between the portable device 100 and other external devices. The interface unit 140b may include various ports (e.g., audio input/output ports or video input/output ports) for connection with external devices. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c acquires information/signals (e.g., touch, text, voice, image, or video) input from the user, and the acquired information/signals may be stored in the memory unit 130. The communication unit 110 may convert information/signals stored in the memory into wireless signals and may directly transmit the converted wireless signals to other wireless devices or to a BS. In addition, after receiving a wireless signal from another wireless device or a BS, the communication unit 110 may restore the received wireless signal to the original information/signal. The restored information/signal may be stored in the memory unit 130 and then output in various forms (e.g., text, voice, image, video, or haptic) through the input/output unit 140c.

Although not shown in FIG. 39, various components such as a camera, a universal serial bus (USB) port, etc. may be additionally included in the UE. For example, the camera may be connected to the processor.

The UE may perform a network access procedure to perform the procedures and/or methods described/suggested above. For example, while accessing a network (e.g., a BS), the UE may receive system information and configuration information required to perform the procedures and/or methods described/suggested above and store the same in a memory. The configuration information required for the present disclosure may be received through higher layer (e.g., RRC layer; medium access control (MAC), layer, etc.) signaling.

Figure 40:
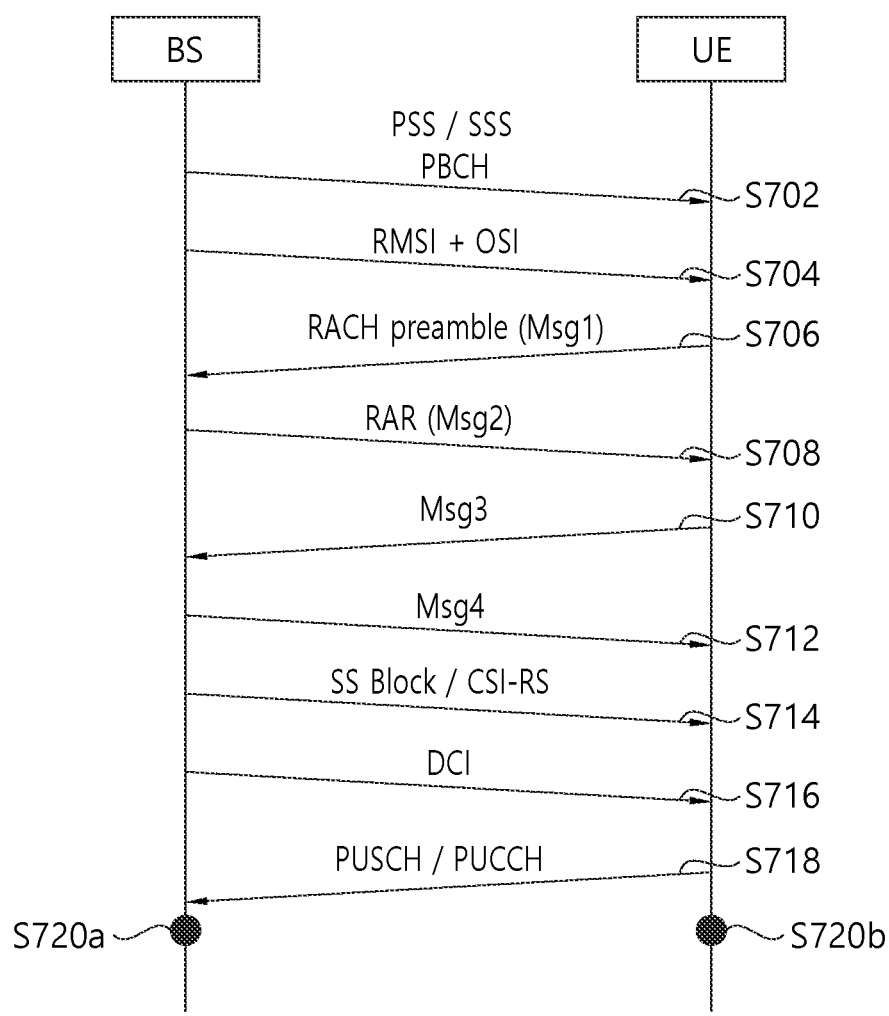
FIG. 40 illustrates an initial network connection and a subsequent communication process.

FIG. 40 illustrates an initial network connection and a subsequent communication process.

In NR, a physical channel and a reference signal may be transmitted using beam-forming. Supporting beam-forming-based signal transmission may entail a beam-management process to align beams between the BS and the UE. In addition, a signal proposed in the present disclosure may be transmitted/received using beam-forming. In a radio resource control (RRC) IDLE mode, beam alignment may be performed based on SSB. Meanwhile, in an RRC CONNECTED mode, beam alignment may be performed based on CSI-RS (in DL) and SRS (in UL). Meanwhile, when beam-forming-based signal transmission is not supported, an operation related to a beam may be omitted in the following description.

Referring to FIG. 40, a BS may periodically transmit an SSB (S702). Here, the SSB includes a PSS/SSS/PBCH. The SSB may be transmitted using beam sweeping. Thereafter, the BS may transmit remaining minimum system information (RMSI) and other system information (OSI) (S704). The RMSI may include information (e.g., PRACH configuration information) necessary for the UE to initially access the BS. Meanwhile, after performing SSB detection, the UE identifies the best SSB. Thereafter, the UE may transmit the RACH preamble (Message 1, Msg1) to the BS using the PRACH resource linked/corresponding to an index (i.e., the beam) of the best SSB (S706). A beam direction of the RACH preamble is associated with the PRACH resource. The association between the PRACH resource (and/or the RACH preamble) and the SSB (index) may be set through system information (e.g., RMSI). Thereafter, as part of the RACH process, the BS may transmit a random access response (RAR) (Msg2) in response to the RACH preamble (S708), and the UE may transmit Msg3 (e.g., RRC connection request) using a UL grant in the RAR (S710), and the BS may transmit a contention resolution message Msg4 (S720). Msg4 may include RRC connection setup.

When an RRC connection is established between the BS and the UE through the RACH process, subsequent beam alignment may be performed based on SSB/CSI-RS (in DL) and SRS (in UL). For example, the UE may receive an SSB/CSI-RS (S714). The SSB/CSI-RS may be used for the UE to generate a beam/CSI report. Meanwhile, the BS may request a beam/CSI report from the UE through DCI (S716). In this case, the UE may generate a beam/CSI report based on the SSB/CSI-RS and transmit the generated beam/CSI report to the BS through a PUSCH/PUCCH (S718). The beam/CSI report may include a beam measurement result, information on a preferred beam, and the like. The BS and the UE may switch the beam based on the beam/CSI report (S720a, S720b).

Thereafter, the UE and the BS may perform the procedures and/or methods described/proposed above. For example, the UE and the BS may process the information in the memory according to the proposal of the present disclosure based on the configuration information obtained in the network access process (e.g., system information acquisition process, RRC connection process through RACH, etc.) and transmit a wireless signal, or may process a received wireless signal and store the processed signal in the memory. Here, the wireless signal may include at least one of a PDCCH, a PDSCH, and a reference signal (RS) in the case of downlink, and may include at least one of a PUCCH, a PUSCH, and an SRS in the case of uplink.

<Discontinuous Reception (DRX)>

Discontinuous reception (DRX) refers to an operation mode that enables a UE to reduce battery consumption and to discontinuously receive a downlink channel. That is, the UE configured in DRX may discontinuously receive a DL signal, thereby reducing power consumption.

A DRX operation is performed within a DRX cycle indicating a time period in which an on duration is periodically repeated. The DRX cycle includes an on duration and a sleep duration (or opportunity for DRX). The on duration indicates a time period in which a UE monitors a PDCCH to receive the PDCCH.

DRX may be performed in a radio resource control (RRC)_IDLE state (or mode), RRC_INACTIVE state (or mode), or RRC_CONNECTED state (or mode). In the RRC_IDLE state and the RRC_INACTIVE state, DRX may be used to discontinuously receive a paging signal.

- RRC_IDLE state: State in which a wireless connection (RRC connection) is not established between a base station and a UE
- RRC_INACTIVE state: State in which a wireless connection (RRC connection) is established between a base station and a UE but is deactivated
- RRC_CONNECTED state: State in which a radio connection (RRC connection) is established between a base station and a UE.

DRX may be basically divided into idle-mode DRX, connected DRX (C-DRX), and extended DRX.

DRX applied in the idle state may be referred to as idle-mode DRX, and DRX applied in the connected state may be referred to as connected-mode DRX (C-DRX).

Extended/enhanced DRX (eDRX) is a mechanism capable of extending the cycle of idle-mode DRX and C-DRX and may be mainly used for application of (massive) IoT. In idle-mode DRX, whether to allow eDRX may be configured based on system information (e.g., SIB1). SIB1 may include an eDRX-allowed parameter. The eDRX-allowed parameter is a parameter indicating whether idle-mode extended DRX is allowed.

<Idle-Mode DRX>

In the idle mode, a UE may use DRX to reduce power consumption. One paging occasion (PO) is a subframe in which a paging-radio network temporary identifier (P-RNTI) can be transmitted through a physical downlink control channel (PDCCH), a MTC PDCCH (MPDCCH), or a narrowband PDCCH (NPDCCH) (addressing a paging message for NB-IoT).

In a P-RNTI transmitted through an MPDCCH, PO may indicate a starting subframe of an MPDCCH repetition. In the case of a P-RNTI transmitted through an NPDCCH, when a subframe determined based on a PO is not a valid NB-IoT downlink subframe, the PO may indicate a starting subframe of an NPDCCH repetition. Therefore, a first valid NB-IoT downlink subframe after the PO is the starting subframe of the NPDCCH repetition.

One paging frame (PF) is one radio frame that may include one or a plurality of paging occasions. When DRX is used, the UE needs to monitor only one PO per DRX cycle. One paging narrow band (PNB) is one narrow band in which the UE receives a paging message. A PF, a PO and a PNB may be determined based on DRX parameters provided via system information.

Figure 41:
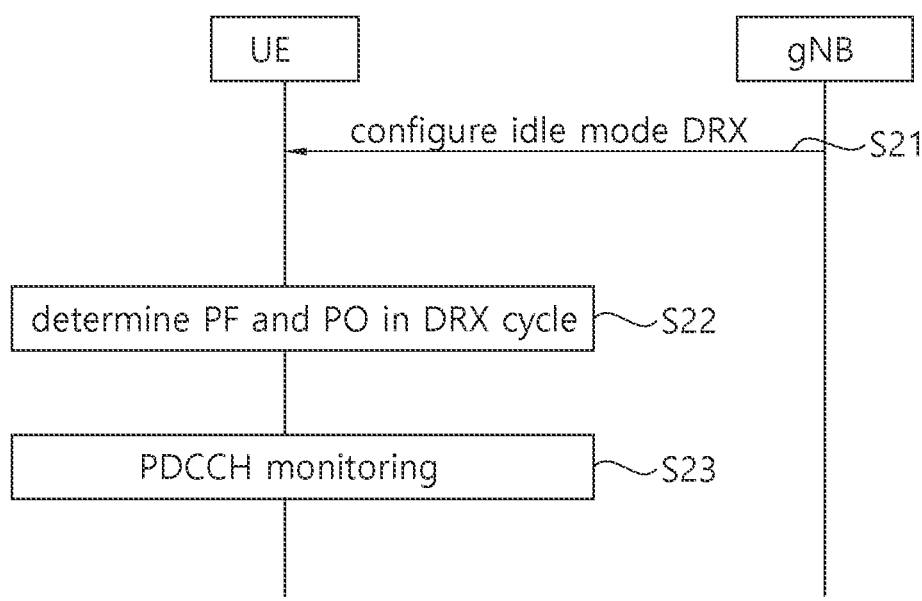
FIG. 41 schematically illustrates an example of an idle-mode DRX operation.

FIG. 41 is a flowchart illustrating an example of performing an idle-mode DRX operation.

Referring to FIG. 41, a UE may receive idle-mode DRX configuration information from a base station through higher-layer signaling (e.g., system information) (S21).

The UE may determine a paging frame (PF) and a paging occasion (PO) to monitor a PDCCH in a paging DRX cycle based on the idle-mode DRX configuration information (S22). In this case, the DRX cycle may include an on duration and a sleep duration (or opportunity for DRX).

The UE may monitor a PDCCH in the PO of the determined PF (S23). Here, for example, the UE monitors only one subframe (PO) per paging DRX cycle. In addition, when the UE receives a PDCCH scrambled with a P-RNTI in the on duration (that is, when paging is detected), the UE may transition to a connected mode and may transmit and receive data to and from the base station.

<Connected-Mode DRX (C-DRX)>

C-DRX refers to DRX applied in the RRC connected state. The DRX cycle of C-DRX may include a short DRX cycle and/or a long DRX cycle. Here, the short DRX cycle may be optional.

When C-DRX is configured, a UE may perform PDCCH monitoring for an on duration. When a PDCCH is successfully detected during the PDCCH monitoring, the UE may operate (or run) an inactivity timer and may maintain an awake state. However, when the PDCCH is not successfully detected during the PDCCH monitoring, the UE may enter a sleep state after the on duration expires.

When C-DRX is configured, a PDCCH reception occasion (e.g., a slot having a PDCCH search space) may be discontinuously configured based on the C-DRX configuration. However, when C-DRX is not configured, a PDCCH reception occasion (e.g., a slot having a PDCCH search space) can be continuously configured in the present disclosure.

PDCCH monitoring may be limited to a time period set as a measurement gap regardless of a C-DRX configuration.

Figure 42:
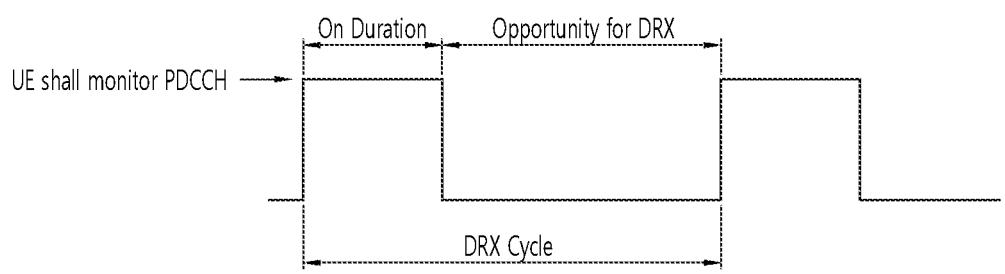
FIG. 42 illustrates a DRX cycle.

FIG. 42 illustrates a DRX cycle.

Referring to FIG. 42, a DRX cycle includes "On Duration" and "Opportunity for DRX". The DRX cycle defines a time interval in which "On Duration" is periodically repeated. "On Duration" represents a time period that the UE monitors to receive the PDCCH. When DRX is configured, the UE performs PDCCH monitoring during "On Duration". If there is a PDCCH successfully detected during PDCCH monitoring, the UE operates an inactivity timer and maintains an awake state. Meanwhile, if there is no PDCCH successfully detected during PDCCH monitoring, the UE enters a sleep state after the "On Duration" is over. Accordingly, when DRX is configured, PDCCH monitoring/reception may be discontinuously performed in the time domain in performing the procedures and/or methods described/suggested above. For example, when DRX is configured, in the present disclosure, a PDCCH reception opportunity (e.g., a slot having a PDCCH search space) may be set discontinuously according to the DRX configuration. Meanwhile, when DRX is not configured, PDCCH monitoring/reception may be continuously performed in the time domain in performing the procedure and/or method described/proposed above. For example, when DRX is not configured, a PDCCH reception opportunity (e.g., a slot having a PDCCH search space) may be continuously set in the present disclosure. Meanwhile, regardless of DRX configuration, PDCCH monitoring may be restricted in a time period set as a measurement gap.

Table 10 shows a UE procedure related to the DRX (RRC_CONNECTED state). Referring to Table 10, DRX configuration information is received through higher layer (e.g., RRC) signaling, and DRX ON/OFF is controlled by a DRX command of the MAC layer. When DRX is configured, the UE may discontinuously perform PDCCH monitoring in performing the procedure and/or method described/proposed in the present disclosure.

TABLE 10

| | Type of signals | UE procedure |
|---|---|---|
| First step | RRC signaling (MAC-CellGroupConfig) | Receive DRX configuration information |
| Second step | MAC CE ((Long) DRX command MAC CE) | Receive DRX command |
| Third step | — | Monitor a PDCCH during an on-duration of DRX cycle |

MAC-CellGroupConfig may include configuration information required to set a medium access control (MAC) parameter for a cell group. MAC-CellGroupConfig may also include configuration information on DRX. For example, MAC-CellGroupConfig may include information as follows in defining DRX.

Value of drx-OnDurationTimer: It defines a length of a start interval of a DRX cycle.
Value of drx-InactivityTimer: It defines a length of a time interval in which the UE is awake after a PDCCH opportunity in which the PDCCH indicating initial UL or DL data is detected
Value of drx-HARQ-RTT-TimerDL: It defines a length of a maximum time interval until DL retransmission is received, after initial DL transmission is received.
Value of drx-HARQ-RTT-TimerDL: It defines a length of a maximum time interval until a grant for UL retransmission is received, after a grant for UL initial transmission is received.
drx-LongCycleStartOffset: It defines a time length and a start point of a DRX cycle
drx-ShortCycle (optional): It defines a time length of a short DRX cycle Here, if any one of drx-OnDurationTimer, drx-InactivityTimer, drx-HARQ-RTT-TimerDL, drx-HARQ-RTT-TimerDL is in operation, the UE performs PDCCH monitoring at every PDCCH opportunity while maintaining an awake state.

Figure 43:
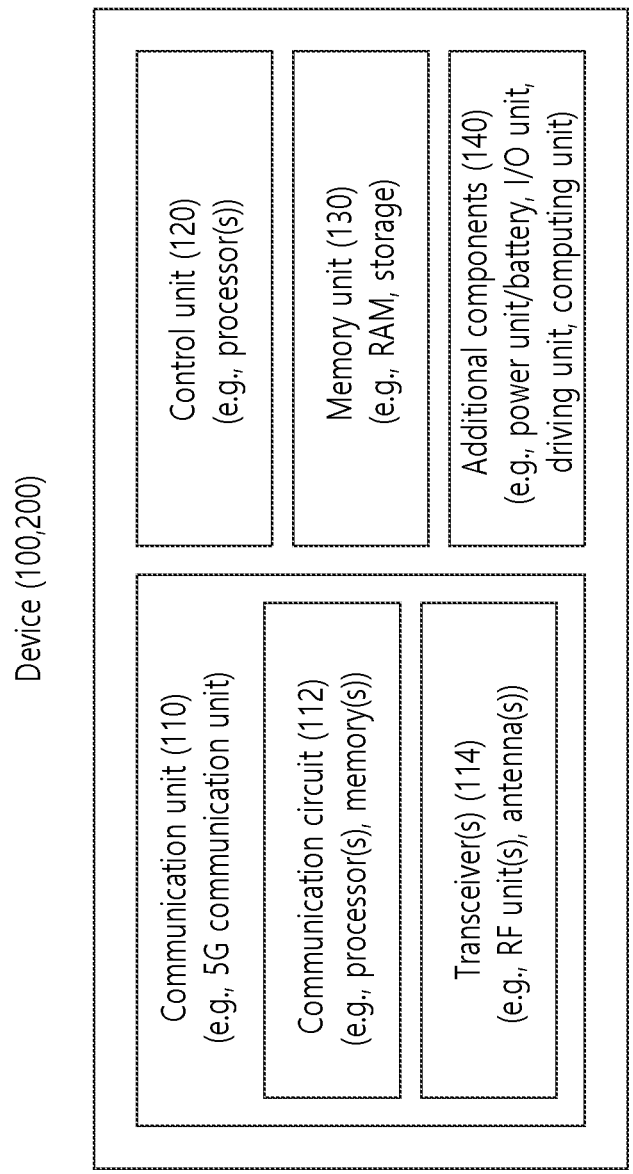
FIG. 43 shows another example of a wireless device applied to the present disclosure. The wireless device can be implemented in various forms according to use-examples/services.

FIG. 43 shows another example of a wireless device applied to the present disclosure. Wireless devices may be implemented in various forms depending on use-examples/services.

Referring to FIG. 43, the wireless devices 100 and 200 may include various elements. For example, the wireless devices 100 and 200 may include a communication unit 110, a controller 120, a memory unit 130, and an additional element 140. The communication unit may include a communication circuit 112 and a transceiver(s) 114. For example, the communication circuit 112 may include one or more processors 102 and 202 and/or one or more memories 104 and 204. For example, the transceiver(s) 114 may include one or more transceivers 106 and 206 and/or one or more antennas 108 and 208. The controller 120 is electrically connected to the communication unit 110, the memory unit 130, and the additional element 140 and controls all operations of the wireless device. For example, the controller 120 may control electrical/mechanical operations of the wireless device based on program/code/command/information stored in the memory unit 130. In addition, the controller 120 may transmit the information stored in the memory unit 130 to the outside (e.g., another communication device) through the communication unit 110 through a wireless/wired interface or store information received through the wireless/wired interface from the outside (e.g., another communication device) through the communication unit 110 in the memory unit 130.

The additional element 140 may be variously configured according to a type of the wireless device. For example, the additional element 140 may include at least one of a power unit/battery, an I/O unit, a driving unit, and a computing unit. The wireless device may be implemented in the form of a robot (100a in FIG. 44), vehicles (100b-1 and 100b-2 in FIG. 44), an XR device (100c in FIG. 44), a portable device (100d in FIG. 44), a home appliance (100e in FIG. 44), an IoT device (100f in FIG. 44), a digital broadcasting terminal, a hologram device, a public safety device, an MTC device, a medical device, a fintech device (or financial device), a security device, a climate/environment device, an AI server/device (400 in FIG. 44), a BS (200 in FIG. 44), and a network node. The wireless device may be used as a mobile device or may be used in a fixed place depending on the use-example/service.

In FIG. 43, various elements, components, units/units, and/or modules in the wireless devices 100 and 200 may all be interconnected through a wired interface, or at least some of them may be wirelessly connected through the communication unit 110. For example, in the wireless devices 100 and 200, the controller 120 and the communication unit 110 may be connected by wire, and the controller 120 and a first unit (e.g., 130 or 140) may be connected through the communication unit 110 wirelessly. In addition, each element, component, unit/part, and/or module in the wireless devices 100 and 200 may further include one or more elements. For example, the controller 120 may be configured as a set of one or more processors. For example, the controller 120 may be configured as a set of a communication control processor, an application processor, an electronic control unit (ECU), a graphic processing processor, and a memory control processor. As another example, the memory unit 130 may include a random access memory (RAM), a dynamic RAM (DRAM), a read only memory (ROM), a flash memory, a volatile memory, a non-volatile memory, and/or a combination thereof.

Figure 44:
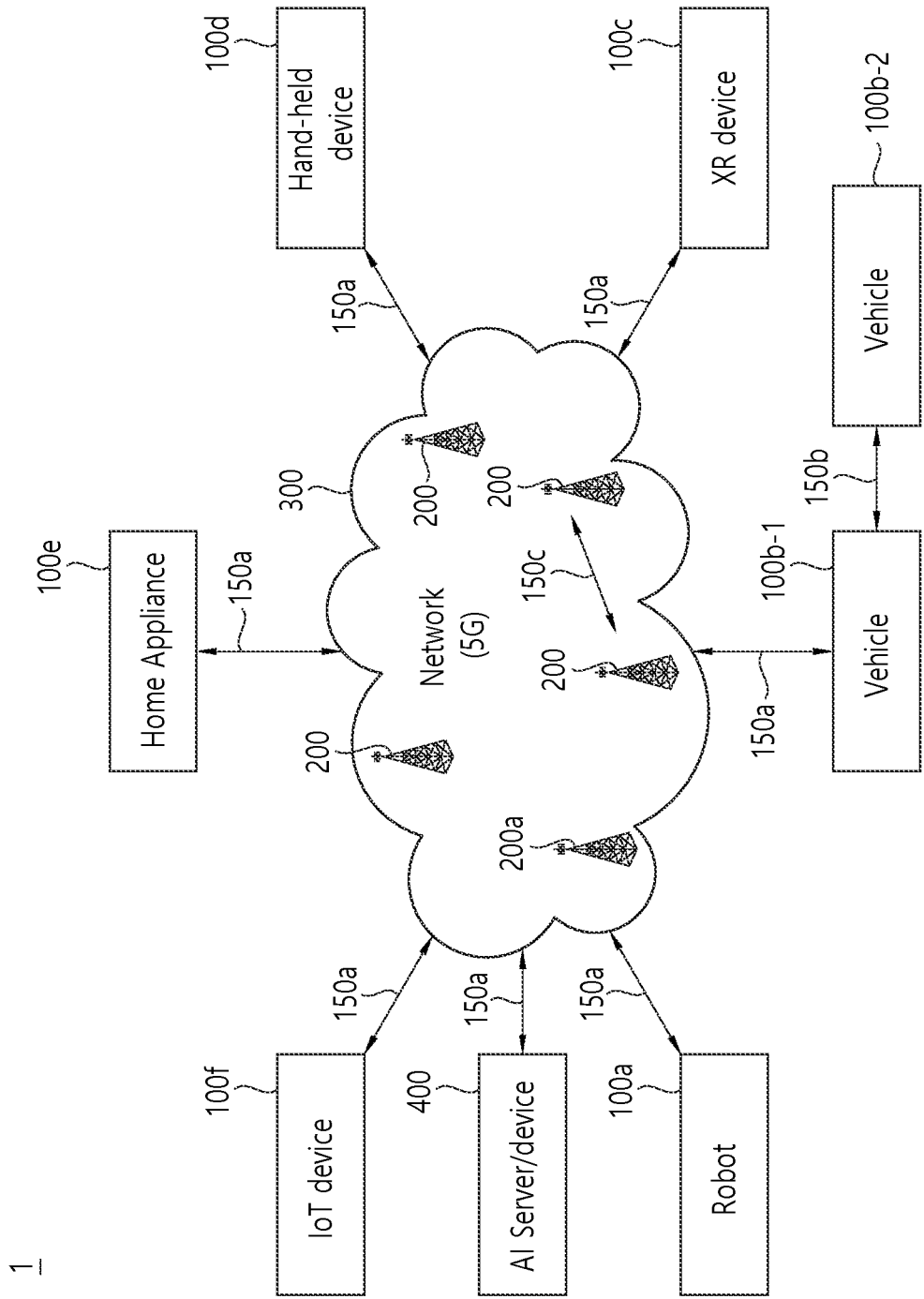
FIG. 44 illustrates a communication system 1 applied to the present disclosure.

FIG. 44 illustrates a communication system 1 applied to the present disclosure.

Referring to FIG. 44, a communication system 1 applied to the present disclosure includes a wireless device, a base station (BS), and a network. Here, the wireless device refers to a device that performs communication using a wireless access technology (e.g., 5G new RAT (NR), long term evolution (LTE)), and may be referred to as a communication/wireless/5G device. Wireless devices may include a robot 100*a*, vehicles 100*b*-1 and 100*b*-2, an eXtended reality (XR) device 100*c*, a hand-held device 100*d*, a home appliance 100*e*, an Internet of things (IoT) device 100*f*, and an AI device/server 400, but is not limited thereto. For example, the vehicle may include a vehicle equipped with a wireless communication function, an autonomous vehicle, a vehicle capable of performing inter-vehicle communication, and the like. Here, the vehicle may include an unmanned aerial vehicle (UAV) (e.g., a drone). The XR device includes augmented a reality (AR)/virtual reality (VR)/mixed reality (MR) device and may be implemented in the form of a head-mounted device (HMD), a head-up display (HUD) provided in a vehicle, a TV, a smartphone, a computer, a wearable device, a home appliance, a digital signage, a vehicle, a robot, and the like. The portable device may include a smartphone, a smart pad, a wearable device (e.g., smart watch or smart glasses), a computer (e.g., notebook computers, etc.), and the like. The home appliance may include a TV, a refrigerator, and a washing machine. The IoT device may include a sensor, a smart meter, and the like. For example, the BS and the network may be implemented as a wireless device, and a specific wireless device 200*a* may operate as a BS/network node for other wireless devices.

The wireless devices 100*a* to 100*f* may be connected to a network 300 through a BS 200. An artificial intelligence (AI) technology may be applied to the wireless devices 100*a* to 100*f*, and the wireless devices 100*a* to 100*f* may be connected to the AI server 400 through the network 300. The network 300 may be configured using a 3G network, a 4G (e.g., LTE) network, or a 5G (e.g., NR) network. The wireless devices 100*a* to 100*f* may communicate with each other through the BS 200/network 300 or may communicate directly (e.g., sidelink communication) without the BS/network. For example, the vehicles 100*b*-1 and 100*b*-2 may perform direct communication (e.g. vehicle to vehicle (V2V)/vehicle to everything (V2X) communication). In addition, the IoT device (e.g., sensor) may directly communicate with other IoT devices (e.g., sensors) or other wireless devices 100*a* to 100*f*.

Wireless communication/connections 150*a*, 150*b*, and 150*c* may be established between the wireless devices 100*a* to 100*f* and BS 200 and between the BS 200 and the BS 200. Here, wireless communication/connection may be established through various wireless access technologies (e.g., 5G NR) such as uplink/downlink communication 150*a*, sidelink communication 150*b* (or D2D communication), and communication 150*c* between BSs (e.g., relay, integrated access backhaul). Through wireless communication/connections 150*a*, 150*b*, and 150*c*, the wireless devices and the BS/wireless device and the BS and the BS may transmit/receive wireless signals to each other. For example, the wireless communication/connections 150*a*, 150*b*, and 150*c* may transmit/receive signals through various physical channels. To this end, at least some of a process of setting various configuration information for transmission/reception of wireless signals, various signal processing processes (e.g., channel encoding/decoding, modulation/demodulation, resource mapping/demapping, etc.), and a resource allocation process may be performed based on various proposals of the present disclosure.

Figure 45:
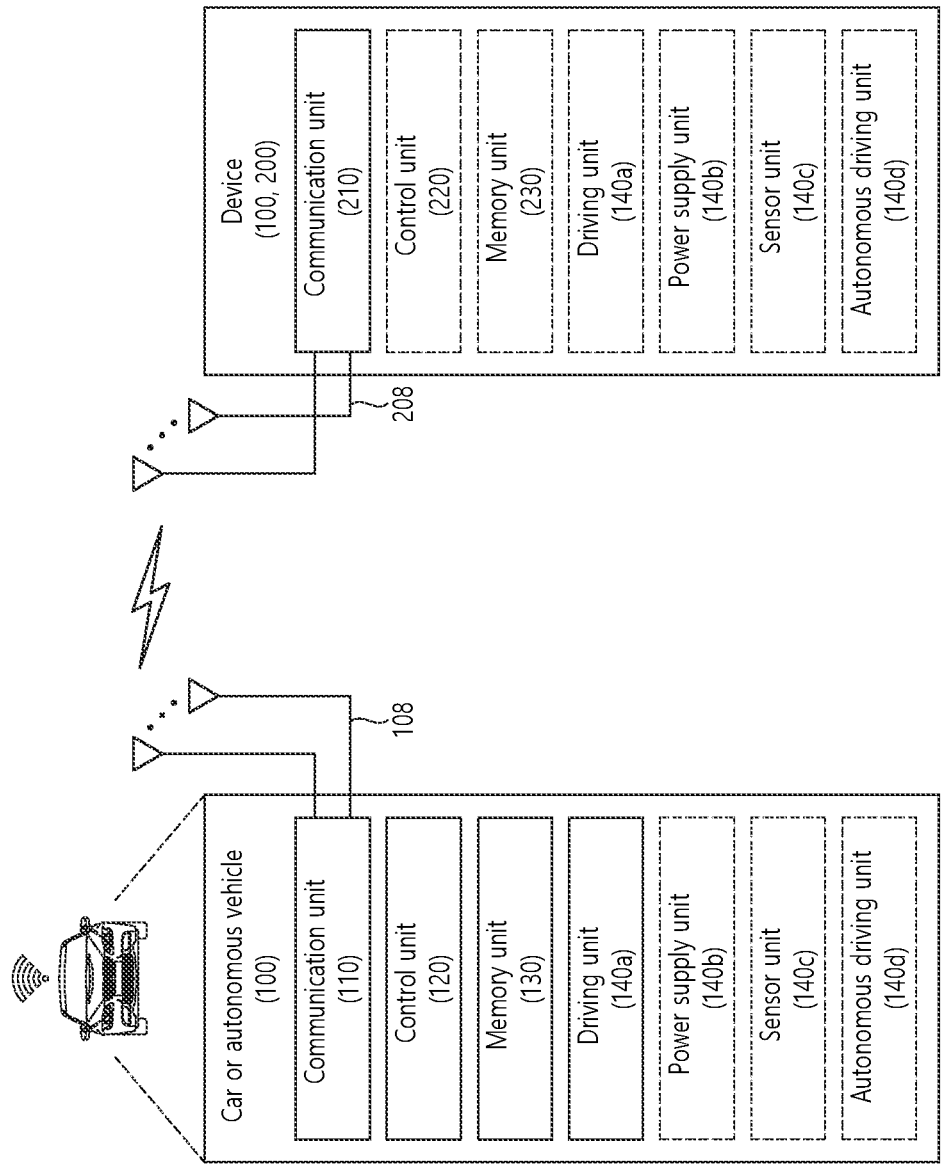
FIG. 45 illustrates a vehicle or an autonomous vehicle applied to the present disclosure.

FIG. 45 illustrates a vehicle or an autonomous vehicle applied to the present disclosure.

A vehicle or an autonomous vehicle may be implemented as a moving robot, a vehicle, a train, an aerial vehicle (AV), a ship, or the like.

Referring to FIG. 45, a vehicle or autonomous vehicle 100 includes an antenna unit 108, a communication unit 110, a control unit 120, a driving unit 140*a*, a power supply unit 140*b*, and a sensor unit 140*c*, and an autonomous driving unit 140*d*. The antenna unit 108 may be configured as a portion of the communication unit 110. Blocks 110/130/140*a* to 140*d* correspond to blocks 110/130/140 of FIG. 43, respectively.

The communication unit 110 may transmit and receive signals (e.g., data, control signals, etc.) with external devices such as other vehicles, base stations (BSs) (e.g. base station, roadside unit, etc.), and servers. The control unit 120 may perform various operations by controlling elements of the vehicle or the autonomous vehicle 100. The control unit 120 may include an electronic control unit (ECU). The driving unit 140*a* may cause the vehicle or the autonomous vehicle 100 to travel on the ground. The driving unit 140*a* may include an engine, a motor, a power train, a wheel, a brake, a steering device, and the like. The power supply unit 140*b* supplies power to the vehicle or the autonomous vehicle 100, and may include a wired/wireless charging circuit, a battery, and the like. The sensor unit 140*c* may obtain vehicle status, surrounding environment information, user information, and the like. The sensor unit 140*c* may include an inertial measurement unit (IMU) sensor, a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, a pedal position sensor, etc. The autonomous driving unit 140*d* may implement a technology of maintaining a driving lane, a technology of automatically adjusting a speed such as adaptive cruise control, a technology of automatically traveling along a predetermined route, and a technology of automatically setting a route and traveling when a destination is set.

For example, the communication unit 110 may receive map data, traffic information data, and the like from an external server. The autonomous driving unit 140*d* may generate an autonomous driving route and a driving plan based on the acquired data. The control unit 120 may control the driving unit 140*a* so that the vehicle or the autonomous vehicle 100 moves along the autonomous driving route according to the driving plan (e.g., speed/direction adjustment). During autonomous driving, the communication unit 110 may asynchronously/periodically acquire the latest traffic information data from an external server and may acquire surrounding traffic information data from surrounding vehicles. In addition, during autonomous driving, the sensor unit 140*c* may acquire vehicle state and surrounding environment information. The autonomous driving unit 140*d* may update the autonomous driving route and the driving plan based on newly acquired data/information. The communication unit 110 may transmit information on a vehicle location, an autonomous driving route, a driving plan, and the like to the external server. The external server may predict traffic information data in advance using AI technology or the like based on information collected from the vehicle or autonomous vehicles and may provide the predicted traffic information data to the vehicle or autonomous vehicles.

Figure 46:
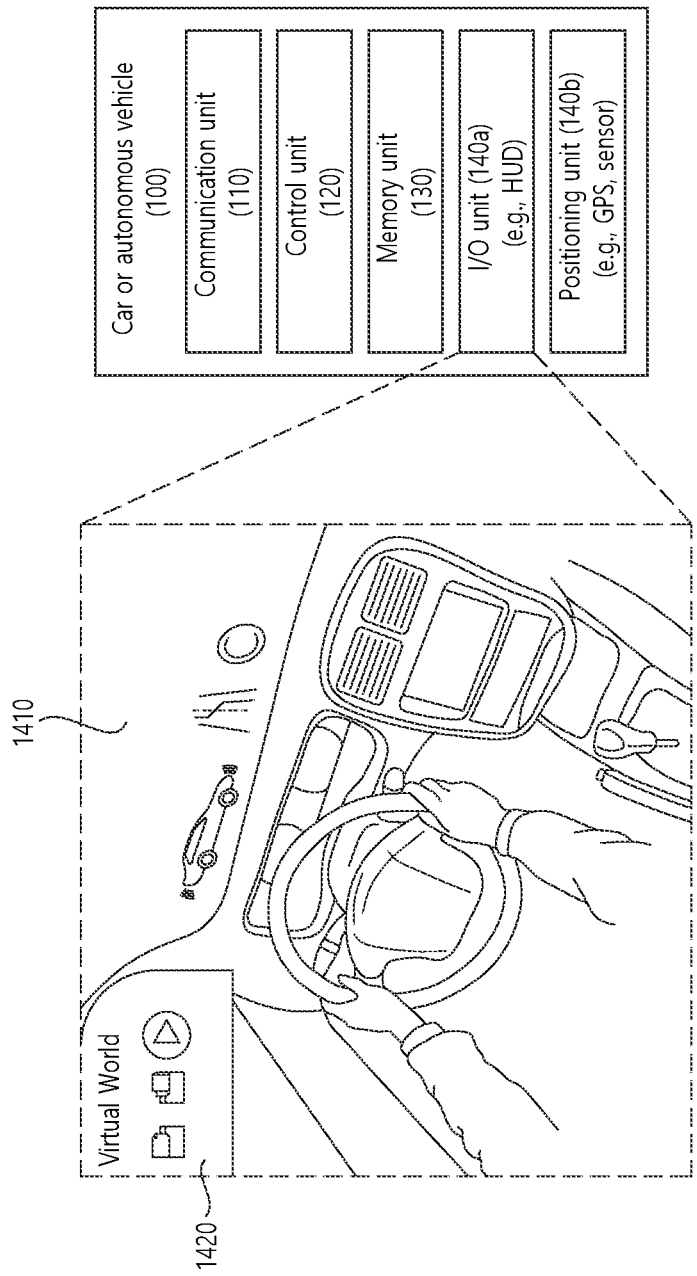
FIG. 46 illustrates a vehicle applied to the present disclosure.

FIG. 46 illustrates a vehicle applied to the present disclosure.

Vehicles may also be implemented as means of transportation, trains, aircraft, and ships.

Referring to FIG. 46, the vehicle 100 may include a communication unit 110, a control unit 120, a memory unit 130, an input/output unit 140*a*, and a position measurement unit 140*b*. Blocks 110 to 130/140*a* to 140*d* correspond to blocks 110 to 130/140 of FIG. 43, respectively.

The communication unit 110 may transmit and receive signals (e.g., data, control signals, etc.) with other vehicles or external devices such as a BS. The control unit 120 may perform various operations by controlling components of the vehicle 100. The memory unit 130 may store data/parameters/programs/codes/commands supporting various functions of the vehicle 100. The input/output unit 140*a* may output an AR/VR object based on information in the memory unit 130. The input/output unit 140*a* may include a HUD. The location measurement unit 140*b* may acquire location information of the vehicle 100. The location information may include absolute location information of the vehicle 100, location information within a driving line, acceleration information, location information with surrounding vehicles, and the like. The location measurement unit 140*b* may include a GPS and various sensors.

For example, the communication unit 110 of the vehicle 100 may receive map information, traffic information, etc., from an external server and store the information in the memory unit 130. The location measurement unit 140*b* may acquire vehicle location information through GPS and various sensors and store the vehicle location information in the memory unit 130. The control unit 120 may generate a virtual object based the on map information, the traffic information, the vehicle location information, and the like, and the input/output unit 140*a* may display the generated virtual object on a window of the vehicle (1410, 1420). In addition, the control unit 120 may determine whether the vehicle 100 is operating normally within a driving line based on vehicle location information. When the vehicle 100 deviates from the driving line abnormally, the control unit 120 may display a warning on a windshield of the vehicle through the input/output unit 140*a*. In addition, the control unit 120 may broadcast a warning message regarding a driving abnormality to nearby vehicles through the communication unit 110. Depending on a situation, the control unit 120 may transmit location information of the vehicle and information on driving/vehicle abnormalities to related organizations through the communication unit 110.

Figure 47:
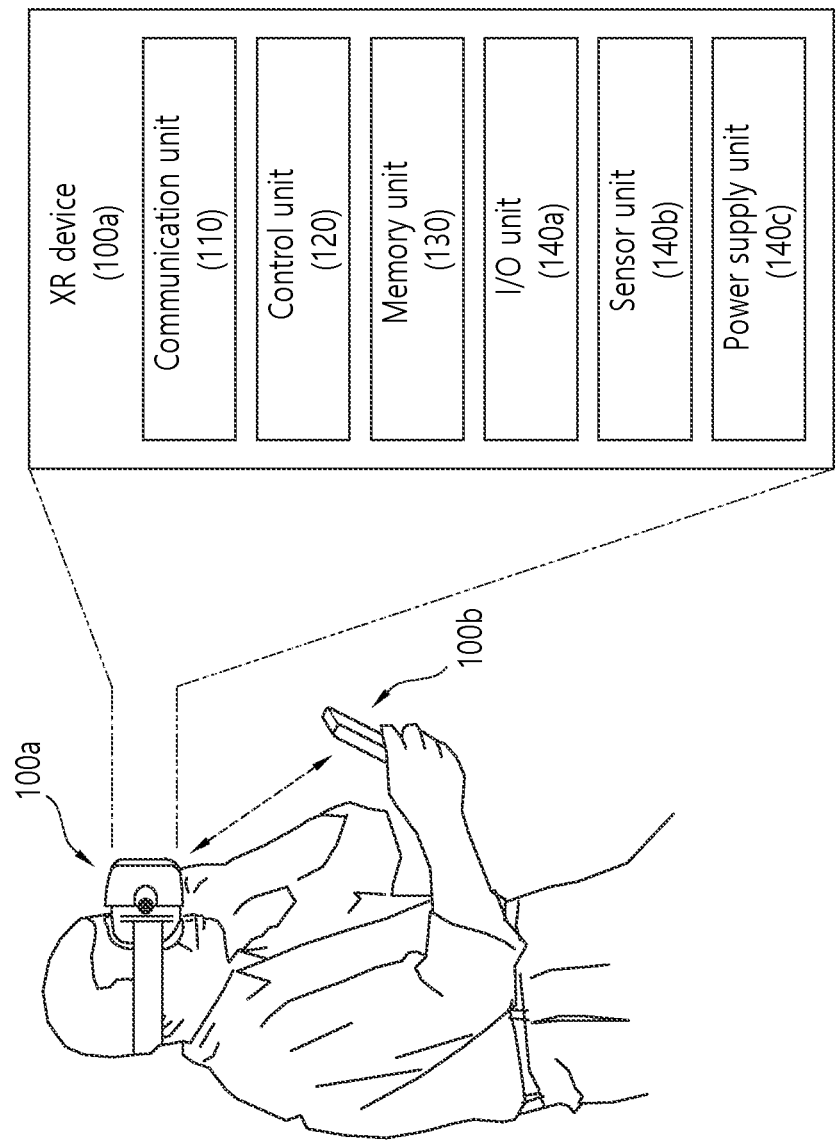
FIG. 47 illustrates an XR device applied to the present disclosure.

FIG. 47 illustrates an XR device applied to the present disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 47, the XR device 100*a* may include a communication unit 110, a control unit 120, a memory unit 130, an input/output unit 140*a*, a sensor unit 140*b*, and a power supply unit 140*c*. Here, blocks 110 to 130/140*a* to 140*c* correspond to blocks 110 to 130/140 of FIG. 43, respectively.

The communication unit 110 may transmit and receive signals (e.g., media data, control signals, etc.) with external devices such as other wireless devices, portable devices, media servers. Media data may include images, sounds, and the like. The control unit 120 may perform various operations by controlling components of the XR device 100*a*. For example, the control unit 120 may be configured to control and/or perform procedures such as video/image acquisition, (video/image) encoding, and metadata generating and processing. The memory unit 130 may store data/parameters/programs/codes/commands required for driving the XR device 100*a*/generating an XR object. The input/output unit 140*a* may obtain control information, data, etc. from the outside and may output the generated XR object. The input/output unit 140*a* may include a camera, a microphone, a user input unit, a display unit, a speaker, and/or a haptic module. The sensor unit 140*b* may obtain XR device status, surrounding environment information, user information, and the like. The sensor unit 140*b* may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140*c* may supply power to the XR device 100*a* and may include a wired/wireless charging circuit, a battery, and the like.

As an example, the memory unit 130 of the XR device 100*a* may include information (e.g., data, etc.) necessary for generating an XR object (e.g., AR/VR/MR object). The input/output unit 140*a* may acquire a command to manipulate the XR device 100*a* from a user, and the control unit 120 may drive the XR device 100*a* according to the user's driving command. For example, when the user tries to watch a movie, news, etc., through the XR device 100*a*, the control unit 120 may transmit content request information through the communication unit 130 to another device (for example, the portable device 100*b*) or to a media server. The communication unit 130 may download/stream content such as movies and news from another device (e.g., the portable device 100*b*) or the media server to the memory unit 130. The control unit 120 may control and/or perform procedures such as video/image acquisition, (video/image) encoding, and metadata generating/processing for the content, and generate/output an XR object based on information on a surrounding space or a real object through the input/output unit 140*a*/sensor unit 140*b*.

In addition, the XR device 100*a* may be wirelessly connected to the portable device 100*b* through the communication unit 110, and an operation of the XR device 100*a* may be controlled by the portable device 100*b*. For example, the portable device 100*b* may operate as a controller for the XR device 100*a*. To this end, the XR device 100*a* may acquire 3D location information of the portable device 100*b*, generate an XR entity corresponding to the portable device 100*b*, and output the generated XR entity.

Figure 48:
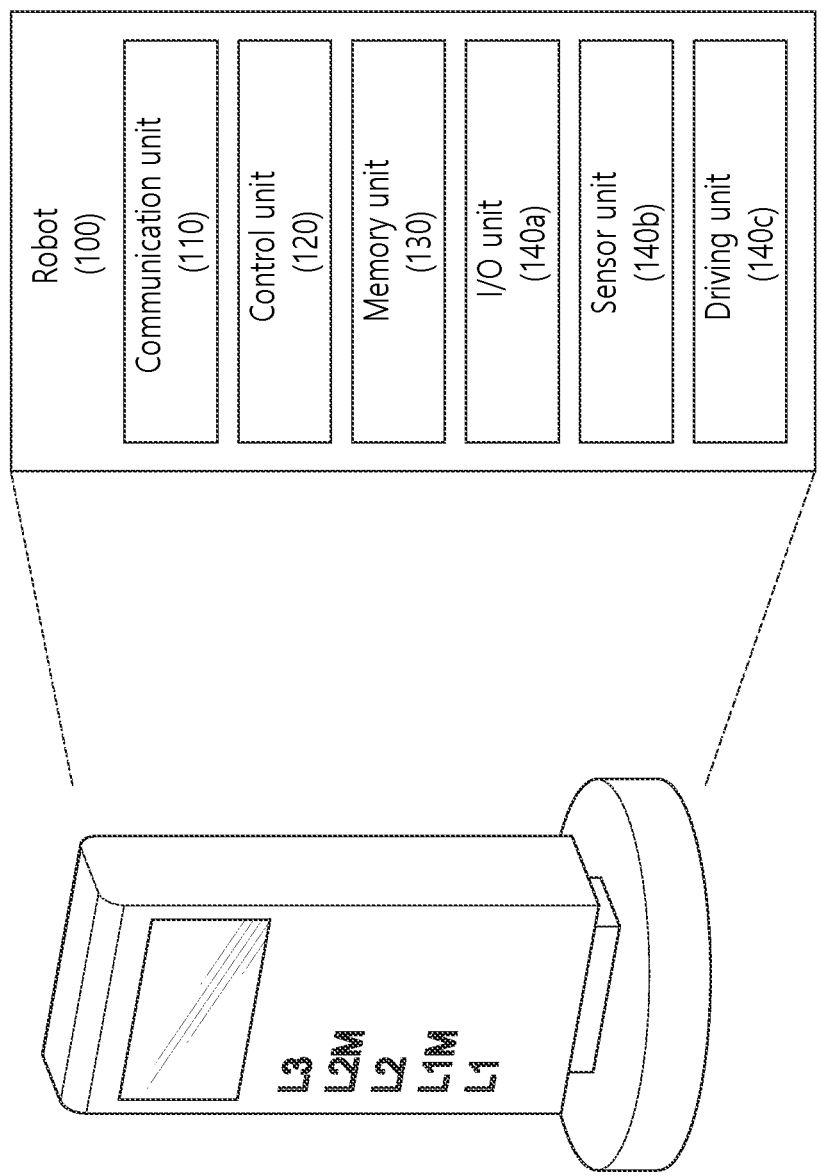
FIG. 48 illustrates a robot applied to the present disclosure.

FIG. 48 illustrates a robot applied to the present disclosure.

Robots may be classified as industrial, medical, household, military, etc. depending on the purpose or field of use.

Referring to FIG. 48, a robot 100 may include a communication unit 110, a control unit 120, a memory unit 130, an input/output unit 140*a*, a sensor unit 140*b*, and a driving unit 140*c*. Blocks 110 to 130/140*a* to 140*d* correspond to blocks 110 to 130/140 of FIG. 43, respectively.

The communication unit 110 may transmit and receive signals (e.g., driving information, control signals, etc.) with other wireless devices, other robots, or external devices such as a control server. The control unit 120 may perform various operations by controlling components of the robot 100. The memory unit 130 may store data/parameters/programs/codes/commands supporting various functions of the robot 100. The input/output unit 140*a* may acquire information from the outside of the robot 100 and may output the information to the outside of the robot 100. The input/output unit 140*a* may include a camera, a microphone, a user input unit, a display unit, a speaker, and/or a haptic module. The sensor unit 140*b* may obtain internal information, surrounding environment information, user information, and the like of the robot 100. The sensor unit 140*b* may include a proximity sensor, an illuminance sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140*c* may perform various physical operations such as moving a robot joint. In addition, the driving unit 140*c* may cause the robot 100 to travel on the ground or fly in the air. The driving unit 140*c* may include an actuator, a motor, a wheel, a brake, a propeller, and the like.

Figure 49:
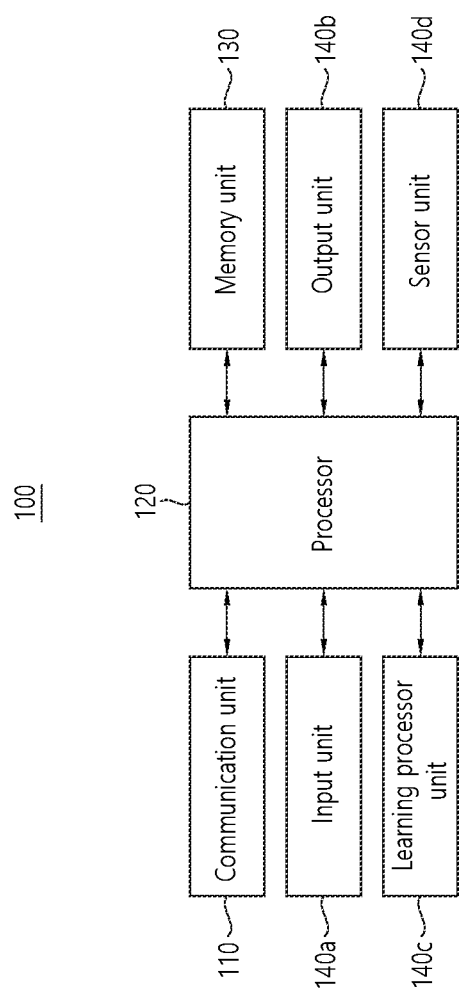
FIG. 49 illustrates an AI device applied to the present disclosure.

FIG. 49 illustrates an AI device applied to the present disclosure. AI devices may be implemented as fixed devices or moving devices such as TVs, projectors, smartphones, PCs, notebooks, digital broadcasting UEs, tablet PCs, wearable devices, set-top boxes (STBs), radios, washing machines, refrigerators, digital signage, robots, vehicles, etc.

Referring to FIG. 49, the AI device 100 may include a communication unit 110, a control unit 120, a memory unit 130, an input/output unit 140*a*/140*b*, a learning processor unit 140*c*, and a sensor unit. Blocks 110 to 130/140*a* to 140*d* correspond to blocks 110 to 130/140 of FIG. 43, respectively.

The communication unit 110 may transmit and receive wireless signals (e.g., sensor information, user input, learning model, control signals, etc.) with external devices such as another AI device or an AI server using wired/wireless communication technology. To this end, the communication unit 110 may transmit information in the memory unit 130 to an external device or may transfer a signal received from the external device to the memory unit 130.

The control unit 120 may determine at least one executable operation of the AI device 100 based on information determined or generated using a data analysis algorithm or a machine learning algorithm. In addition, the control unit 120 may perform a determined operation by controlling the components of the AI device 100. For example, the control unit 120 may request, search, receive, or utilize data from the learning processor unit 140*c* or the memory unit 130, and may control components of the AI device 100 to execute a predicted operation among at least one an executable operation or an operation determined to be desirable. In addition, the control unit 120 may collect history information including operation content of the AI device 100 or the user's feedback on the operation, and store the collected information in the memory unit 130 or the learning processor unit 140*c* or transmit the information to an external device such as an AI server. The collected historical information may be used to update a learning model.

The memory unit 130 may store data supporting various functions of the AI device 100. For example, the memory unit 130 may store data obtained from the input unit 140*a*, data obtained from the communication unit 110, output data from the learning processor unit 140*c*, and data obtained from the sensing unit 140. In addition, the memory unit 130 may store control information and/or software codes necessary for the operation/execution of the control unit 120.

The input unit 140*a* may acquire various types of data from the outside of the AI device 100. For example, the input unit 140*a* may acquire training data for model training and input data to which the training model is applied. The input unit 140*a* may include a camera, a microphone, and/or a user input unit. The output unit 140*b* may generate output related to visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information by using various sensors. The sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 140*c* may train a model configured as an artificial neural network using training data. The learning processor unit 140*c* may perform AI processing together with the learning processor unit of the AI server. The learning processor unit 140*c* may process information received from an external device through the communication unit 110 and/or information stored in the memory unit 130. In addition, an output value of the learning processor unit 140*c* may be transmitted to an external device through the communication unit 110 and/or may be stored in the memory unit 130.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 11. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 11

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 12 below, FR1 may include a band in the range of 410 MHz to 7125 MHz. That is, FR1 may include a frequency band of at least 6 GHz (or 5850, 5900, 5925 MHz, and soon). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 12

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method of performing a channel access procedure of a user equipment (UE), the method comprising:
   receiving, from a base station, information notifying an available resource block set and channel occupancy time duration; and
   performing a channel access procedure for an uplink transmission,
   wherein, for the uplink transmission within the channel occupancy time duration in a time domain and the available resource block set in a frequency domain, the UE switches from i) a first channel access procedure where the UE transmits a transmission after sensing a channel to be idle during sensing durations and after a counter is zero to ii) a second channel access procedure where the UE transmits a transmission immediately after sensing a channel to be idle for a specific time.

2. The method of claim 1, wherein the information comprises a bitmap having a one-to-one mapping with available resource block sets.

3. The method of claim 1, wherein the channel occupancy time duration is a time obtained by excluding a downlink transmission time of the base station from a channel occupancy time acquired by the base station.

4. The method of claim 1, wherein the information is received through a physical downlink control channel (PDCCH).

5. A user equipment (UE), the UE comprising:
   at least one transceiver for transmitting and receiving a radio signal;
   at least one memory; and
   at least one processor connected to the at least one transceiver and the at least one memory,
   wherein the at least one memory stores instructions that, based on being executed by the at least one processor, cause the at least one processor to perform operations comprising:
   receiving, from a base station, information notifying an available resource block set and channel occupancy time duration; and
   performing a channel access procedure for an uplink transmission,
   wherein, for the uplink transmission within the channel occupancy time duration in a time domain and the available resource block set in a frequency domain, the UE switches from i) a first channel access procedure where the UE transmits a transmission after sensing a channel to be idle during sensing durations and after a counter is zero to ii) a second channel access procedure where the UE transmits a transmission immediately after sensing a channel to be idle for a specific time.

6. The UE of claim 5, wherein the information comprises a bitmap having a one-to-one mapping with available resource block sets.

7. The UE of claim 5, wherein the channel occupancy time duration is a time obtained by excluding a downlink transmission time of the base station from a channel occupancy time acquired by the base station.

8. The UE of claim 5, wherein the information is received through a physical downlink control channel (PDCCH).

9. An apparatus, the apparatus comprising:
   at least one memory; and
   at least one processor connected to the at least one memory,
   wherein the at least one memory stores instructions that, based on being executed by the at least one processor, cause the at least one processor to perform operations comprising:
   receiving, from a base station, information notifying an available resource block set and channel occupancy time duration; and
   performing a channel access procedure for an uplink transmission,
   wherein, for the uplink transmission within the channel occupancy time duration in a time domain and the available resource block set in a frequency domain, the apparatus switches from i) a first channel access procedure where the apparatus transmits a transmission after sensing a channel to be idle during sensing durations and after a counter is zero to ii) a second channel access procedure where the apparatus transmits a transmission immediately after sensing a channel to be idle for a specific time.

10. The apparatus of claim 9, wherein the information comprises a bitmap having a one-to-one mapping with available resource block sets.

11. The apparatus of claim 9, wherein the channel occupancy time duration is a time obtained by excluding a downlink transmission time of the base station from a channel occupancy time acquired by the base station.

12. The apparatus of claim 9, wherein the information is received through a physical downlink control channel (PDCCH).

* * * * *